(12) United States Patent
Hampden-Smith et al.

(10) Patent No.: US 7,476,411 B1
(45) Date of Patent: Jan. 13, 2009

(54) DIRECT-WRITE DEPOSITION OF PHOSPHOR POWDERS

(75) Inventors: Mark J. Hampden-Smith, Albuquerque, NM (US); Toivo T. Kodas, Albuquerque, NM (US); James Caruso, Albuquerque, NM (US); Daniel J. Skamser, Greenville, SC (US)

(73) Assignee: Cabot Corporation, Boston, MA (US)

( * ) Notice: Subject to any disclaimer, the term of this patent is extended or adjusted under 35 U.S.C. 154(b) by 492 days.

(21) Appl. No.: 09/495,141

(22) Filed: Jan. 31, 2000

Related U.S. Application Data

(63) Continuation-in-part of application No. 09/141,393, filed on Aug. 27, 1998, now Pat. No. 6,197,218, and a continuation-in-part of application No. 09/141,405, filed on Aug. 27, 1998, now Pat. No. 6,168,731, and a continuation-in-part of application No. 09/140,525, filed on Aug. 27, 1998, now Pat. No. 6,193,908, and a continuation-in-part of application No. 09/141,386, filed on Aug. 27, 1998, now Pat. No. 6,210,604, which is a continuation-in-part of application No. 09/030,060, filed on Feb. 24, 1998, now Pat. No. 6,153,123, which is a continuation-in-part of application No. 09/028,603, filed on Feb. 24, 1998, now Pat. No. 6,180,029, which is a continuation-in-part of application No. 09/030,057, filed on Feb. 24, 1998, now Pat. No. 6,338,809.

(60) Provisional application No. 60/039,450, filed on Feb. 24, 1997, provisional application No. 60/118,038, filed on Feb. 1, 1999, provisional application No. 60/038,262, filed on Feb. 24, 1997.

(51) Int. Cl.
*B05D 5/12* (2006.01)
*B05D 3/02* (2006.01)
*B05B 5/00* (2006.01)

(52) U.S. Cl. .............................. 427/64; 427/71; 427/73; 427/157; 427/256; 427/372.2

(58) Field of Classification Search .......... 252/301.4 R, 252/301.4 P; 427/64, 71, 73
See application file for complete search history.

(56) References Cited

U.S. PATENT DOCUMENTS

| | | | |
|---|---|---|---|
| 3,773,540 A | 11/1973 | Shidlovsky | 117/33.5 |
| 4,275,333 A | 6/1981 | Kagami et al. | 313/495 |
| 4,451,521 A | 5/1984 | Kaule et al. | 428/199 |
| 4,627,875 A | 12/1986 | Kobayashi et al. | 106/22 |
| 4,801,398 A | 1/1989 | Ohno et al. | 252/301.4 |
| 4,877,451 A | 10/1989 | Winnik et al. | 106/23 |
| 5,037,577 A | 8/1991 | Yamanoi et al. | 252/301.4 |
| 5,329,293 A | 7/1994 | Liker | 347/11 |

(Continued)

FOREIGN PATENT DOCUMENTS

JP      11-046019      *  2/1999

*Primary Examiner*—Brian K Talbot
(74) *Attorney, Agent, or Firm*—Marsh Fischmann & Breyfogle LLP

(57) ABSTRACT

A liquid suspension of phosphor particles and method for depositing the liquid suspension. The suspension advantageously has a low viscosity with a high solids-loading of phosphor particles. The apparent density of the phosphor particles is well-controlled to enable the particles to be dispersed in the liquid vehicle. The suspension is useful in direct-write tools such as ink-jet devices.

2 Claims, 36 Drawing Sheets

U.S. PATENT DOCUMENTS

| | | | |
|---|---|---|---|
| 5,413,736 A | 5/1995 | Nishisu et al. | 252/301.4 |
| 5,569,317 A | 10/1996 | Sarada et al. | 106/21 |
| 5,662,831 A * | 9/1997 | Chadha | 252/301.4 R |
| 5,679,724 A | 10/1997 | Sacripante et al. | 523/161 |
| 5,725,647 A | 3/1998 | Carlson et al. | 106/31.86 |
| 5,747,100 A | 5/1998 | Petersen | 427/64 |
| 5,772,916 A | 6/1998 | Jamil et al. | 252/301.4 |
| 5,792,380 A | 8/1998 | Wen et al. | 252/62.56 |
| 5,811,924 A | 9/1998 | Okumura et al. | 313/487 |
| 5,837,041 A | 11/1998 | Bean et al. | 106/31.6 |
| 5,837,045 A | 11/1998 | Johnson et al. | 106/31.85 |
| 5,853,470 A | 12/1998 | Martin et al. | 106/31.86 |
| 5,921,836 A * | 7/1999 | Nanto et al. | 445/24 |
| 6,020,397 A | 2/2000 | Matzinger | 523/160 |
| 6,069,439 A * | 5/2000 | Matsuda et al. | 313/461 |
| 6,100,633 A * | 8/2000 | Okumura et al. | 313/486 |
| 6,153,123 A | 11/2000 | Hampden-Smith et al. | 252/301.45 |
| 6,168,731 B1 | 1/2001 | Hampden-Smith et al. | 252/301.45 |
| 6,180,029 B1 | 1/2001 | Hampden-Smith et al. | 252/301.4 |
| 6,210,604 B1 | 4/2001 | Hampden-Smith et al. | 252/301.4 |
| 6,416,174 B1 * | 7/2002 | Ito et al. | 347/100 |
| 6,503,831 B2 | 1/2003 | Speakman | 438/674 |
| 6,547,617 B1 * | 4/2003 | Kawamura et al. | 445/24 |
| 6,667,574 B2 * | 12/2003 | Aoki et al. | 313/582 |
| 6,726,519 B2 * | 4/2004 | Suzuki et al. | 445/24 |

* cited by examiner

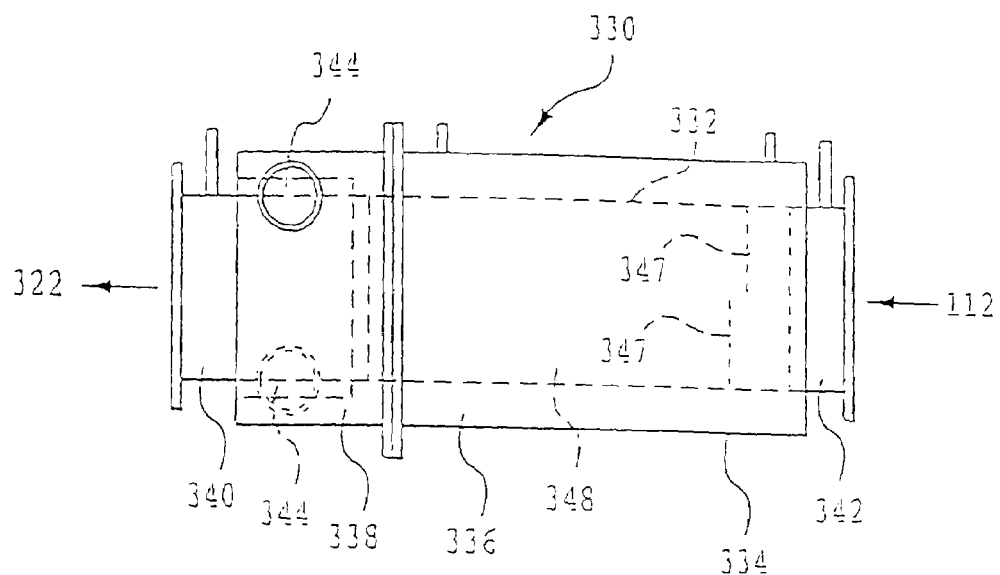
FIG. 29
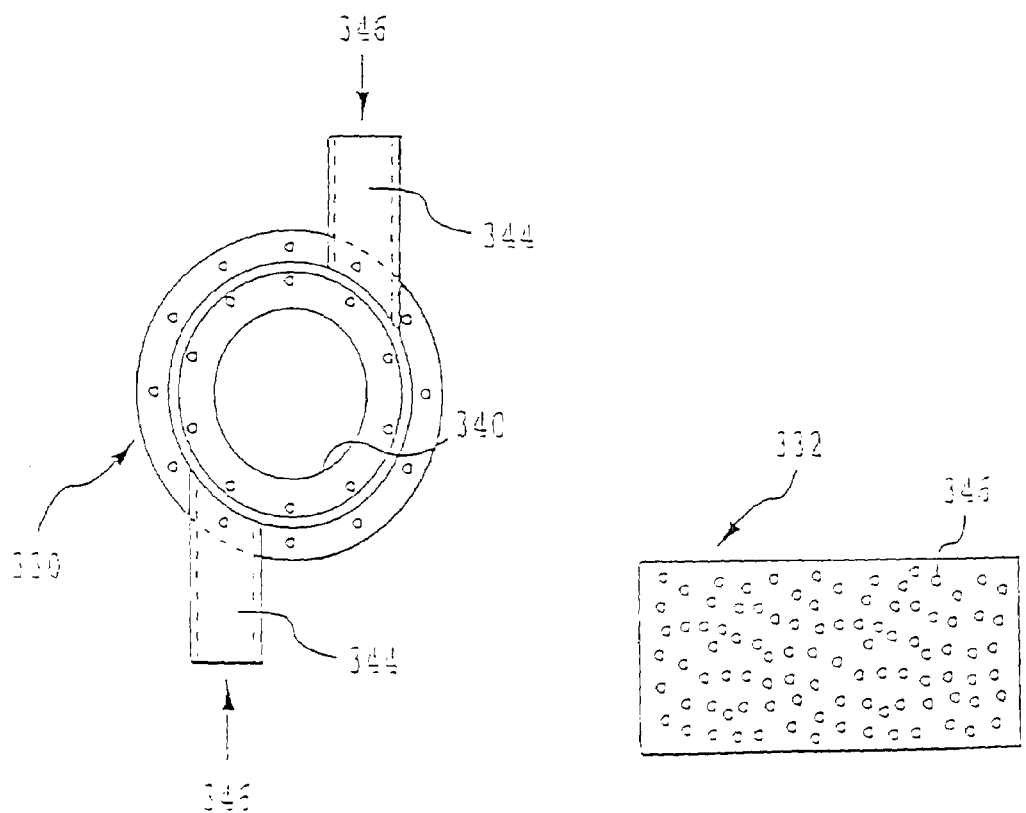
FIG. 30
FIG. 31

VIEWING DIRECTION

DIRECT-WRITE DEPOSITION OF PHOSPHOR POWDERS

The present application claims priority from U.S. Provisional Application Ser. No. 60/118,038, filed Feb. 1, 1999. The present application also claims priority as a continuation-in-part of U.S. patent application Ser. No. 09/141,393 filed Aug. 27, 1998, now U.S. Pat. No. 6,197,218, U.S. patent application Ser. No. 09/141,405 filed Aug. 27, 1998, now U.S. Pat. No. 6,168,731, U.S. patent application Ser. No. 09/140,525 filed Aug. 27, 1998, now U.S. Pat. No. 6,193,908 and U.S. patent application Ser. No. 09/141,386 filed Aug. 27, 1998, now U.S. Pat. No. 6,210,604, each of which is a continuation-in-part of U.S. patent application Ser. No. 09/030,060 filed Feb. 24, 1998, now U.S. Pat. No. 6,153,123, U.S. patent application Ser. No. 09/028,603 filed Feb. 24, 1998, now U.S. Pat. No. 6,180,029 and U.S. patent application Ser. No. 09/030,057 filed Feb. 24, 1998, now U.S. Pat. No. 6,338,809, each of which claim priority to U.S. Provisional Patent Application No. 60/038,262 filed Feb. 24, 1997 and U.S. Provisional Patent Application No. 60/039,450 filed Feb. 24, 1997.

BACKGROUND OF THE INVENTION

1. Field of the Invention

The present invention relates to flowable liquid suspensions of phosphor powders and methods for the deposition of phosphor powders from such liquid suspensions using direct-write tools such as an ink-jet or similar device. The present invention is also directed to articles of manufacture, such as displays and security indicia, formed by direct-write deposition of phosphor powders.

2. Description of Related Art

Phosphors are compounds that are capable of emitting useful quantities of radiation in the visible and/or ultraviolet spectrums upon excitation of the material by an external energy source. Due to this property, phosphor compounds have long been utilized in cathode ray tube (CRT) screens for televisions and similar devices. Typically, phosphor compounds include a host material doped with a small amount of an activator ion. A wide variety of phosphor compounds are known and many different colors can be provided.

Phosphor powders are also utilized in many advanced display devices that provide illuminated text, graphics or video output, including flat panel display devices such as liquid crystal displays, plasma displays, thick film and thin film electroluminescent displays and field emission displays.

Liquid crystal displays (LCD's) use a low powder electric field to modify a light path and are commonly used in wristwatches, pocket televisions, gas pumps, pagers and the like. Plasma displays utilize a gas, trapped between transparent layers, that emits ultraviolet light when excited by an electric field. The ultraviolet light stimulates phosphors on the screen to emit visible light. Plasma displays are particularly useful for larger displays, such as greater than about 20 diagonal inches. Thin film and thick film electroluminescent displays (TFEL's) utilize a film of phosphorescent material, trapped between glass plates and electrodes, that emits light under an applied electric field. Such displays are typically used in commercial transportation vehicles, factory floors and emergency rooms. Field emission displays (FED's) are similar in principle to CRT's, in which electrons emitted from a tip excite phosphors, which then emit light of different color. Phosphor powders are also utilized in electroluminescent lamps (EL's), which include a phosphor powder layer deposited on a polymer substrate in which the powder emits light when an electric field is applied.

Many of the foregoing devices are produced using complicated and labor-intensive production steps for the deposition of the phosphor powders. For example, many of these devices are formed by depositing the phosphor powder using a thick-film paste method. In this method, a past containing the phosphor particles is deposited by squeezing the paste through a porous screen having a desired pattern of apertures. Other methods include depositing the phosphor powder electrophoretically or by selectively coating the display screen with a slurry. Presently, there are no faster or more adaptable processes for depositing the phosphor powder. Further, there are no known processes that permit the rapid prototyping of new devices, particularly since the formation of a screen for applying a thick film paste or the patterning steps for slurry deposition are costly and labor intensive.

In addition to display applications, phosphors can also be used to create security indicia for deterring fraud and counterfeiting. In this application, phosphors which are not visible under normal lighting conditions can be illuminated by ultraviolet light, or the like, to positively identify an article by the indicia pattern and/or the wavelength of the emitted light.

For example, U.S. Pat. No. 5,569,317 by Sarada et al. discloses fluorescent and phosphorescent tagged inks for indicia, such as postal indicia used to stamp envelopes. The inks can include fluorescent and phosphorescent organic dyes and can also include phosphorescent compounds such as rare earth metal sulfides. It is disclosed that the inks can be applied using a variety of known methods.

U.S. Pat. No. 5,792,380 by Wen et al. discloses an ink-jet printing composition including a detectable label material. The detectable label material is a magnetic material, such as a ferric oxide.

The deposition of phosphor powders using a direct-write tool such as an ink-jet has not between successfully carried out, primarily due to the need for phosphor powder having acceptable physical and luminescent characteristics. It would be advantageous to provide compositions and methods for depositing phosphor particles in a manner such that devices, such as flat panel displays, could be more easily produced or prototyped and so that secured articles can be easily produced using luminescent compositions that are not normally visible but are detectable using ultraviolet light or other means.

BRIEF DESCRIPTION OF THE DRAWINGS

FIG. 29 is a top view of a gas quench cooler of the present invention.

FIG. 30 is an end view of the gas quench cooler shown in FIG. 29.

FIG. 31 is a side view of a perforated conduit of the quench cooler shown in FIG. 29.

FIG. 37 illustrates a pixel region of a CRT display.

FIG. 38 illustrates an electroluminescent display according to an embodiment of the present invention.

FIG. 39 illustrates an electroluminescent lamp according to an embodiment of the present invention.

FIG. 40 schematically illustrates a field emission display according to an embodiment of the present invention.

FIG. 41 schematically illustrates a plasma display panel according to an embodiment of the present invention.

FIG. 42 illustrates pixel regions on a flat panel display according to the prior art.

FIG. 43 illustrates pixel regions on a flat panel display according to an embodiment the present invention.

FIG. 44 is a photomicrograph of a line of phosphor particles deposited with an ink-jet device according to an embodiment of the present invention.

FIG. 45 is a photomicrograph of the phosphor line of FIG. 44 at a reduced magnification.

FIG. 46 is a photomicrograph of dots of phosphor particles deposited with an ink-jet device according to the present invention.

FIG. 47 is a photomicrograph of the drops of FIG. 44 at a reduced magnification.

FIG. 48 is a photomicrograph of the drops of FIG. 44 at an increased magnification.

FIG. 49 is a photomicrograph of a line of phosphor particles deposited with an ink-jet according to an embodiment of the present invention.

FIG. 50 is a photomicrograph of the phosphor line of FIG. 49 at an increased magnification.

DETAILED DESCRIPTION OF THE INVENTION

The present invention is directed to methods and compositions for applying phosphor powders to a surface using a direct-write tool. As used herein, a direct-write tool is a device that deposits a liquid or liquid suspension onto a surface by ejecting the composition through an orifice toward the surface without contacting the surface. The direct-write device is preferably controllable over an X-Y grid. A preferred direct-write tool according to the present invention is an ink-jet device. Other examples of direct-write tools include automated syringes, such as the MICROPEN tool, available from Ohmcraft, Inc. Honeoye Falls, N.Y.

The invention is also directed to novel articles of manufacture fabricated using a direct-write tool to deposit phosphor particles. The phosphor particles advantageously have a small size and a spherical morphology. As a result, the direct write tool is capable of printing features having a reduced size, a higher packing density, a higher resolution and an improved luminescent intensity. The apparent density of the particles can also be controlled so that the particles can be suspended in a liquid vehicle for use in the direct-write tool.

A preferred direct-write tool according to the present invention is an ink-jet device. Ink-jet devices operate by generating droplets of ink and directing the droplets toward a surface. The position of the ink-jet head is carefully controlled and can be highly automated so that discrete patterns of the ink can be applied to the surface. Ink-jet printers are capable of printing at a rate of 1000 drops per second or higher and can print linear features with good resolution at a rate of 10 centimeters per second or more. Each drop generated by the ink-jet head includes approximately 100 picoliters of the liquid which is delivered to the surface. For these and other reasons, ink-jet devices are highly desirable means for depositing materials onto an article.

Typically, an ink-jet device includes an ink-jet head with one or more orifices having a diameter of less than about 100

Figure 1:
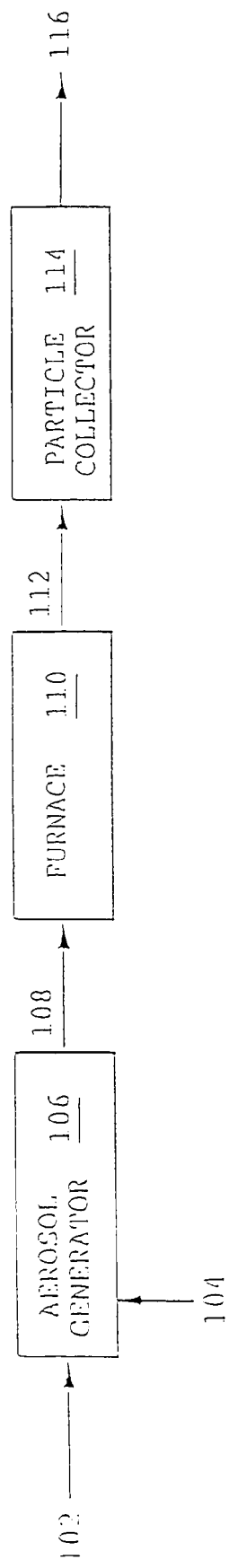
FIG. 1 is a process block diagram showing one embodiment of the process of the present invention.

μm, such as from about 50 μm to 75 μm. Ink in the form of droplets is directed through the orifice toward the surface being printed. Ink-jet printers typically utilize a piezoelectric driven system to generate droplets, although other variations are also used. Ink-jet devices are described in more detail in, for example, U.S. Pat. No. 4,627,875 by Kobayashi et al. and U.S. Pat. No. 5,329,293 by Liker, each of which is incorporated herein by reference in their entirety. However, such devices have primarily been used to deposit inks of soluble dyes and have not successfully been used to deposit particulates.

One embodiment of the present invention is directed to liquid suspensions of fine phosphor particles wherein the particles preferably have a spherical morphology and a low apparent density. Preferably, the particles also have a small average particle size and a narrow particle size distribution. This unique combination of properties enables the phosphor particles to be deposited onto an article using a direct-write tool such as an ink-jet. The phosphor compounds according to the present invention have many advantages over fluorescent and phosphorescent organic dyes, including resistance to degradation when subjected to heat or radiation.

There are many difficulties associated with depositing particulates, such as phosphor particles, using a direct-write tool. Dense particles tend to quickly settle out of the liquid vehicle leading to a short shelf-life for the suspensions. Further, large particles and particle agglomerates tend to clog the orifices of the direct-write tool. As a result, phosphor particles have not been readily deposited using such devices.

As is discussed above, phosphor compounds are those that emit light of a particular wavelength upon stimulation by an external energy source. Most phosphor compounds include a host material (e.g. $Y_2O_3$) that is carefully doped with an activator ion (e.g. Eu). Phosphors can be classified by their phosphorescent properties and the present invention is applicable to all types of phosphors. For example, electroluminescent phosphors are phosphors that emit light upon stimulation by an electric field. These phosphors are used for thin-film and thick-film electroluminescent displays, back lighting for LCD's and electroluminescent lamps used in wrist watches and the like. Cathodoluminescent phosphors emit light upon stimulation by electron bombardment. These phosphors are utilized in CRT's (e.g. common televisions, computer screens and medical imaging devices) and FED's. Photoluminescent phosphors emit light upon stimulation by other light. The stimulating light usually has higher energy than the emitted light. For example, a photoluminescent phosphor can emit visible light when stimulated by ultraviolet light. These phosphors are utilized in plasma display panels and common fluorescent lamps.

Up-converter phosphors also emit light upon stimulation by other light, but usually light of a lower energy than the emitted light. For example, infrared light can be used to stimulate an up-converter phosphor which then emits visible or ultraviolet light. Up-convertor phosphors typically include at least 2 activator ions which convert the lower energy infrared light. These materials are useful in immunoassay and security applications. Similarly, x-ray phosphors are utilized to convert x-rays to visible light and are useful for medical diagnostics.

The present invention is applicable to all types of the foregoing phosphors and the following represents some of these phosphor compounds, however, the present invention is not limited to these specific examples.

Examples of metal oxide phosphor compounds include $Y_2O_3$:Eu, ZnO:Zn, $Y_3Al_5O_{12}$:Tb and barium aluminates, such as $BaMgAl_{14}O_{23}$:Eu. Examples of metal silicate phosphors include silicates such as $Zn_2SiO_4$:Mn, $Ca_2SiO_4$:Eu, $Ba_2SiO_4$:Eu, $Gd_2SiO_5$:Ce and $Y_2SiO_5$:Ce. Examples of metal borate phosphors include (Y,Gd)$BO_3$:Eu. An example of a titanate-based phosphor is $CaTiO_3$:RE, where RE is a rare-earth element. Further examples of preferred oxygen-containing phosphor host materials and activator ions are listed in Table I.

TABLE I

Examples of Oxygen-Containing Phosphor Materials

| Host Material | Activator Ion | Color |
|---|---|---|
| ZnO | Zn | Green |
| $Y_2O_3$ | Eu | Red |
| $BaMgAl_{14}O_{23}$ | Eu | Blue |
| $Y_3Al_5O_{12}$ | Tb | Green |
| $Zn_2SiO_4$ | Mn | Green |
| $Ca_2SiO_4$ | Eu | Green |
| $Ba_2SiO_4$ | Eu | Green |
| $Y_2SiO_5$ | Ce | Blue |
| (Y, Gd) $BO_3$ | Eu | Red |

Other phosphor compounds are based on sulfide compounds. For example, sulfide phosphor host materials for some display applications include the metal sulfides, particularly the Group 2 metal sulfides (e.g. CaS, SrS, BaS and MgS) and the Group 12 metal sulfides (e.g. ZnS and CdS). For such metal sulfides, preferred activator ions can be selected from the rare-earth elements (e.g. La, Ce, Pm, Eu, Gd, Tb, and Yb), preferably Eu or Tb, particularly for Group 2 metal sulfides. The activator ion can also be selected from Cu, Mn, Ag, Al, Au, Ga and Cl. Mixtures of these activator ions can advantageously be used, particularly for up-convertor phosphors.

ZnS is particularly preferred for many cathodoluminescent display applications, particularly those utilizing high voltages (i.e. greater than about 2000 volts), due primarily to the high brightness of ZnS. ZnS is typically doped with Cu, Ag, Al, Au, Cl or mixtures thereof. For example, ZnS:Ag is a common cathodoluminescent phosphor used to produce blue light in a CRT display device.

In addition, mixed-metal sulfides of the general form $M^1_xM^2_{1-x}S$, wherein $M^1$ and $M^2$ are Group 2 metals (e.g. $Mg_xSr_{1-x}S$ or $Ca_xSr_{1-x}S$) or wherein $M^1$ and $M^2$ are Group 12 metals (e.g., $Zn_xCd_{1-x}S$) are also applicable to the present invention. Complex mixed metal sulfides, for example $Ba_xSr_yCa_{1-x-y}S$ can also be used.

Other sulfur-containing phosphor compounds that can be deposited using a direct-write tool according to the present invention include thiogallates of the form $MGa_2S_4$ wherein M can be Ca, Sr, Ba, Mg or mixtures thereof. Such compounds are typically doped with a rare-earth as an activator ion. Preferred examples include $SrGa_2S_4$:Eu (green), $SrGa_2S_4$:Ce (blue), $CaGa_2S_4$:Eu and $CaGa_2S_4$:Ce (blue-green). As with the mixed-metal sulfides, mixed metal thiogallates can be produced, such as $Ca_xSr_{1-x}Ga_2S_4$. Further, thiogallates include compounds wherein aluminum or indium substitute for gallium in the structure, such as $CaAl_xGa_{2-x}S_4$, $CaIn_xGa_{2-x}S_4$, $SrAl_xGa_{2-x}S_4$ or $CaAl_xGa_{2-x}S_4$. The substitution of various amounts of aluminum or indium for gallium can advantageously adjust the chromaticity (color) of the phosphor compound.

Oxysulfides, such as $Y_2O_2S$:Eu or Tb and rare-earth oxysulfides such as $Gd_2O_2S$:Tb and $La_2O_2S$:Tb can also be deposited using a direct-write tool in accordance with the present invention. Some preferred sulfur-containing phosphor host materials and activator ions are listed in Table II.

TABLE II

Examples of Sulfide-Based Phosphors

| Host Material | Activator Ion | Color |
|---|---|---|
| BaS | Ce | Yellow |
| CaS | Ce | Green |
| CaS | Mn | Yellow |
| SrS | Ce | Blue-Green |
| $Mg_xSr_{1-x}S$ | Ce | Blue-Green |
| ZnS | Cu | Blue-Green |
| $Y_2O_2S$ | Eu | Red |
| $SrGa_2S_4$ | Eu | Green |
| $SrGa_2S_4$ | Ce | Blue |

The phosphor powder according to the present invention include particles having a small average particle size such that the particles can be deposited using a direct-write tool. Generally, the weight average particle size of the phosphor particles is at least about 0.1 μm, such as at least about 0.3 μm. Further, the average particle size is preferably not greater than about 20 μm. For most applications, the weight average particle size is more preferably not greater than about 10 μm. A particularly preferred average particle size is from about 1 μm to about 5 μm. According to one embodiment of the present invention, it is preferred that the average size of the phosphor particles is at least 10 times smaller than the orifice diameter in the direct-write tool, such as smaller than about 5 μm for an ink-jet head having a 50 μm orifice.

According to a preferred embodiment of the present invention, the phosphor particles have a narrow particle size distribution, such that the majority of particles are about the same size. A narrow size distribution is particularly advantageous for direct-write applications due to reduced clogging of the orifice by large particles and due to the ability to form surface features having a fine line width, high resolution and high packing density. Preferably, at least about 80 weight percent and more preferably at least about 90 weight percent of the phosphor particles are not larger than twice the weight average particle size. Thus, when the average particle size is about 2 μm, it is preferred that at least about 80 weight percent of the phosphor particles are not larger than 4 μm and it is more preferred that at least about 90 weight percent of the phosphor particles are not larger than 4 μm. Further, it is preferred that at least about 80 weight percent and more preferably at least about 90 weight percent of the phosphor particles are not larger than about 1.5 times the weight average particle size. Thus, when the average particle size is about 2 μm, it is preferred that at least about 80 weight percent of the phosphor particles are not larger than 3 μm and it is more preferred that at least about 90 weight percent of the phosphor particles are not larger than 3 μm.

It is also possible to provide a phosphor powder batch having a bimodal particle size distribution. That is, the powder batch can include particles having two distinct and different average particle sizes. Preferably, each of the distinct particle size distributions will meet the foregoing limitations. A bimodal particle size distribution can advantageously enhance the packing efficiency of the powder when it is deposited using a direct-write tool.

It is known that micrometer-sized particles often form soft agglomerates as a result of their relatively high surface energy, as compared to larger particles. It is also known that such soft agglomerates may be disposed easily by treatments such as exposure to ultrasound in a liquid medium or sieving. The average particle size and particle size distributions described herein are measured by mixing samples of the powders in a liquid medium, such as water and a surfactant, and exposing the suspension to ultrasound through either an ultrasonic bath or horn. The ultrasonic treatment supplies sufficient energy to disperse the soft agglomerates into primary spherical particles. The primary particle size and size distribution are then measured by light scattering in a Microtrac instrument. This provides a good measure of the useful dispersion characteristics of the powder because this simulates the dispersion of the particles in a liquid vehicle, such as an ink-jet suspension. Thus, the references to particle size herein refer to the primary particle size, such as after lightly dispersing soft agglomerates of the particles.

The phosphor particles according to the present invention also have a high degree of purity and it is preferred that the particles include not greater than about 0.1 atomic percent impurities and more preferably not greater than about 0.01 atomic percent impurities. Impurities are those materials that are not intended in the final product and that negatively affect the properties of the phosphor. As is discussed below, it will be appreciated that the phosphor particles can be composite particles including one or more second phases that modify the physical characteristics or settling properties of the particles. Such second phases are not considered impurities.

The phosphor particles should remain well-dispersed in the liquid vehicle for extended periods of time. For example, the ink-jet cartridge into which a liquid suspension is placed should have along shelf-life. In some instances, substantially fully dense phosphor particles can be adequately suspended. Depending upon the density of the phosphor compound, however, dense particles having a size in excess about 0.5 μm may not be capable of suspension in a liquid that has a sufficiently low viscosity to be deposited using a direct-write tool. In most cases, the apparent density of the particles must therefore be substantially lower than the theoretical density.

More specifically, it is desirable to maintain a substantially neutral buoyancy of the phosphor particles in the suspension. Stated another way, it is desirable to provide phosphor particles having a low settling velocity. The setting velocity of particles is proportional to the apparent density of the particle ($\rho_p$) minus the density of the liquid ($\rho_L$). Ideally, the phosphor particles will have an apparent density that is approximately equal to the density of the liquid, which is typically about 1 g/cm³ (e.g., the density of water). Since the typical phosphor compound such as an oxide or sulfide has a theoretical density in the range of from about 3 to about 7 g/cm³, it is preferable that the apparent density of such particles be a small percentage of the theoretical density. According to one embodiment, the particles have an apparent density that is not greater than about 20 percent of the theoretical density of the phosphor compound, more preferably not greater than about 15 percent of the theoretical density.

One preferred method for obtaining a reduced apparent density of the phosphor particles according to the present invention is to produce particles having a hollow microstructure. That is, particles which are comprised of a dense shell having an inner radius and an outer radius. Preferably, the shell has a high density and is substantially impermeable. For such a hollow particle, the equation representing the conditions for neutral buoyancy can be written:

$$r_2 = \left[ \sqrt[3]{\frac{\rho_p}{\rho_p - 1}} \right] r_1 \tag{1}$$

where:

$r_2$=outer radius $r_1$=inner radius $\rho_L$=1 (water)

For example, if a hollow particle has an outer radius of 2 μm (4 μm diameter) and a density of 5 g/cm$^3$, then the optimum average wall thickness would be about 0.15 μm for the particle to be neutrally buoyant in a liquid having a density of 1 g/cm$^3$. According to one preferred embodiment, the hollow particles have an average wall thickness that is not greater than about 5 percent of the particle diameter.

Although hollow particles are preferred according to the present invention, it will be appreciated that other particle morphologies can be utilized while maintaining an apparent density within the desired range. For example, the particles could have a sufficient amount of closed porosity to yield a particle having an apparent density that is lower than the theoretical density. Open (surface) porosity can also decrease the apparent density if the surface tension of the liquid medium does not permit penetration of the pores.

In a further embodiment, the phosphor particle could be a composite particle including the phosphor compound and a hydrophillic compound, such as silica ($SiO_2$). A hydrophillic compound advantageously increases the buoyancy of the particle in an aqueous suspension. In most cases the hydrophillic compound is preferably deposited on the surface of the phosphor compound. However, in some instances, such as when the phosphor is utilized in an FED, deposition of such compounds may be detrimental to the luminescent characteristics of the powder. As is discussed in more detail hereinbelow, the phosphor powders according to the present invention are made utilizing a spray pyrolysis technique, preferably in the presence of water vapor. The presence of water vapor during formation of the particles advantageously can result in a hydroxylated surface. Such a hydroxylated surface provides further hydrophilicity of the particle and aids in the suspension of the particles.

Thus, the phosphor particles according to the present invention have a low settling velocity in the liquid medium. The settling velocity according to Stokes' Law can be defined as:

$$V = \frac{D_{st}^2(\rho_{es} - \rho_l)g}{18\eta}$$

where $D_{st}$=Stokes' diameter

η=fluid viscosity $\rho_s$=density of the solid $\rho_l$=density of the liquid

V=settling velocity g=acceleration due to gravity

Preferably, the average settling velocity of the particles is sufficiently low such that the suspensions have a useful shelf-life without the necessity of mechanical mixing techniques. Thus, it is preferred that a large mass fraction of the particles, such as at least about 50 weight percent, remains suspended in the liquid for an extended period of time.

The phosphor particles according to a preferred embodiment of the present invention are also substantially spherical in shape. That is, the particles are not jagged or irregular in shape. Spherical particles are particularly advantageous because they are able to disperse more readily in a liquid suspension and impart advantageously flow characteristics to the suspension, particularly for deposition using a direct-write tool. For a given level of solids-loading, a liquid suspension of spherical particles will have a lower viscosity than a printing composition having non-spherical particles. Spherical particles are also less abrasive than jagged particles, reducing the amount of abrasion and wear on the direct-write tool.

In addition, the phosphor particles according to the present invention are substantially unagglomerated, that is, they include substantially no hard agglomerates of particles. Hard agglomerates are physically coalesced lumps of two or more particles that behave as one large particle. Agglomerates are disadvantageous for direct-write applications since large agglomerates can clog the orifice of the tool and can affect the minimum average line width that can be deposited with the tool. It is preferred that no more than about 1.0 weight percent of the phosphor particles of the present invention are in the form of hard agglomerates. More preferably, no more than about 0.5 weight percent of the phosphor particles are in the form of hard agglomerates.

A preferred method for forming the phosphor particles according to the present invention is to utilize a spray pyrolysis technique. A preferred spray pyrolysis technique is described in detail in U.S. patent application Ser. No. 09/030,057, which is commonly owned with the present application and which is incorporated herein by reference in tis entirety.

Generally, spray pyrolysis involves the generation of an aerosol of liquid precursors to the phosphor compound. Phosphor powders can be produced by spray pyrolysis that have high purity and a homogenous chemical composition. Preferably, the powders are produced in a substantially unagglomerated state without the necessity of a milling step to reduce primary particle size or agglomeration. Advantageously, the morphology of the particles can be controlled such that hollow and or porous particles can be produced as well as substantially dense particles.

Spray pyrolysis includes atomizing the precursor solution to form droplets, preferably with an ultrasonic atomizer. The droplets are then passed through a hot-wall reactor, such as a tubular furnace, in which the solvent evaporates and the precursors react to form the desired phosphor compound. The particles are then collected, for example in a heated filter. The average particle size can be tightly controlled by adjusting process parameters such as the concentration of precursor in solution and the frequency of the ultrasonic atomizers. The final particle size distribution is controlled by controlling the size distribution of droplets in the aerosol, for example by using an impactor to remove large droplets and carefully controlling the frequency of the ultrasonic transducers. Hollow or porous particles can be produced by adjusting the reactor temperature, residence time or reagent solubility in the precursor solution. The result is a powder with a small average size, narrow size distribution and a spherical morphology.

More specifically, a liquid-containing feed, including at least one precursor for the desired phosphor compound, is converted to aerosol form, with droplets of the medium being dispersed in and suspended by a carrier gas. Liquid from the droplets in the aerosol is then removed to permit formation in a dispersed state of the particles. The term powder is often used herein to refer to the particulate product of the present invention. The use of the term powder does not indicate, however, that the particulate product must be dry or in any particular environment. Although the particulate product is typically manufactured in a dry state, the particulate product may, after manufacture, be placed in a wet environment, such as in a liquid suspension for a direct-write tool.

The process described herein is particularly well suited for the production of finely divided phosphor particles having a small weight average size. In addition to making particles within a desired range of weight average particle size, the particles may be produced with a narrow size distribution, thereby providing size uniformity that is desired for many applications.

In addition to control over particle size and size distribution, the method provides significant flexibility for producing phosphor particles of varying composition and crystallinity.

Referring now to FIG. 1, one embodiment of the process of the present invention is described. A liquid feed 102, including at least one precursor for the desired particles, and a carrier gas 104 are fed to an aerosol generator 106 where an aerosol 108 is produced. The aerosol 108 is then fed to a furnace 110 where liquid in the aerosol 108 is removed to produce particles 112 that are dispersed in and suspended by gas exiting the furnace 110. The particles 112 are then collected in a particle collector 114 to produce a particulate product 116.

As used herein, the liquid feed 102 is a feed that includes one or more flowable liquids as the major constituent(s), such that the feed is a flowable medium. The liquid feed 102 need not comprise only liquid constituents. The liquid feed 102 may comprise only constituents in one or more liquid phase, or it may also include particulate material suspended in a liquid phase. The liquid feed 102 must, however, be capable of being atomized to form droplets of sufficiently small size for preparation of the aerosol 108. Therefore, if the liquid feed 102 includes suspended particles, those particles should be relatively small in relation to the size of droplets in the aerosol 108. Such suspended particles should typically be smaller than about 1 μm in size, preferably smaller than about 0.5 μm in size, and more preferably smaller than about 0.3 μm in size and most preferably smaller than about 0.1 μm in size. Most preferably, the suspended particles should be colloidal. The suspended particles could be finely divided particles, or could be agglomerates of smaller primary particles. For example, 0.5 μm particles could be agglomerates of nanometer-sized primary particles. When the liquid feed 102 includes suspended particles, the particles typically comprise no greater than about 10 weight percent of the liquid feed.

As noted, the liquid feed 102 includes at least one precursor for preparation of the particles 112. The precursor may be a substance in either a liquid or solid phase of the liquid feed 102. As is discussed in more detail below, the precursor will preferably be a material, such as a salt, dissolved in a liquid solvent of the liquid feed 102. The precursor may undergo one or more chemical reactions in the furnace 110 to assist in production of the particles 112. Alternatively, the precursor material may contribute to formation of the particles 112 without undergoing a chemical reaction. This could be the case, for example, when the liquid feed 102 includes, as a precursor material, suspended particles that are not chemically modified in the furnace 110. In any event, the particles 112 comprise at least one component originally contributed by the precursor.

The liquid feed 102 may include multiple precursor materials, which may be present together in a single phase or separately in multiple phases. For example, the liquid feed 102 may include multiple precursors in solution in a single liquid vehicle. Alternatively, one precursor material could be in a solid particulate phase and a second precursor material could be in a liquid phase. Also, one precursor material could be in one liquid phase and a second precursor material could be in a second liquid phase, such as could be the case when the liquid feed 102 comprises an emulsion. Different components contributed by different precursors may be present in the particles together in a single material phase, or the different components may be present in different material phases when the particles 112 are composites of multiple phases.

The carrier gas 104 may comprise any gaseous medium in which droplets produced from the liquid feed 102 may be dispersed in aerosol form. Also, the carrier gas 104 may be inert, in that the carrier gas 104 does not participate in formation of the particles 112. Alternatively, the carrier gas may have one or more active component(s) that contribute to the formation of the particles 112. In that regard, the carrier gas may include one or more reactive components that react in the furnace 110 to contribute to the formation of the particles 112. Preferred carrier gas compositions for certain phosphor particles of the present invention are discussed more fully below.

The aerosol generator 106 atomizes the liquid feed 102 to form droplets in a manner to permit the carrier gas 104 to sweep the droplets away to form the aerosol 108. The droplets comprise liquid from the liquid feed 102. The droplets may, however, also include nonliquid material, such as one or more small particles held in the droplet by the liquid.

An important aspect of the present invention is generation of the aerosol 108 with droplets of a small average size and narrow size distribution. In this manner, the particles 112 may be produced at a desired small size with a narrow size distribution, which are advantageous for many applications.

The aerosol generator 106 is capable of producing the aerosol 108 such that it includes droplets having a weight average size in a range having a lower limit of about 1 μm and preferably about 2 μm; and an upper limit of about 10 μm; preferably about 7 μm, more preferably about 5 μm and most preferably about 4 μm. A weight average droplet size in a range of from about 2 μto about 4 μm is more preferred for most applications, with a weight average droplet size of about 3 μm being particularly preferred for some applications. The aerosol generator is also capable of producing the aerosol 108 such that it includes droplets in a narrow size distribution. Preferably, the droplets in the aerosol are such that at least about 70 weight percent (more preferably at least about 80 weight percent and most preferably at least about 85 weight percent) of the droplets are smaller than about 10 μm and more preferably at least about 70 weight percent (more preferably at least about 80 weight percent and most preferably at least about 85 weight percent) are smaller than about 5 μm. Furthermore, preferably no greater than about 30 weight percent, more preferably no greater than about 25 weigh percent and most preferably no greater than about 20 weight percent, of the droplets in the aerosol 108 are larger than about twice the weight average droplet size.

Another important aspect of the present invention is that the aerosol 108 may be generated without consuming excessive amounts of the carrier gas 104. The aerosol generator 106 is capable of producing the aerosol 108 such that it has a high loading, or high concentration, of the liquid feed 102 in droplet form. In that regard, the aerosol 108 preferably includes greater than about $1 \times 10^6$ droplets per cubic centimeter of the aerosol 108, more preferably greater than about $5 \times 10^6$ droplets per cubic centimeter, still more preferably greater than about $1 \times 10^7$ droplets per cubic centimeter, and most preferably greater than about $5 \times 10^7$ droplets per cubic centimeter. That the aerosol generator 106 can produce such a heavily loaded aerosol 108 is particularly surprising considering the high quality of the aerosol 108 with respect to small average droplet size and narrow droplet size distribution. Typically, droplet loading in the aerosol is such that the volumetric ratio of liquid feed 102 to carrier gas 104 in the aerosol 108 is larger than about 0.04 milliliters of liquid feed 102 per liter of carrier gas 104 in the aerosol 108, preferably larger than about 0.083 milliliters of liquid feed 102 per liter of carrier gas 104 in the aerosol 108, more preferably larger than about 0.167 milliliters of liquid feed 102 per liter of carrier gas 104, still more preferably larger than about 0.25 milliliters of liquid feed 102 per liter of carrier gas 104, and most preferably larger than about 0.333 milliliters of liquid feed 102 per liter of carrier gas 104.

This capability of the aerosol generator 106 to produce a heavily loaded aerosol 108 is even more surprising given the high droplet output rate of which the aerosol generator 106 is capable, as is discussed more fully below. It will be appreciated that the concentration of liquid feed 102 in the aerosol 108 will depend upon the specific components and attributes of the liquid feed 102 and, particularly, the size of the droplets in the aerosol 108. For example, when the average droplet size is from about 2 µm to about 4 µm, the droplet loading is preferably larger than about 0.15 milliliters of aerosol feed 102 per liter of carrier gas 104, more preferably larger than about 0.2 milliliters of liquid feed 102 per liter of carrier gas 104, even more preferably larger than about 0.2 milliliters of liquid feed 102 per liter of carrier gas 104, and most preferably larger than about 0.3 milliliters of liquid feed 102 per liter of carrier gas 104. When reference is made herein to liters of carrier gas 104, it refers to the volume that the carrier gas 104 would occupy under conditions of standard temperature and pressure.

The furnace 110 may be any suitable device for heating the aerosol 108 to evaporate liquid from the droplets of the aerosol 108 and thereby permit formation of the particles 112. The maximum average stream temperature, or conversion temperature, refers to the maximum average temperature that an aerosol stream attains while flowing through the furnace. This is typically determined by a temperature probe inserted into the furnace. Preferred conversion temperatures according to the present invention are discussed more fully below.

The residence time should be long enough to assure that the particle 112 attain the desired maximum stream temperature for a given heat transfer rate. In that regard, with the extremely short residence times, higher furnace temperatures could be used to increase the rate of heat transfer so long as the particles 112 attain a maximum temperature within the desired stream temperature range. That mode of operation, however, is not preferred. Also, it is preferred that, in most cases, the maximum stream temperature not be attained in the furnace 110 until substantially at the end of the heating zone in the furnace 110. For example, the heating zone will often include a plurality of heating sections that are each independently controllable. The maximum stream temperature should typically not be attained until the final heating section, and more preferably until substantially at the end of the last heating section. This is important to reduce the potential for thermophoretic losses of material. Also, it is noted that as used herein, residence time refers to the actual time for a material to pass through the relevant process equipment. In the case of the furnace, this includes the effect of increasing velocity with gas expansion due to heating.

Typically, the furnace 110 will be a cylindrical tube-shaped furnace, so that the aerosol 108 moving into and through the furnace does not encounter sharp edges on which droplets could collect. Loss of droplets to collection at sharp surfaces results in a lower yield of particles 112. More important, however, the accumulation of liquid at sharp edges can result in re-release of undesirably large droplets back into the aerosol 108, which can cause contamination of the particulate product 116 with undesirably large particles. Also, over time, such liquid collection at sharp surfaces can cause fouling of process equipment, impairing process performance.

The furnace 110 may include a heating tube made of any suitable material. The tube material may be a ceramic material, for example, mullite, silica (quartz) or alumina. Alternatively, the tube may be metallic. Advantages of using a metallic tube are low cost, ability to withstand steep temperature gradients and large thermal shocks, machinability and weldability, and ease of providing a seal between the tube and other process equipment. Disadvantages of using a metallic tube include limited operating temperature and increased reactivity in some reaction systems. One type of tube that is particularly useful according to the present invention is a lined metallic tube, such as a metal tube whose interior surface is lined with alumina.

When a metallic tube is used in the furnace 110, it is preferably a high nickel content stainless steel alloy, such as a 330 stainless steel, or a nickel-based super alloy. As noted, one of the major advantages of using a metallic tube is that the tube is relatively easy to seal with other process equipment. In that regard, flange fittings may be welded directly to the tube for connecting with other process equipment. Metallic tubes are generally preferred for forming particles that do not require a maximum tube wall temperature of higher than about 1100° C. during particle manufacture.

Also, although the present invention is described with primary reference to a furnace reactor, which is preferred, it should be recognized that, except as noted, any other thermal reactor, including a flame reactor or a plasma reactor, could be used instead. A furnace reactor is, however, preferred, because of the generally even heating characteristic of a furnace for attaining a uniform stream temperature.

The particle collector 114, may be any suitable apparatus for collecting particles 112 to produce the particulate product 116. One preferred embodiment of the particle collector 114 uses one or more filter to separate the particles 112 from gas. Such a filter may be of any type, including a bag filter. Another preferred embodiment of the particle collector uses one or more cyclone to separate the particles 112. Other apparatus that may be used in the particle collector 114 includes an electrostatic precipitator. Also, connection should normally occur at a temperature above the condensation temperature of the gas stream in which the particles 112 are suspended.

Figure 2:
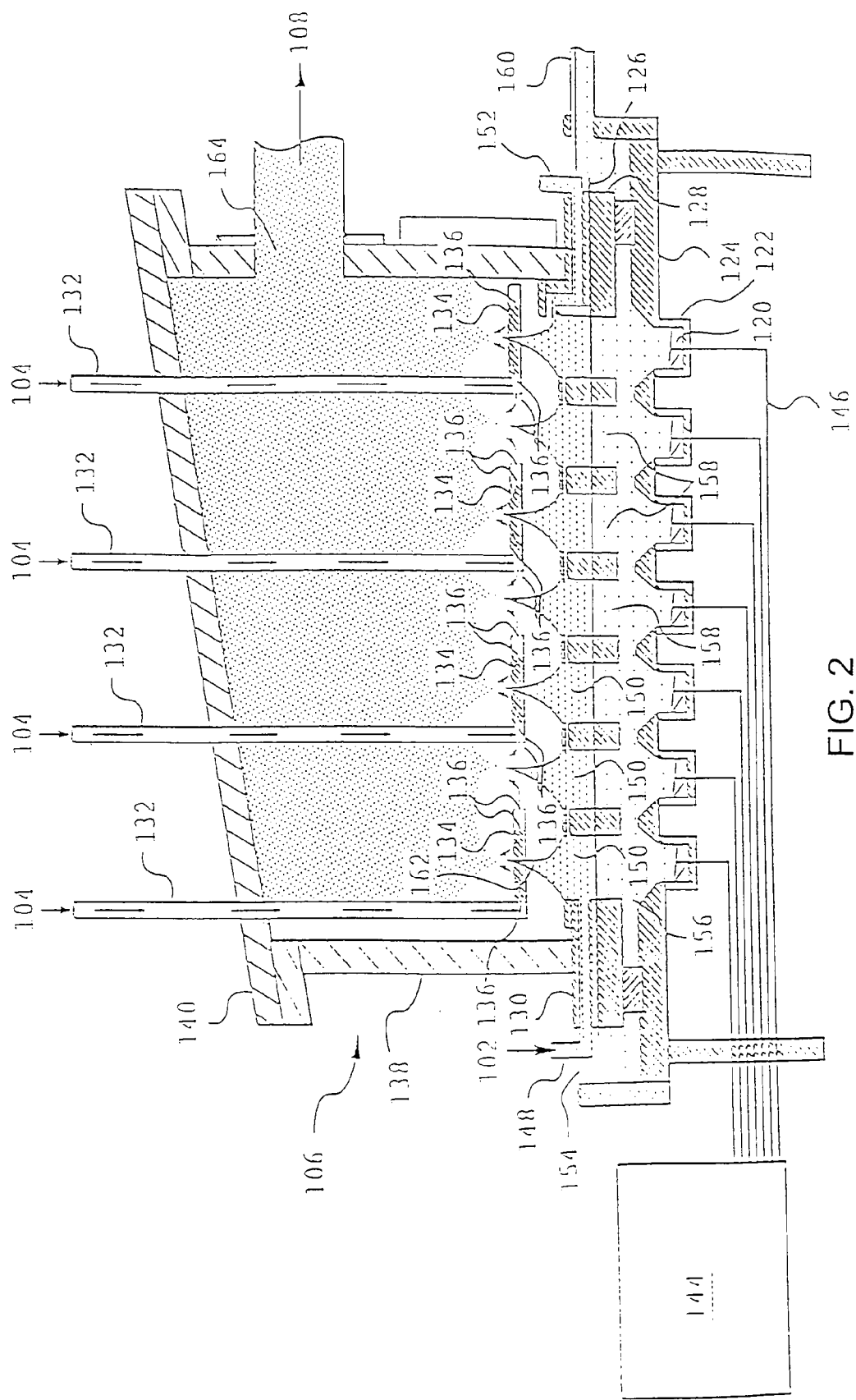
FIG. 2 is a side view in cross section of one embodiment of aerosol generator of the present invention.
Figure 3:
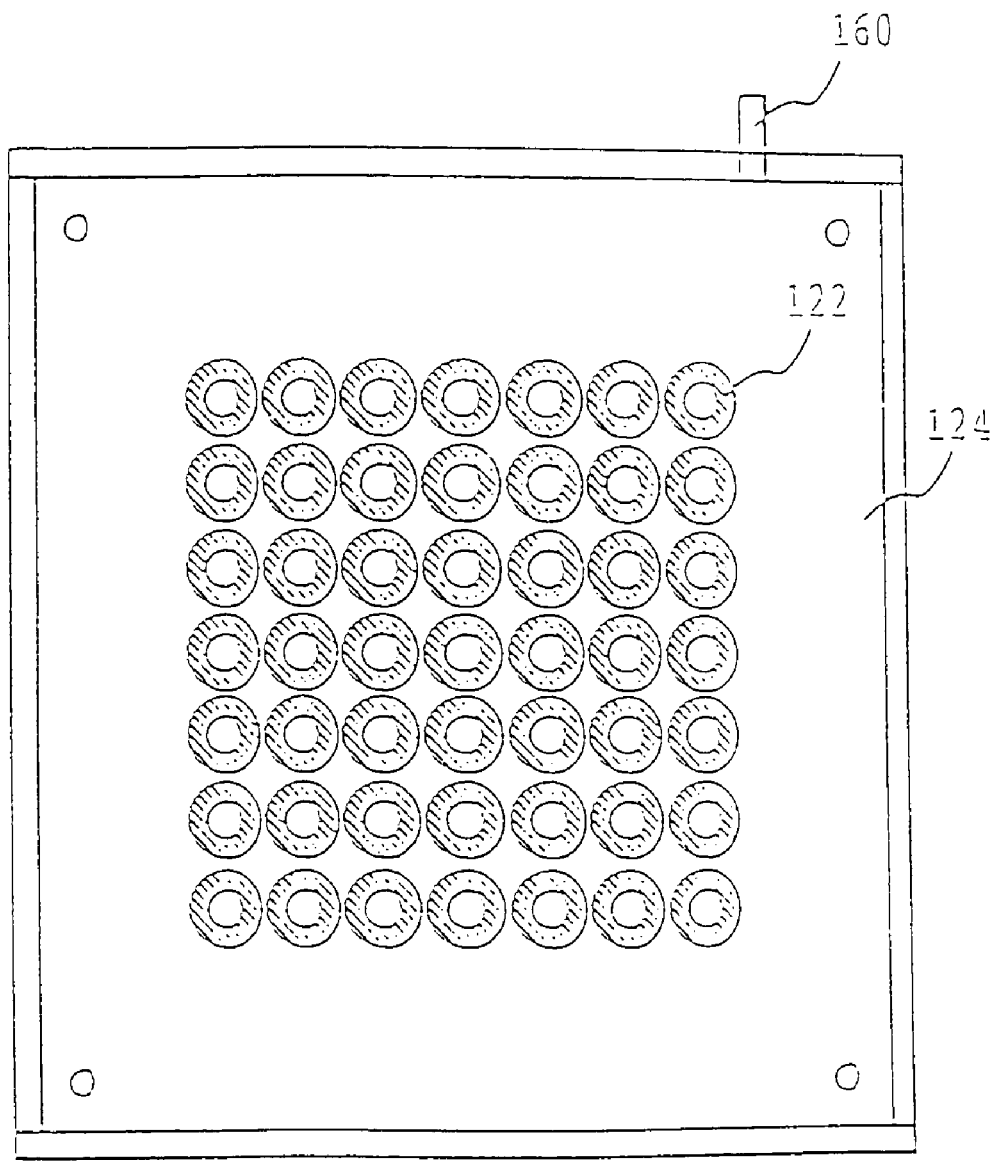
FIG. 3 is a top view of a transducer mounting plate showing a 49 transducer array for use in an aerosol generator of the present invention.
Figure 4:
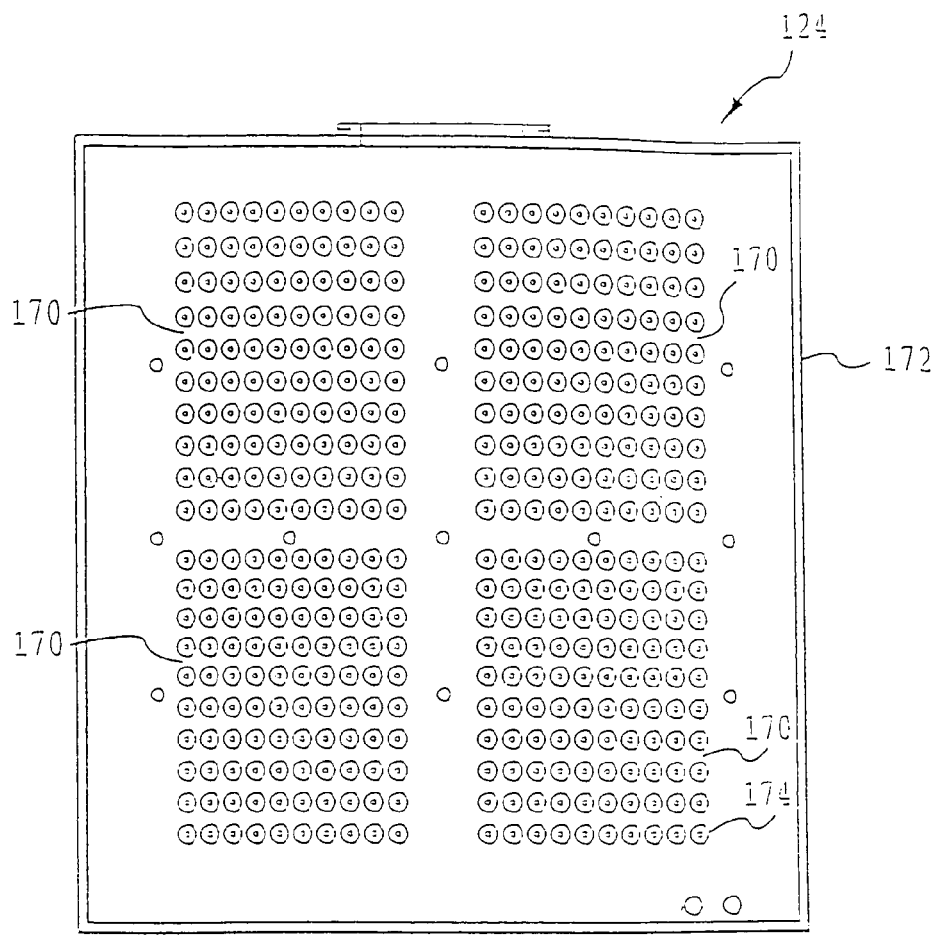
FIG. 4 is a top view of a transducer mounting plate for a 400 transducer array for use in an ultrasonic generator of the present invention.
Figure 5:
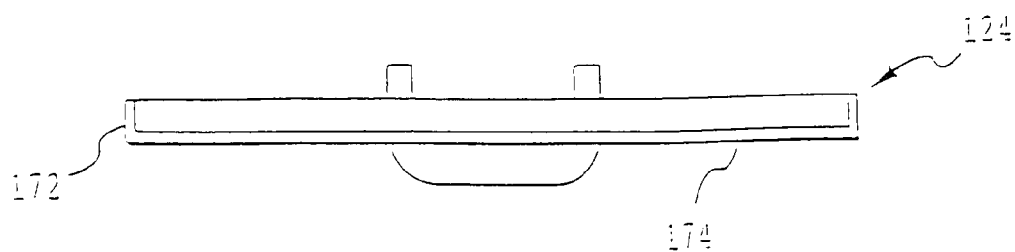
FIG. 5 is a side view of the transducer mounting plate shown in FIG. 4.
Figure 6:
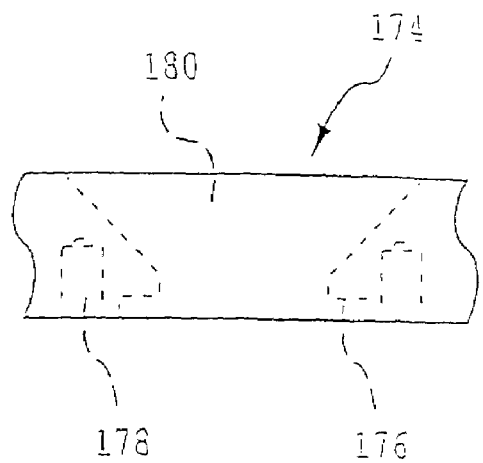
FIG. 6 is a partial side view showing the profile of a single transducer mounting receptacle of the transducer mounting plate shown in FIG. 4.
Figure 7:
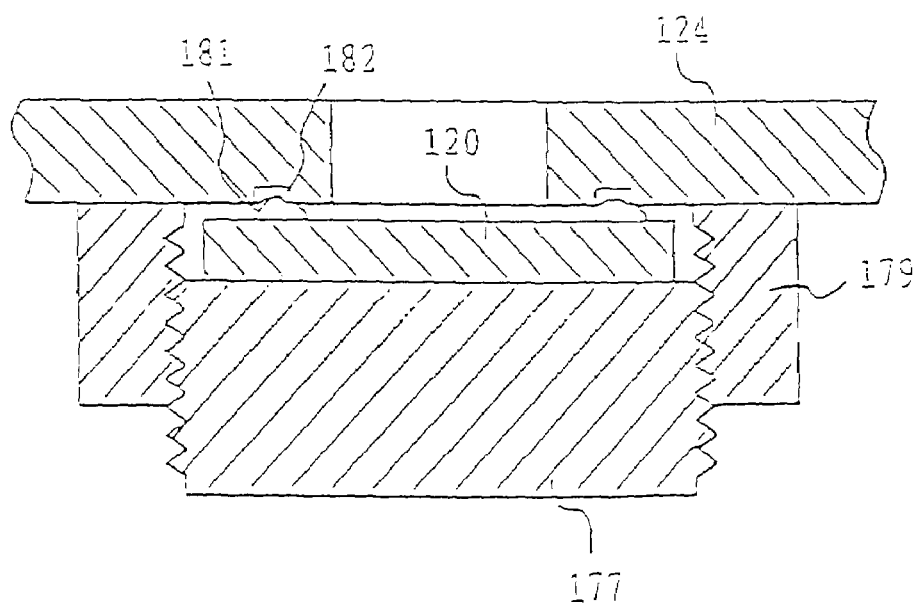
FIG. 7 is a partial side view in cross-section showing an alternative embodiment for mounting an ultrasonic transducer.
Figure 8:
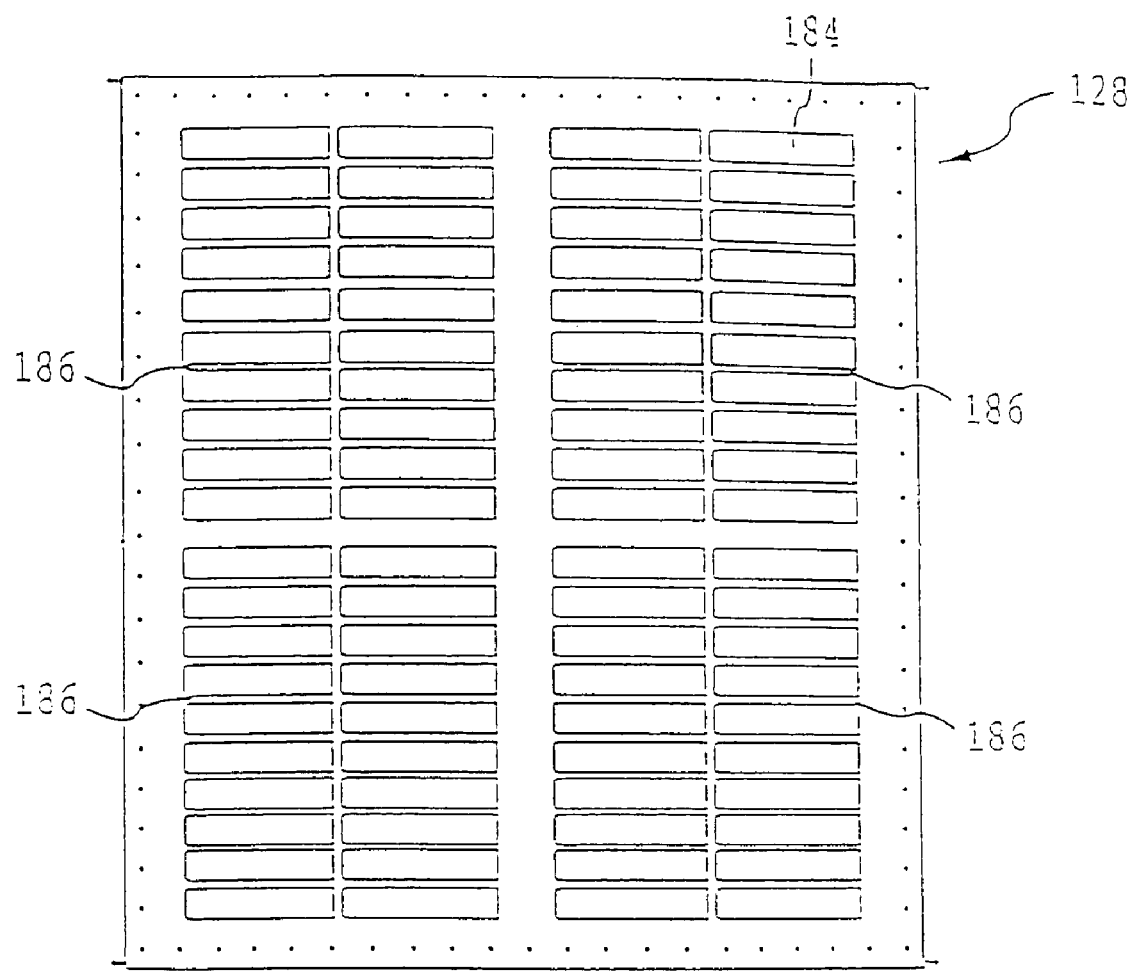
FIG. 8 is a top view of a bottom retaining plate for retaining a separator for use in an aerosol generator of the present invention.

Of significant importance to the operation of the process of the present invention is the aerosol generator 106, which must be capable of producing a high quality aerosol with high droplet loading, as previously noted. With reference to FIG. 2, one embodiment of an aerosol generator 106 of the present invention is described. The aerosol generator 106 includes a plurality of ultrasonic transducer discs 120 that are each mounted in a transducer housing 122. The transducer housings 122 are mounted to a transducer mounting plate 124, creating an array of the ultrasonic transducer discs 120. Any convenient spacing may be used for the ultrasonic transducer discs 120. Center-to-center spacing of the ultrasonic transducer discs 120 of about 4 centimeters is often adequate. The aerosol generator 106, as shown in FIG. 2, includes forty-nine transducers in a 7×7 array. The array configuration is as shown in FIG. 3, which depicts the locations of the transducer housings 122 mounted to the transducer mounting plate 124.

With continued reference to FIG. 2, a separator 126, in spaced relation to the transducer discs 120, is retained between a bottom retaining plate 128 and a top retaining plate 130. Gas delivery tubes 132 are connected to gas distribution manifolds 134, which have gas delivery ports 136. The gas distribution manifolds 134 are housed within a generator body 138 that is covered by generator lid 140. A transducer driver 144, having circuitry for driving the transducer discs 120, is electronically connected with the transducer discs 120 via electrical cables 146.

During operation of the aerosol generator 106, a shown in FIG. 2, the transducer discs 120 are activated by the transducer driver 144 via the electrical cables 146. The transducers preferably vibrate at a frequency of from about 1 MHz to about 5 MHz, more preferably from about 1.5 MHz to about 3 MHz. Commonly used frequencies are at about 1.6 MHz and about 2.4 MHz. Furthermore, all of the transducer discs 110 should be operating at substantially the same frequency when an aerosol with a narrow droplet size distribution is desired. This is important because commercially available transducers can vary significantly in thickness, sometimes by as much as 10%. It is preferred, however, that the transducer discs 120 operate at frequencies within a range of 5% above and below the median transducer frequency, more preferably within a range of 2.5%, and most preferably within a range of 1%. This can be accomplished by careful selection of the transducer discs 120 so that they all preferably have thicknesses within 5% of the median transducer thickness, more preferably within 2.5%, and most preferably within 1%.

Liquid feed 102 enters through a feed inlet 148 and flows through flow channels 150 to exit through feed outlet 152. An ultrasonically transmissive fluid, typically water, enters through a water inlet 154 to fill a water bath volume 156 and flow through flow channels 158 to exit through a water outlet 160. A proper flow rate of the ultrasonically transmissive fluid is necessary to cool the transducer discs 120 and to prevent overheating of the ultrasonically transmissive fluid. Ultrasonic signals from the transducer disc 120 are transmitted, via the ultrasonically transmissive fluid, across the water bath volume 156, and ultimately across the separate 126, to the liquid feed 102 in flow channels 150.

The ultrasonic signals from the ultrasonic transducer discs 120 cause atomization cones 162 to develop in the liquid feed 102 at locations corresponding with the transducer discs 120. Carrier gas 104 is introduced into the gas delivery tubes 132 and delivered to the vicinity of the atomization cones 162 via gas delivery ports 136. Jets of carrier gas exit the gas delivery ports 136 in a direction so as to impinge on the atomization cones 162, thereby sweeping away atomized droplets of the liquid feed 102 that are being generated from the atomization cones 162 and creating the aerosol 108, which exits the aerosol generator 106 through an aerosol exit opening 164.

Efficient use of the carrier gas 104 is an important aspect of the aerosol generator 106. The embodiment of the aerosol generator 106 shown in FIG. 2 includes two gas exit ports per atomization cone 162, with the gas ports being positioned above the liquid medium 102 over troughs that develop between the atomization cones 162, such that the exiting carrier gas 104 is horizontally directed at the surface of the atomization cones 162, thereby efficiently distributing the carrier gas 104 to critical portions of the liquid feed 102 for effective and efficient sweeping away of droplets as they form about the ultrasonically energized atomization cones 162. Furthermore, it is preferred that at least a portion of the opening of each of the gas delivery ports 136, through which the carrier gas exits the gas delivery tubes, should be located below the top of the atomization cones 162 at which the carrier gas 104 is directed. This relative placement of the gas delivery ports 136 is very important to efficient use of carrier gas 104. Orientation of the gas delivery ports 136 is also important. Preferably, the gas delivery ports 136 are positioned to horizontally direct jets of the carrier gas 104 at the atomization cones 162. The aerosol generator 106 permits generation of the aerosol 108 with heavy loading with droplets of the carrier liquid 102, unlike aerosol generator designs that do not efficiently focus gas delivery to the locations of droplet formation.

Another important feature of the aerosol generator 106, as shown in FIG. 2, is the use of the separator 126, which protects the transducer discs 120 from direct contact with the liquid feed 102, which is often highly corrosive. The height of the separator 126 above the top of the transducer discs 120 should normally be kept as small as possible, and is often in the range of from about 1 centimeter to about 2 centimeters. The top of the liquid feed 102 in the flow channels above the tops of the ultrasonic transducer discs 120 is typically in arrange of from about 2 centimeters to about 5 centimeters, whether or not the aerosol generator includes the separator 126, with a distance of about 3 to 4 centimeters being preferred. Although the aerosol generator 106 could be made without the separator 126, in which case the liquid feed 102 would be indirect contact with the transducer discs 120, the highly corrosive nature of the liquid feed 102 can often cause premature failure of the transducer discs 120. The use of the separator 126, in combination with use of the ultrasonically transmissive fluid in the water bath volume 156 to provide ultrasonic coupling, significantly extending the life of the ultrasonic transducers 120. One disadvantage of using the separator 126, however, is that the rate of droplet production from the atomization cones 162 is reduced, often by a factor of two or more, relative to designs in which the liquid feed 102 is in direct contact with the ultrasonic transducer discs 120. Even with the separator 126, however, the aerosol generator 106 used with the present invention is capable of producing a high quality aerosol with heavy droplet loading, as previously discussed. Suitable materials for the separator 126 include, for example, polyamides (such as Kapton™ membranes from DuPont) and other polymer materials, glass, and plexiglass. The main requirements for the separator 126 are that it be ultrasonically transmissive, corrosion resistant and impermeable.

One alternative to using the separator 126 is to bind a corrosion-resistant protective coating onto the surface of the ultrasonic transducer discs 120, thereby preventing the liquid feed 102 from contacting the surface of the ultrasonic transducer discs 120. When the ultrasonic transducer discs 120 have a protective coating, the aerosol generator 106 will typically be constructed without the water bath volume 156 and the liquid feed 102 will flow directly over the ultrasonic transducer discs 120. Examples of such protective coating materials include platinum, gold, TELFON™, epoxies and various plastics. Such coating materials typically significantly extends transducer life. Also, when operating without the separator 126, the aerosol generator 106 will typically produce the aerosol 108 with a much higher droplet loading than when the separator 126 is used.

Figure 12:
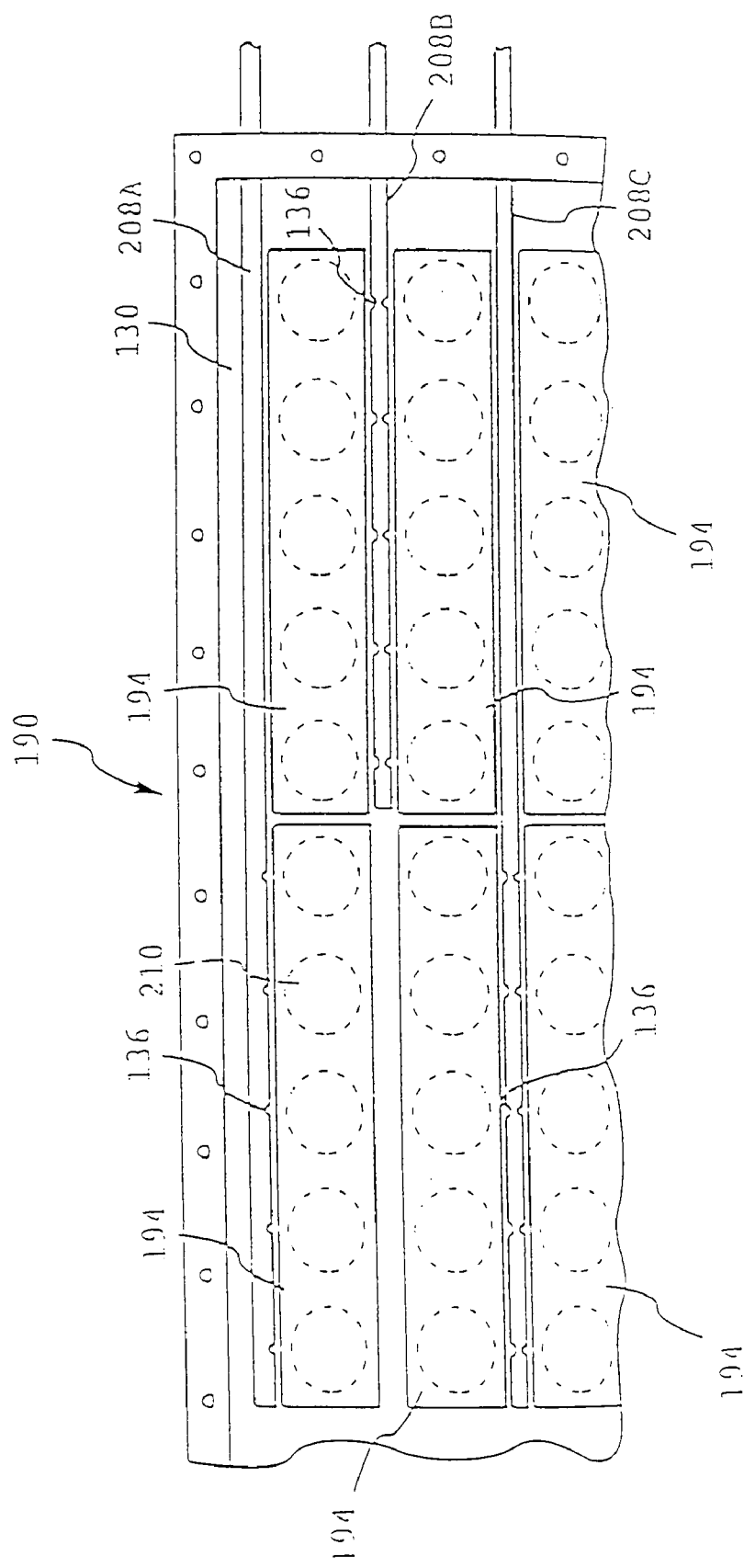
FIG. 12 shows a partial top view of gas tubes positioned in a liquid feed box for distributing gas relative to ultrasonic transducer positions for use in an aerosol generator of the present invention.

One surprising finding with operation of the aerosol generator 106 of the present invention is that the droplet loading in the aerosol may be affected by the temperature of the liquid feed 102 as well as the temperature of the water bath volume 156. It has been found that when the liquid feed 102 and/or the water bath volume includes an aqueous liquid at an elevated temperature, the droplet loading increases significantly. The temperature of the liquid feed 102 and/or the water bath volume 156 is preferably higher than about 30° C. and more preferably higher than about 35° C. If the temperature becomes too high, however, it can have a detrimental effect on droplet loading in the aerosol 108. Therefore, the temperature of the liquid feed 102 and/or the water bath volume should generally be lower than about 50° C., and preferably lower than about 45° C. Either the liquid feed 102 or the water bath volume 156 may be maintained at the desired temperature in any suitable fashion. For example, the portion of the aerosol generator 106 where the liquid feed 102 is converted to the aerosol 108 could be maintained at a constant elevated temperature. Alternatively, the liquid feed 102 could be delivered to the aerosol generator 106 from a constant temperature bath maintained separate from the aerosol generator 106.

The design for the aerosol generator 106 based on an array of ultrasonic transducers is versatile and is easily modified to accommodate different generator sizes for different specialty applications. The aerosol generator 106 may be designed to include a plurality of ultrasonic transducers in any convenient number. Even the smaller scale production, however, the aerosol generator 106 preferably has at least nine ultrasonic transducers, more preferably at least 16 ultrasonic transducers, and even more preferably at least 25 ultrasonic transducers. For larger scale production, however, the aerosol generator 106 includes at least 40 ultrasonic transducers, more preferably at least 100 ultrasonic transducers, and even more preferably at least 400 ultrasonic transducers. In some large volume applications, the aerosol generator may have at least 1000 ultrasonic transducers.

FIGS. 4-21 show component designs for an aerosol generator 106 including an array of 400 ultrasonic transducers. Referring first FIGS. 4 and 5, the transducer mounting plate 124 is shown with a design to accommodate an array of 400 ultrasonic transducers, arranged in four subarrays of 100 ultrasonic transducers each. The transducer mounting plate 124 has integral vertical walls 172 for containing the ultrasonically transmissive fluid, typically water, in a water bath similar to the water bath volume 156 described previously with reference to FIG. 2.

As shown in FIGS. 4 and 5, four hundred transducer mounting receptacles 174 are provided in the transducer mounting plate 124 for mounting ultrasonic transducers for the desired array. With reference to FIG. 6, the profile of an individual transducer mounting receptacle 174 is shown. A mounting seat 176 accepts an ultrasonic transducer for mounting, with a mounted ultrasonic transducer being held in place via screw holes 178. Opposite the mounting receptacle 176 is a flared opening 180 through which an ultrasonic signal may be transmitted for the purpose of generating the aerosol 108, as previously described with reference to FIG. 2.

A preferred transducer mounting configuration, however, is shown in FIG. 7 for another configuration for the transducer mounting plate 124. As seen in FIG. 7, an ultrasonic transducer disc 120 is mounted to the transducer mounting plate 124 by use of a compression screw 177 threaded into a threaded receptacle 179. The compression screw 177 bears against the ultrasonic transducer disc 120, causing an o-ring 181, situated in an o-ring seat 182 on the transducer mounting plate, to be compressed to form a seal between the transducer mounting plate 124 and the ultrasonic transducer disc 120. This type of transducer mounting is particularly preferred when the ultrasonic transducer disc 120 includes a protective surface coating, as discussed previously, because the seal of the o-ring to the ultrasonic transducer disc 120 will be inside of the outer edge of the protective seal, thereby preventing liquid from penetrating under the protective surface coating from the edges of the ultrasonic transducer disc 120.

Referring now to FIG. 8, the bottom retaining plate 128 for a 400 transducer array is shown having a design for mating with the transducer mounting plate 124 (shown in FIGS. 4-5). The bottom retaining plate 128 has eighty openings 184, arranged in four subgroups 186 of twenty openings 184 each. Each of the openings 184 corresponds with five of the transducer mounting receptacles 174 (shown in FIGS. 4 and 5) when the bottom retaining plate 128 is mated with the transducer mounting plate 124 to create a volume for a water bath between the transducer mounting plate 124 and the bottom retaining plate 128. The openings 184, therefore, provide a pathway for ultrasonic signals generated by ultrasonic transducers to be transmitted through the bottom retaining plate.

Referring now to FIGS. 9 and 10, a liquid feed box 190 for a 400 transducer array is shown having the top retaining plate 130 designed to fit over the bottom retaining plate 128 (shown in FIG. 8), with a separator 126 (not shown) being retained between the bottom retaining plate 128 and the top retaining plate 130 when the aerosol generator 106 is assembled. The liquid feed box 190 also includes vertically extending walls 192 for containing the liquid feed 102 when the aerosol generator is in operation. Also shown in FIGS. 9 and 10 is the feed inlet 148 and the feed outlet 152. An adjustable weir 198 determines the level of liquid feed 102 in the liquid feed box 190 during operation of the aerosol generator 106.

The top retaining plate 130 of the liquid feed box 190 has eighty openings 194 therethrough, which are arranged in four subgroups 196 of twenty openings 194 each. The openings 914 of the top retaining plate 130 correspond in size with the openings 184 of the bottom retaining plate 128 (shown in FIG. 8). When the aerosol generator 106 is assembled, the opening 194 through the top retaining plate 130 and the openings 184 through the bottom retaining plate 128 are aligned, with the separator 126 positioned therebetween, to permit transmission of ultrasonic signals when the aerosol generator 106 is in operation.

Referring now to FIGS. 9-11, a plurality of gas tube feed-through holes 202 extend through the vertically extending walls 192 to either side of the assembly including the feed inlet 148 and feed outlet 152 of the liquid feed box 190. The gas tube feed-through holes 202 are designed to permit insertion therethrough of gas tubes 208 of a design as shown in FIG. 11. When the aerosol generator 106 is assembled, a gas tube 208 is inserted through each of the gas tube feed-through holes 202 so that gas delivery ports 136 in the gas tube 208 will be property positioned and aligned adjacent the openings 194 in the top retaining plate 130 for delivery of gas to atomization cones that develop in the liquid feed box 190 during operation of the aerosol generator 106. The gas delivery ports 136 are typically holes having a diameter of from about 1.5 millimeters to about 3.5 millimeters.

Referring now to FIG. 12, a partial view of the liquid feed box 190 is shown with gas tubes 208A, 208B and 208C positioned adjacent to the openings 194 through the top retaining plate 130. Also shown in FIG. 12 are the relative locations that ultrasonic transducer discs 120 would occupy when the aerosol generator 106 is assembled. As seen in FIG. 12, the gas tube 208A, which is at the edge of the array, has five gas delivery ports 136. Each of the gas delivery ports 136 is positioned to divert carrier gas 104 to a different one of atomization cones that develop over the array of ultrasonic transducer discs 120 when the aerosol generator 106 is operating. The gas tube 208B, which is one row in from the edge of the array, is a shorter tube that has ten gas delivery ports 136, five each on opposing sides of the gas tube 208B. The gas tube 208B, therefore, has gas delivery ports 136 for delivering gas to atomization cones corresponding with each of ten ultrasonic transducer discs 120. The third gas tube, 208C, is a longer tube that also has ten gas delivery ports 136 for delivering gas to atomization cones corresponding with ten ultrasonic transducer discs 120. The design shown in FIG. 12, therefore, includes one gas delivery port per ultrasonic transducer disc 120. Although this is a lower density of gas delivery ports 136 than for the embodiment of the aerosol generator 106 shown in FIG. 2, which includes two gas delivery ports per ultrasonic transducer disc 120, the design shown in FIG. 12 is, nevertheless, capable of producing a dense, high-quality aerosol without a substantial waste of gas.

Figure 11:
FIG. 11 is a side view of a gas tube for delivering gas within an aerosol generator of the present invention.
Figure 13:
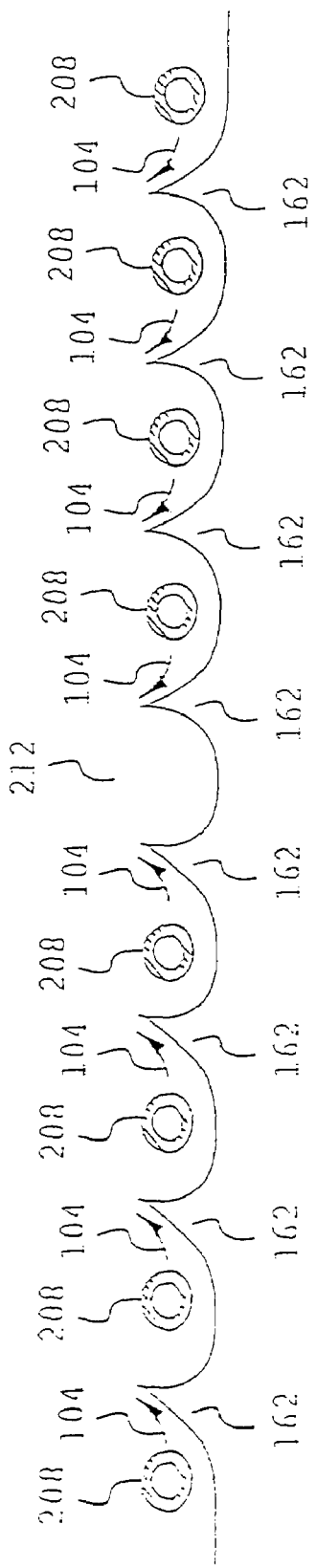
FIG. 13 shows one embodiment for a gas distribution configuration for the second generator of the present invention.

Referring now to FIG. 13, the flow of carrier gas 104 relative to atomization cones 162 during operation of the aerosol generator 106 having a gas distribution configuration to deliver carrier gas 104 from gas delivery ports on both sides of the gas tubes 208, as was shown for the gas tubes 208A, 208B and 208C in the gas distribution configuration shown in FIG. 11. The carrier gas 104 sweeps both directions from each of the gas tubes 208.

Figure 14:
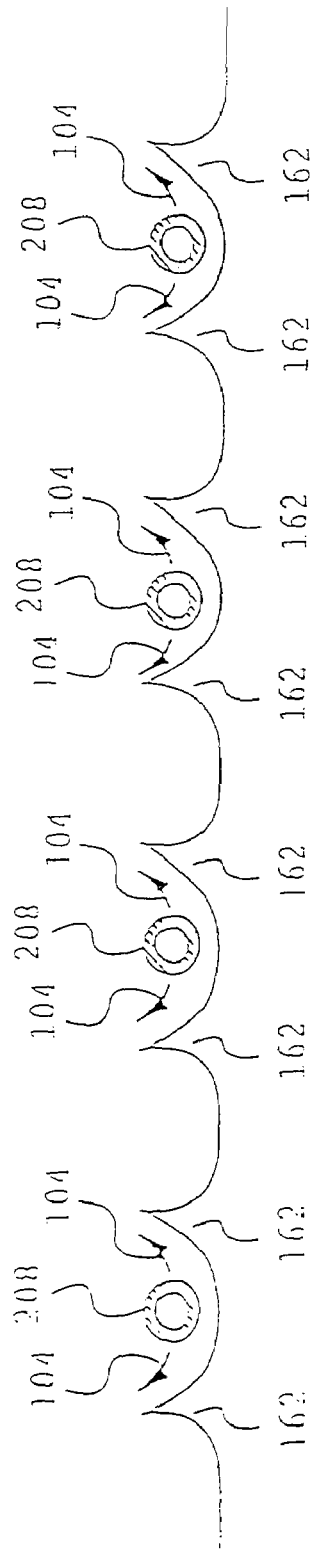
FIG. 14 shows an other embodiment for a gas distribution configuration for the aerosol generator of the present invention.

An alternative, and preferred, flow for carrier gas 104 is shown in FIG. 14. As shown in FIG. 14, carrier gas 104 is delivered from only one side of each of the gas tubes 208. This results in a sweep of carrier gas from all of the gas tubes 208 toward a central area 212. This results in a more uniform flow pattern for aerosol generation that may significantly enhance the efficiency with which the carrier gas 104 is used to produce an aerosol. The aerosol that is generated, therefore, tends to be more heavily loaded with liquid droplets.

Figure 15:
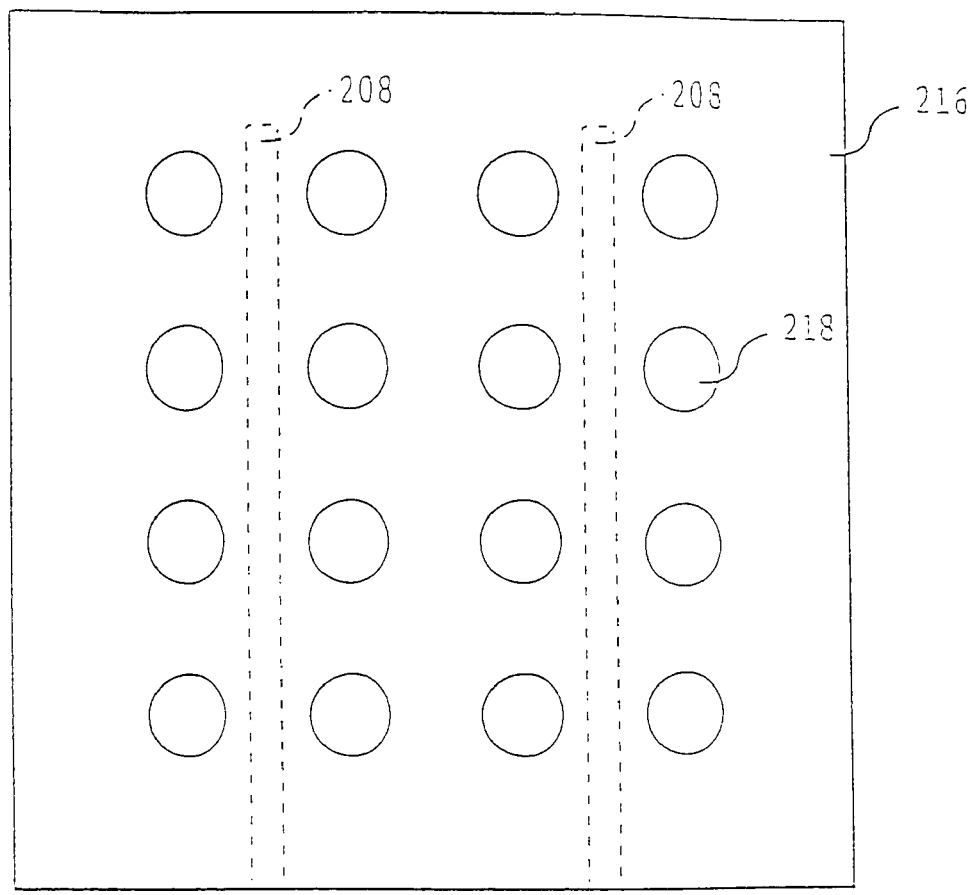
FIG. 15 is a top view of one embodiment of a gas distribution plate/gas tube assembly of the aerosol generator of the present invention.
Figure 16:
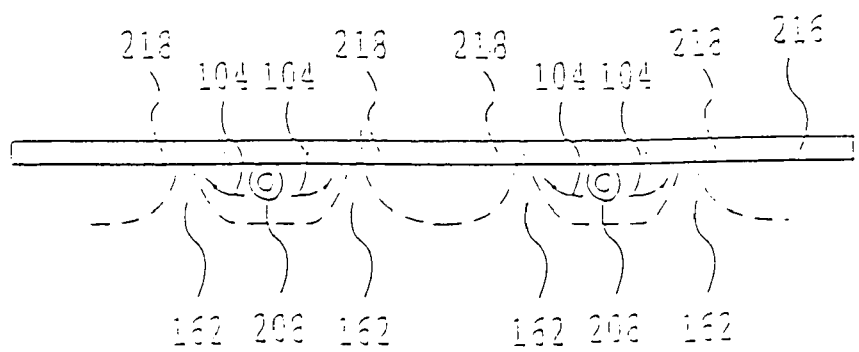
FIG. 16 is a side view of one embodiment of the gas distribution plate/gas tube assembly shown in FIG. 15.

Another configuration for distribution carrier gas in the aerosol generator 106 is shown in FIGS. 15 and 16. In this configuration, the gas tubes 208 are hung from a gas distribution plate 216 adjacent gas flow holes 218 through the gas distribution plate 216. In the aerosol generator 106, the gas distribution plate 216 would be mounted above the liquid feed, with the gas flow holes positioned to each correspond with an underlying ultrasonic transducer. Referring specifically to FIG. 16, when the ultrasonic generator 106 is in operation, atomization cones 162 develop through the gas flow holes 218, and the gas tubes 208 are located such that carrier gas 104 exiting from ports in the gas tubes 208 impinge on the atomization cones and flow upward through the gas flow holes. The gas flow holes 218, therefore, act to assist in efficiently distributing the carrier gas 104 about the atomization cones 162 for aerosol formation. It should be appreciated that the gas distribution plates 218 can be made to accommodate any number of the gas tubes 208 and gas flow holes 218. For convenience of illustration, the embodiment shown in FIGS. 15 and 16 shows a design having only two of the gas tubes 208 and only 16 of the gas flow holes 218. Also, it should be appreciated that the gas distribution plate 216 could be used alone, without the gas tubes 208. In that case, a slight positive pressure of carrier gas 104 would be maintained under the gas distribution plate 216 and the gas flow holes 218 would be sized to maintain the proper velocity of carrier gas 104 through the gas flow holes 218 for efficient aerosol generation. Because of the relative complexity of operating in that mode, however, it is not preferred.

Figure 17:
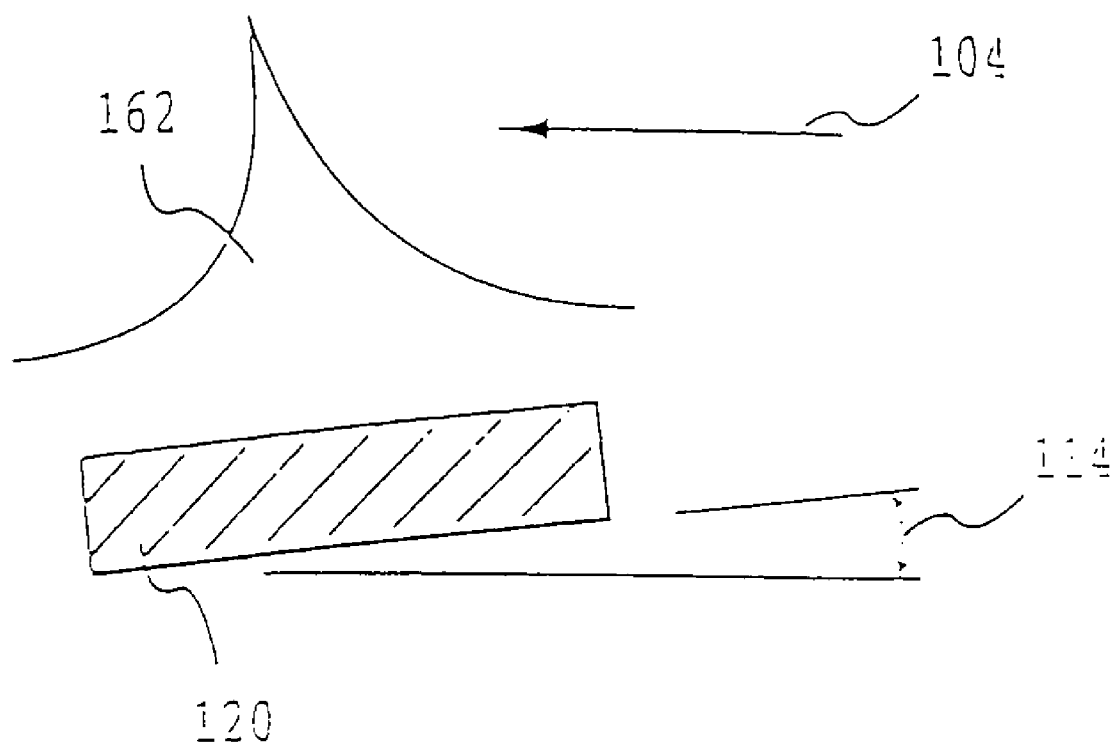
FIG. 17 shows one embodiment for orienting a transducer in the aerosol generator of the present invention.

Aerosol generation may also be enhanced through mounting of ultrasonic transducers at a slight angle and directing the carrier gas at resulting atomization cones such that the atomization cones are tilting in the same direction as the direction of flow of carrier gas. Referring to FIG. 17, an ultrasonic transducer disc 120 is shown. The ultrasonic transducer disc 120 is tilted at a tilt angle 114 (typically less than 10 degrees), so that the atomization cone 162 will also have a tilt. It is preferred that the direction of flow of the carrier gas 104 directed at the atomization cone 162 is in the same direction as the tilt of the atomization cone 162.

Figure 18:
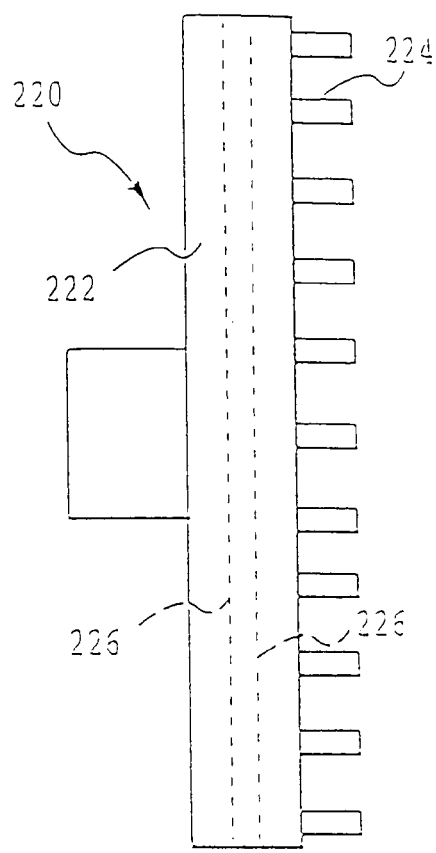
FIG. 18 is a top view of a gas manifold for distributing gas within an aerosol generator of the present invention.
Figure 19:
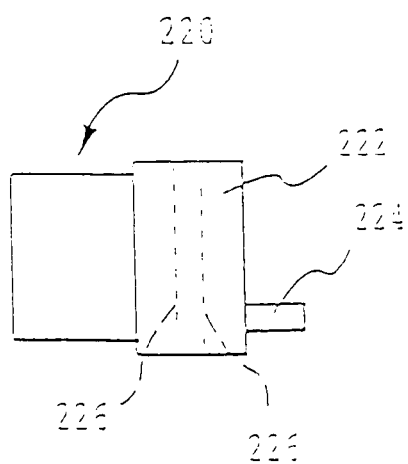
FIG. 19 is a side view of the gas manifold shown in FIG. 18.

Referring now to FIGS. 18 and 19, a gas manifold 220 is shown for distributing gas to the gas tubes 208 in a 400 transducer array design. The gas manifold 220 includes a gas distribution box 222 and piping stubs 224 for connection with gas tubes 208 (shown in FIG. 11). Inside the gas distribution box 222 are two gas distribution plates 226 that form a flow path to assist in distributing the gas equally throughout the gas distribution box 222, to promote substantially equal delivery of gas through the piping stubs 224. The gas manifold 220, as shown in FIGS. 18 and 19, is designed to feed eleven gas tubes 208. For the 400 transducer design, a total of four gas manifolds 220 are required.

Figure 9:
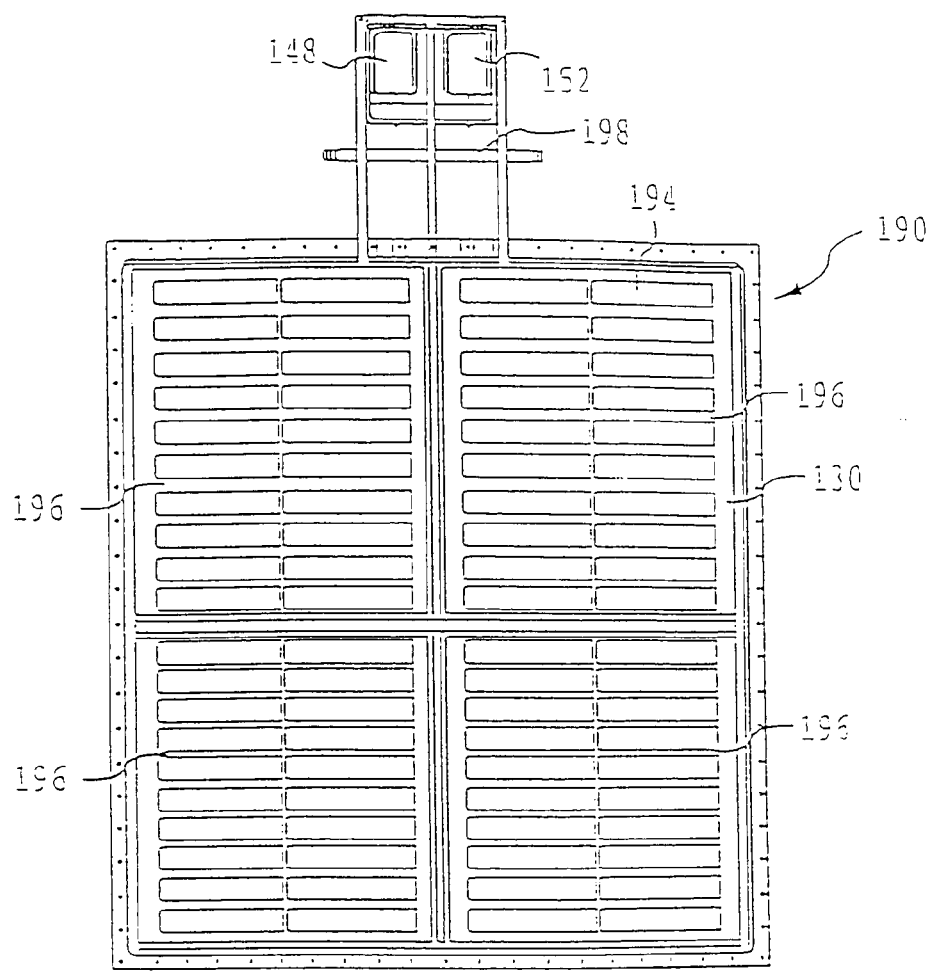
FIG. 9 is a top view of a liquid feed box having a bottom retaining plate to assist in retaining a separator for use in an aerosol generator of the present invention.
Figure 10:
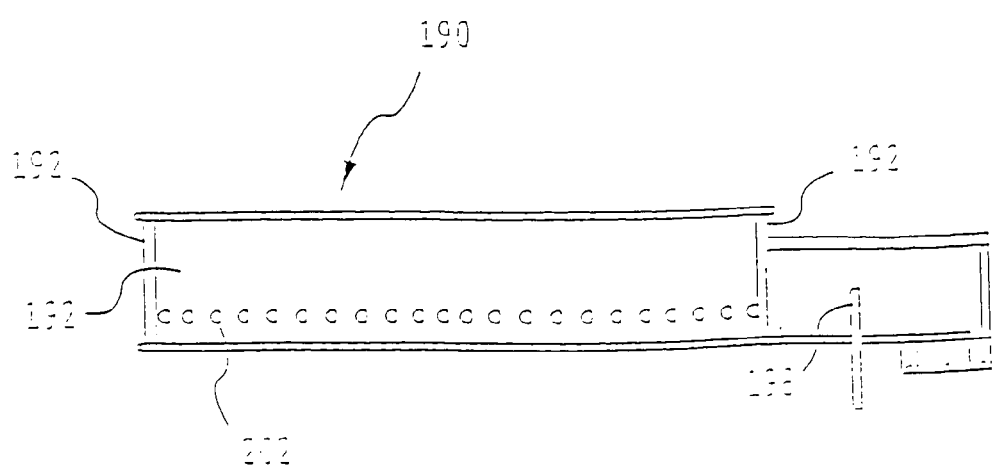
FIG. 10 is a side view of the liquid feed box shown in FIG. 9.
Figure 20:
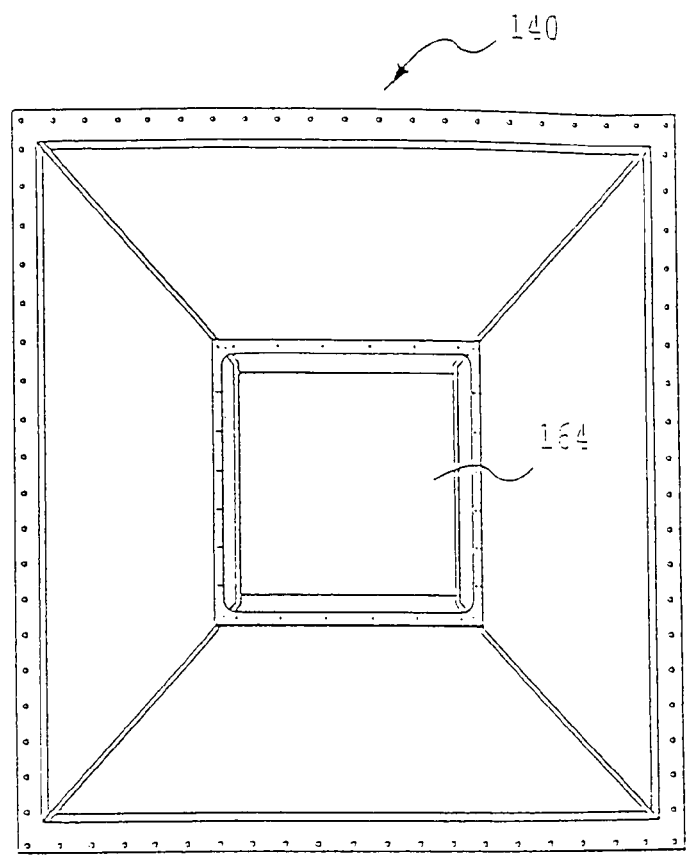
FIG. 20 is a top view of a generator lid of a hood design for use in an aerosol generator of the present invention.
Figure 21:
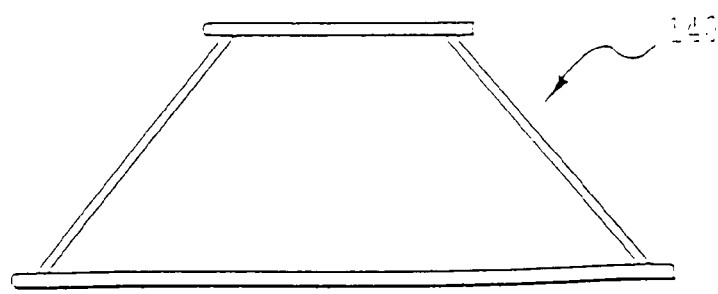
FIG. 21 is a side view of the generator lid shown in FIG. 20.
Figure 23:
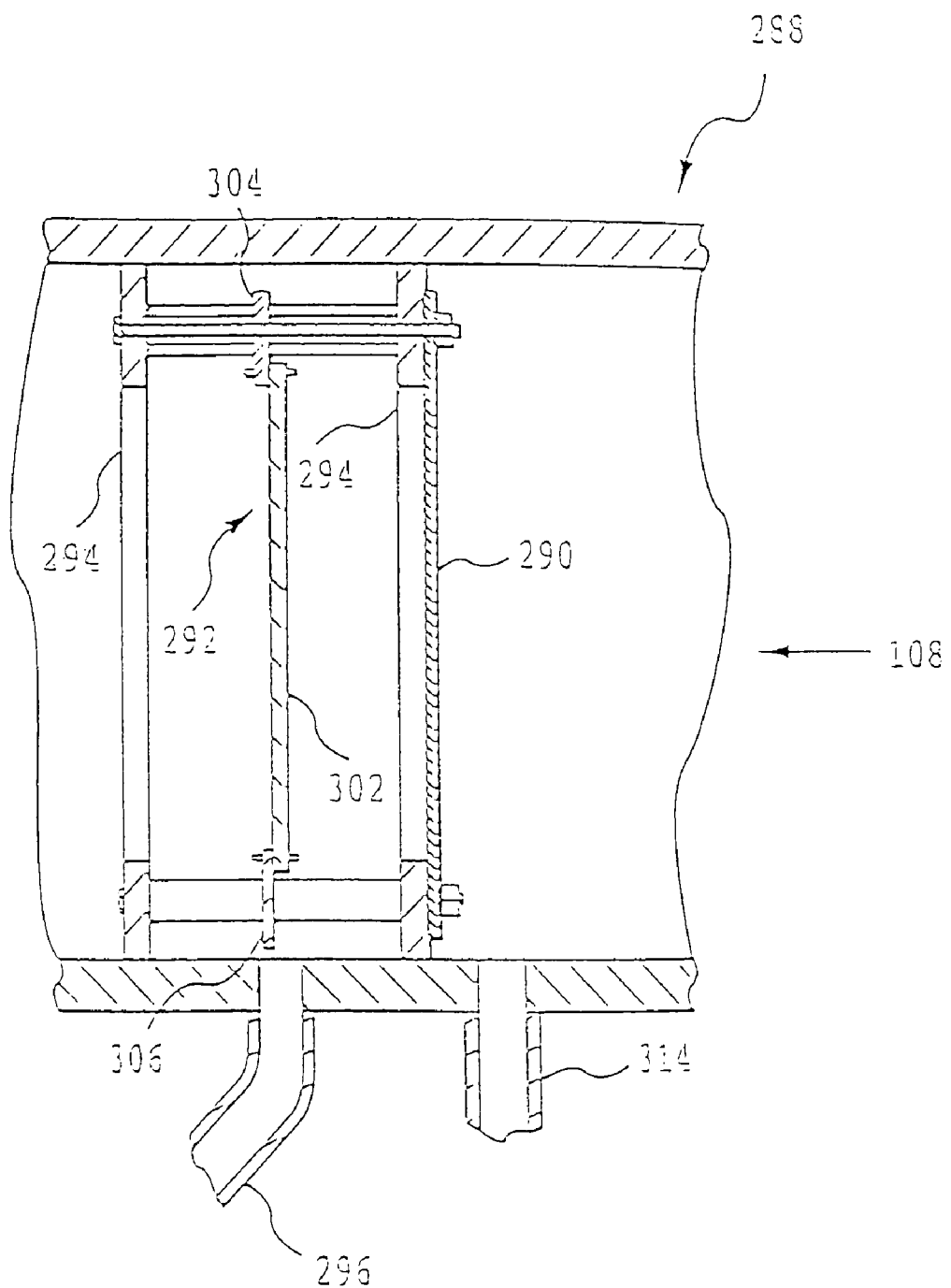
FIG. 23 is a top view in cross section of an impactor of the present invention for use in classifying an aerosol.
Figure 24:
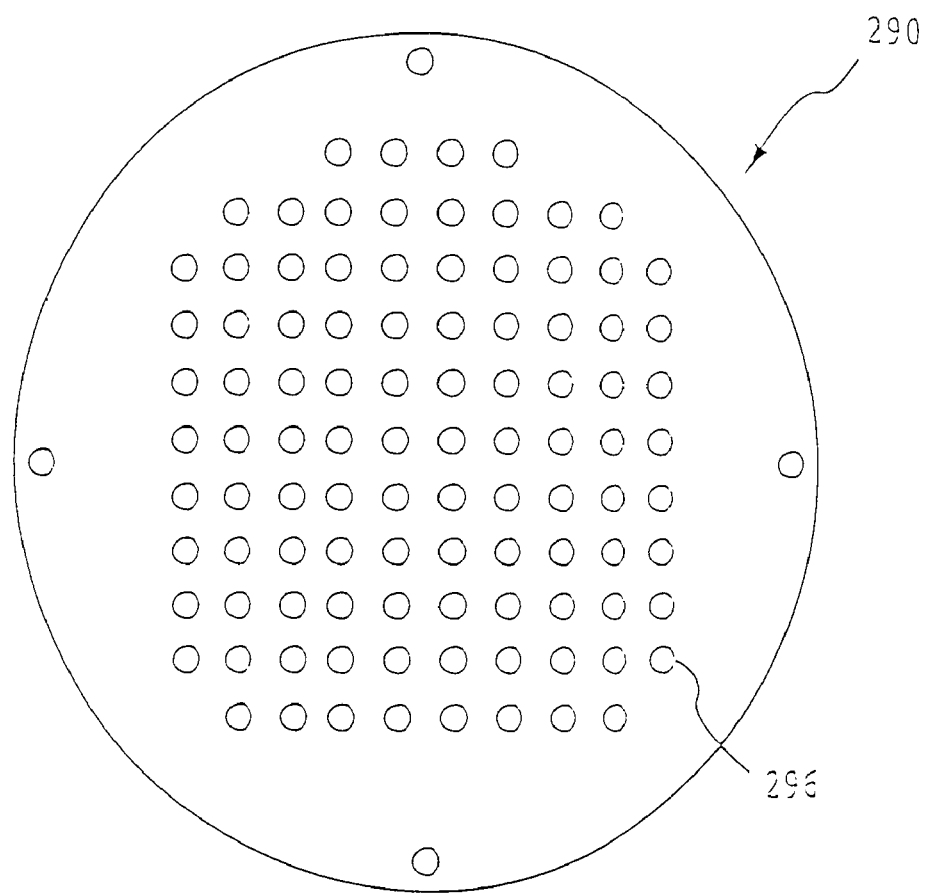
FIG. 24 is a front view of a flow control plate of the impactor shown in FIG. 23.

Referring now to FIGS. 23 and 24, the generator lid 140 is shown for a 400 transducer array design. The generator lid 140 mates with and covers the liquid feed box 190 (shown in FIGS. 9 and 10). The generator lid 140, as shown in FIGS. 20 and 21, has a hood design to permit easy collection of the aerosol 108 without subjecting droplets in the aerosol 108 to sharp edges on which droplets may coalesce and be lost, and possibly interfere with the proper operation of the aerosol generator 106. When the aerosol generator 106 is in operation, the aerosol 108 would be withdrawn via the aerosol exit opening 164 through the generator cover 140.

It is important that the aerosol stream that is fed to the furnace 110 have a high droplet flow rate and high droplet loading as would be required for most industrial applications. With the present invention, the aerosol stream fed to the furnace preferably includes a droplet flow of greater than about 0.5 liters per hour, more preferably greater than about 2 liters per hour, still more preferably greater than about 5 liters per hour, each more preferably greater than about 10 liters per hour, particularly greater than about 50 liters per hour and most preferably greater than about 100 liters per hour; and with the droplet loading being typically greater than about 0.04 milliliters of droplets per liter of carrier gas, preferably greater than about 0.083 milliliters of droplets per liter of carrier gas 104, more preferably greater than about 0.167 milliliters of droplets per liter of carrier gas 104, still more preferably greater than about 0.25 milliliters of droplets per liter of carrier gas 104, particularly greater than about 0.33 milliliters of droplets per liter of carrier gas 104 and most preferably greater than about 0.83 milliliters of droplets per liter of carrier gas 104.

In addition to the foregoing, it has been found to be advantageous according to the present invention to provide means for adjusting the concentration of precursor in the liquid feed. More specifically, it has been found that during aerosol production, the precursor solution can concentrate due to the preferential evaporation of water from the liquid. As a result, it is desirable to provide water to the liquid either on a substantially continuous basis or periodically to maintain the concentration of the precursors within an acceptable range. In some instances, it may also be necessary to add small amounts of precursors if there is any preferential evaporation of precursor materials from the liquid.

The aerosol generator 106 of the present invention produces a concentrated, high quality aerosol of micro-sized droplets having a relatively narrow size distribution. It has been found, however, that for many applications the process of the present invention is significantly enhanced by further classifying by size the droplets in the aerosol 108 prior to introduction of the droplets into the furnace 110. In this manner, the size and size distribution of particles in the particulate product 116 are further controlled.

Figure 22:
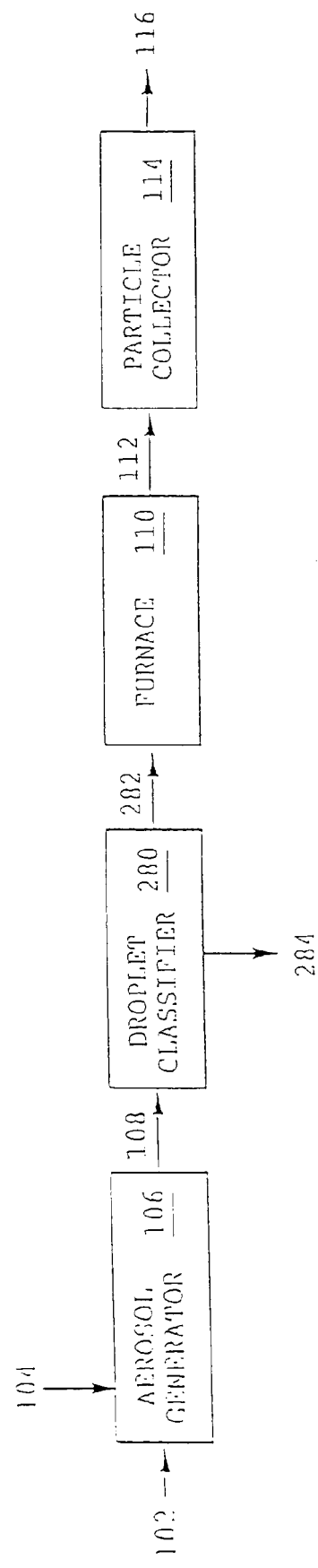
FIG. 22 is a process block diagram of one embodiment of the process of the present invention including a droplet classifier.

Referring now to FIG. 22, a process flow diagram is shown for one embodiment of the process of the present invention including such droplet classification. As shown in FIG. 22, the aerosol 108 from the aerosol generator 106 goes to a droplet classifier 280 where oversized droplets are removed from the aerosol 108 to prepare a classified aerosol 282. Liquid 284 from the oversized droplets that are being removed is drained from the droplet classifier 280. This drained liquid 284 may advantageously be recycled for use in preparing additional liquid feed 102.

Any suitable droplet classified may be used for removing droplets above a predetermined size. For example, a cyclone could be used to remove over-size droplets. A preferred droplet classifier for many applications, however, is an impactor. One embodiment of an impactor for use with the present invention will now to be described with reference to FIGS. 23-27.

As seen in FIG. 23, an impactor 288 has disposed in a flow conduit 286 a flow control plate 290 and an impactor plate assembly 292. The flow control plate 290 is conveniently mounted on a mounting plate 294.

The flow control plate 290 is used to channel the flow of the aerosol stream toward the impactor plate assembly 292 in a manner with controlled flow characteristics that are desirable for proper impaction of oversize droplets on the impactor plate assembly 292 for removal through the drains 296 and 314. One embodiment of the flow control plate 290 is shown in FIG. 24. The flow control plate 290 has an array of circular flow ports 296 for channeling flow of the aerosol 108 towards the impactor plate assembly 292 with the desired flow characteristics.

Figure 25:
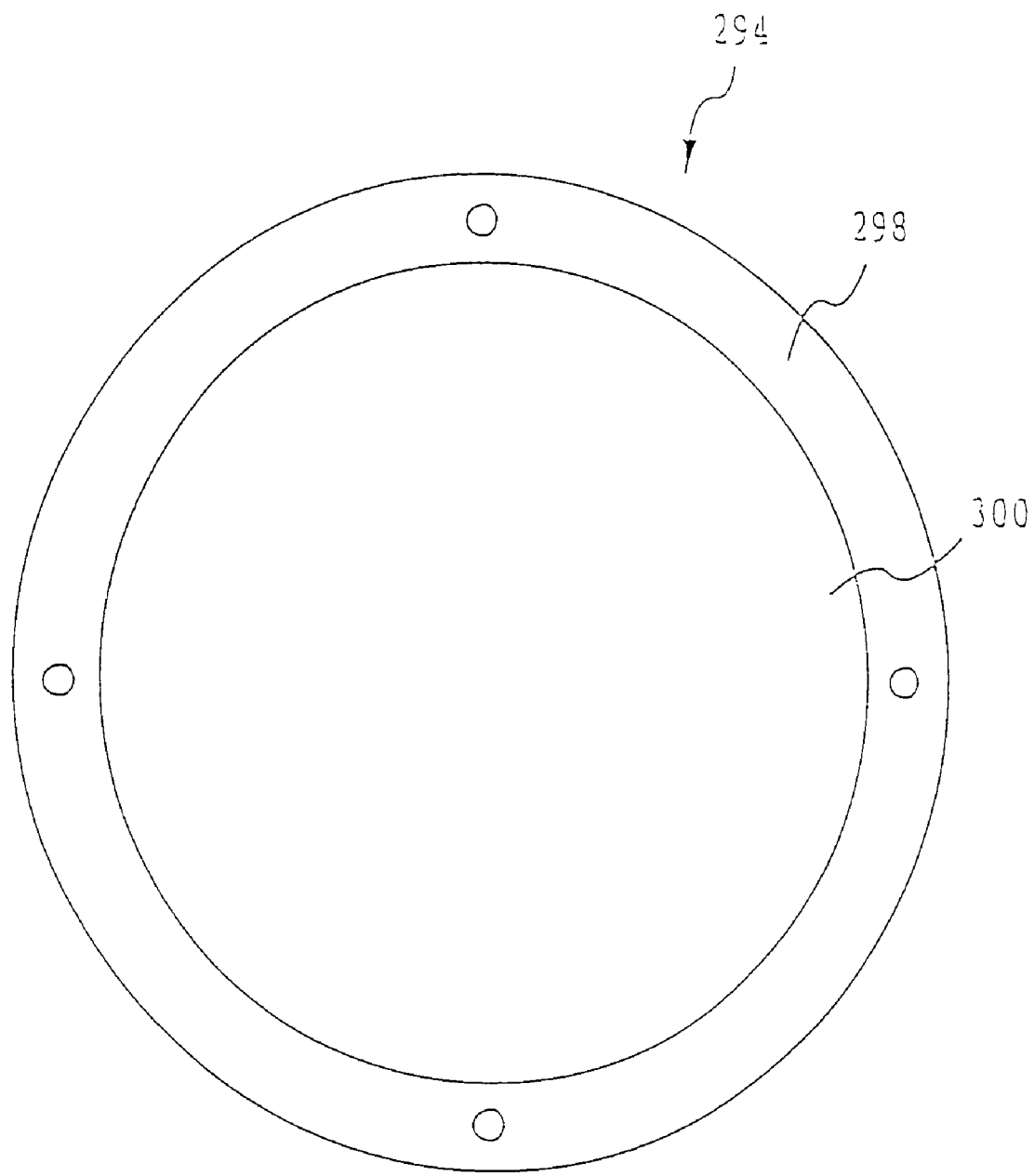
FIG. 25 is a front view of a mounting plate of the impactor shown in FIG. 23.

Details of the mounting plate 294 are shown in FIG. 25. The mounting plate 294 has a mounting flange 298 with a large diameter flow opening 300 passing therethrough to permit access of the aerosol 108 to the flow ports 296 of the flow control plate 290 (shown in FIG. 24).

Figure 26:
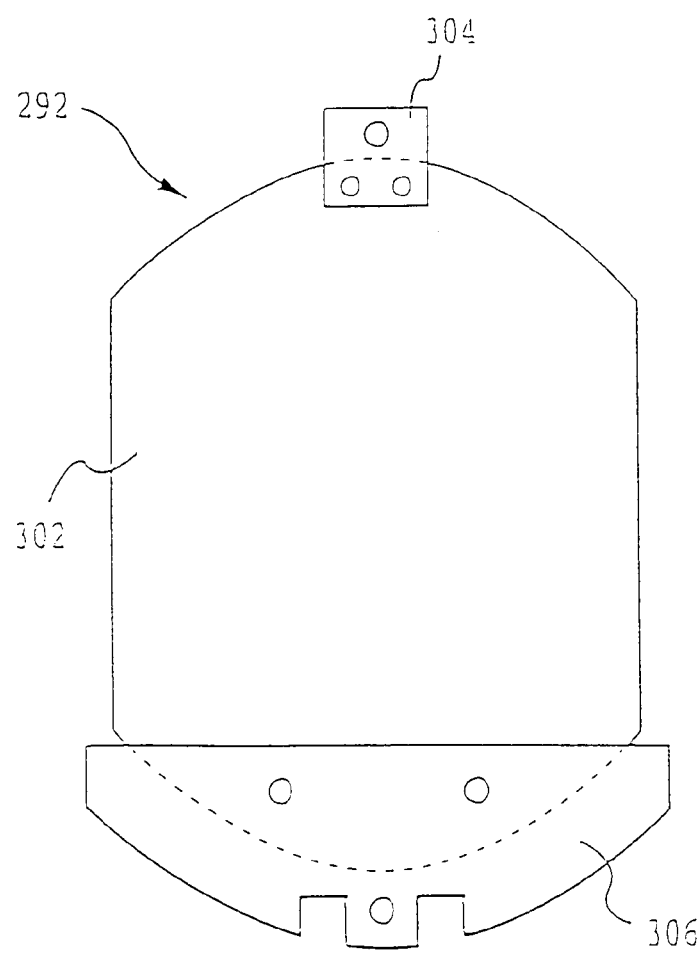
FIG. 26 is a front view of an impactor plate assembly of the impactor shown in FIG. 23.
Figure 27:
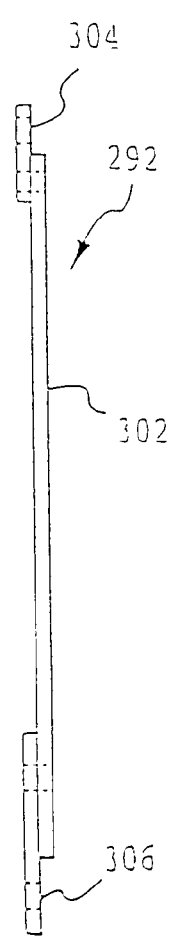
FIG. 27 is a side view of the impactor plate assembly shown in FIG. 26.

Referring now to FIGS. 26 and 27, one embodiment of an impactor plate assembly 292 is shown. The impactor plate assembly 292 includes an impactor plate 302 and mounting brackets 304 and 306 used to mount the impactor plate 302 inside of the flow conduit 286. The impactor plate 302 and the flow channel plate 290 are designed so that droplets larger than a predetermined size will have momentum that is too large for those particles to change flow direction to navigate around the impactor plate 302.

During operation of the impactor 288, the aerosol 108 from the aerosol generator 106 passes through the upstream flow control plate 290. Most of the droplets in the aerosol navigate around the impactor plate 302 and exit the impactor 288 through the downstream flow control plate 290 in the classified aerosol 282. Droplets in the aerosol 108 that are too large to navigate around the impactor plate 302 will impact on the impactor plate 302 and drain through the drain 296 to be collected with the drained liquid 284 (as shown in FIG. 23).

The configuration of the impactor plate 302 shown in FIG. 22 represents only one of many possible configurations for the impactor plate 302. For example, the impactor 288 could include an upstream flow control plate 290 having vertically extending flow slits therethrough that are offset from vertically extending flow slits through the impactor plate 302, such that droplets too large to navigate the change in flow due to the offset of the flow slits between the flow control plate 290 and the impactor plate 302 would impact on the impactor plate 302 to be drained away. Other designs are also possible.

In a preferred embodiment of the present invention, the droplet classifier 280 is typically designed to remove droplets from the aerosol 108 that are larger than about 15 μm in size, more preferably to remove droplets larger than about 10 μm in size, even more preferably to remove droplets of a size larger than about 8 μm in size and most preferably to remove droplets larger than about 5 μm in size. The droplet classification size in the droplet classifier is preferably smaller than about 15 μm, more preferably smaller than about 10 μm, even more preferably smaller than about 8 μm and most preferably smaller than about 5 μm. The classification size, also called the classification cut point, is that size at which half of the droplets of that size are removed and half of the droplets of that size are retained. Depending upon the specific application, however, the droplet classification size may be varied, such as by changing the spacing between the impactor plate 302 and the flow control plate 290 or increasing or decreasing aerosol velocity through the jets in the flow control plate 290. Because the aerosol generator 106 of the present invention initially produces a high quality aerosol 108, having a relatively narrow size distribution of droplets, typically less than about 30 weight percent of liquid feet 102 in the aerosol 108 is removed as the drain liquid 284 in the droplet classifier 288, with preferably less than about 25 weight percent being removed, even more preferably less than about 20 weight percent being removed and most preferably less than about 15 weight percent being removed. Minimizing the removal of liquid feed 102 from the aerosol 108 is particularly important for commercial applications to increase the yield of high quality particulate product 116. It should be noted, however, that because of the superior performance of the aerosol generator 106, it is frequently not required to use an impactor or other droplet classifier to obtain a desired absence of oversize droplets to the furnace. This is a major advantage, because the added complexity and liquid losses accompanying use of an impactor may often be avoided with the process of the present invention.

Figure 28:
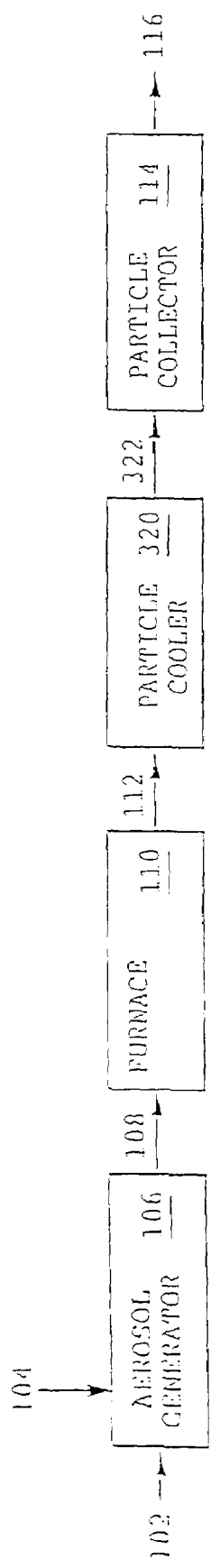
FIG. 28 is a process block diagram of one embodiment of the present invention including a particle cooler.

With some applications of the process of the present invention, it may be possible to collect the particles 112 directly from the output of the furnace 110. More often, however, it will be desirable to cool the particles 112 exiting the furnace 110 prior to collection of the particles 112 in the particle collector 114. Referring now to FIG. 28, one embodiment of the process of the present invention is shown in which the particles 112 exiting the furnace 110 are sent to a particle cooler 320 to produce a cooled particle stream 322, which is then fed to the particle collector 114. Although the particle cooler 320 may be any cooling apparatus capable of cooling the particles 112 to the desired temperature for introduction into the particle collector 114, traditional heat exchange designs are not preferred. This is because a traditional heat exchanger design ordinarily directly subjects the aerosol stream, in which the hot particles 112 are suspended, to cool surfaces. In that situation, significant losses of the particles 112 occur due to thermophoretic deposition of the hot particles 112 on the cool surfaces of the heat exchanger. According to the present invention, a gas quench apparatus is provided for use as the particle cooler 320 that significantly reduces thermophoretic losses compared to a traditional heat exchanger.

Referring now to FIGS. 29-31, one embodiment of a gas quench cooler 330 is shown. The gas quench cooler includes a perforated conduit 332 housed inside of a cooler housing 334 with an annular space 336 located between the cooler housing 334 and the perforated conduit 332. In fluid communication with the annular space 336 is a quench gas inlet box 338, inside of which is disposed a portion of an aerosol outlet conduit 340. The perforated conduit 332 extends between the aerosol outlet conduit 340 and an aerosol inlet conduit 342. Attached to an opening into the quench gas inlet box 338 are two quench gas feed tubes 334. Referring specifically to FIG. 31, the perforated tube 332 is shown. The perforated tube 332 has a plurality of openings 345. The openings 345, when the perforated conduit 332 is assembled into the gas quench cooler 330, permit the flow of quench gas 346 from the annular space 336 into the interior space 348 of the perforated conduit 332. Although the openings 345 are shown as being round holes, any shape of opening could be used, such as slits.

Also, the perforated conduit 332 could be a porous screen. Two heat radiation shields 347 prevent downstream radiant heating from the furnace. In most instances, however, it will not be necessary to include the heat radiation shields 347, because downstream radiant heating from the furnace is normally not a significant problem. Use of the heat radiation shields 347 is not preferred due to particulate losses that accompany their use.

With continued preference to FIGS. 29-31 operation of the gas quench cooler 330 will now be described. During operation, the particles 112, carried by and dispersed in a gas stream, enter the gas quench cooler 330 through the aerosol inlet conduit 342 and flow into the interior space 348 of perforated conduit 332. Quench gas 346 is introduced through the quench gas feed tubes 344 into the quench gas inlet box 338. Queen gas 346 entering the quench gas inlet box 338 encounters the outer surface of the aerosol outlet conduit 340, forcing the quench gas 346 to flow, in a spiraling, swirling manner, into the annular space 336, where the quench gas 346 flows through the openings 345 through the walls of the perforated conduit 332. Preferably, the gas 346 retains some swirling motion even after passing into the interior space 348. In this way, the particles 112 are quickly cooled with low losses of particles to the walls of the gas quench cooler 330. In this manner, the quench gas 346 enters in a radial direction into the interior space 348 of the perforated conduit 332 around the entire periphery, or circumference, of the perforated conduit 332 and over the entire length of the perforated conduit 332. The cool quench gas 346 mixes with and cools the hot particles 112, which then exit through the aerosol outlet conduit 340 as the cooled particle stream 322. The cooled particle stream 322 can then be sent to the particle collector 114 for particle collection. The temperature of the cooled particle stream 322 is controlled by introducing more or less quench gas. Also, as shown in FIG. 29, the quench gas 346 is fed into the quench cooler 330 in counter flow to flow of the particles. Alternatively, the quench cooler could be designed so that the quench gas 346 is fed into the quench cooler in concurrent flow with the flow of the particles 112. The amount of quench gas 346 fed to the gas quench cooler 330 will depend upon the specific material being made and the specific operating conditions. The quantity of quench gas 346 used, however, must be sufficient to reduce the temperature of the aerosol steam including the particles 112 to the desired temperature. Typically, the particles 112 are cooled to a temperature at least below about 200° C., and often lower. The only limitation on how much the particles 112 are cooled is that the cooled particle stream 322 must be at a temperature that is above the condensation temperature for water as another condensible vapor in the stream. The temperature of the cooled particle stream 322 is often at a temperature of from about 50° C. to about 120° C.

Because of the entry of quench gas 346 into the interior space 348 of the perforated conduit 322 in a radial direction about the entire circumference and length of the perforated conduit 322, a buffer of the cool quench gas 346 is formed about the inner wall of the perforated conduit 332, thereby significantly inhibiting the loss of hot particles 112 due to thermophoretic deposition on the cool wall of the perforated conduit 332. In operation, the quench gaps 346 exiting the openings 345 and entering into the interior space 348 should have a radial velocity (velocity inward toward the center of the circular cross-section of the perforated conduit 332) of larger than the thermophoretic velocity of the particles 112 inside the perforated conduit 332 in a direction radially outward toward the perforated wall of the perforated conduit 332.

As seen in FIGS. 29-31, the gas quench cooler 330 includes a flow path for the particles 112 through the gas quench cooler of a substantially constant cross-sectional shape and area. Preferably, the flow path through the gas quench cooler 330 will have the same cross-sectional shape and area as the flow path through the furnace 110 and through the conduit delivering the aerosol 108 from the aerosol generator 106 to the furnace 110. In one embodiment, however, it may be necessary to reduce the cross-sectional area available for flow prior to the particle collector 114. This is the case, for example, when the particle collector includes a cyclone for separating particles in the cooled particle stream 322 from gas in the cooled particle stream 332. This is because of the high inlet velocity requirements into cyclone separators.

Figure 32:
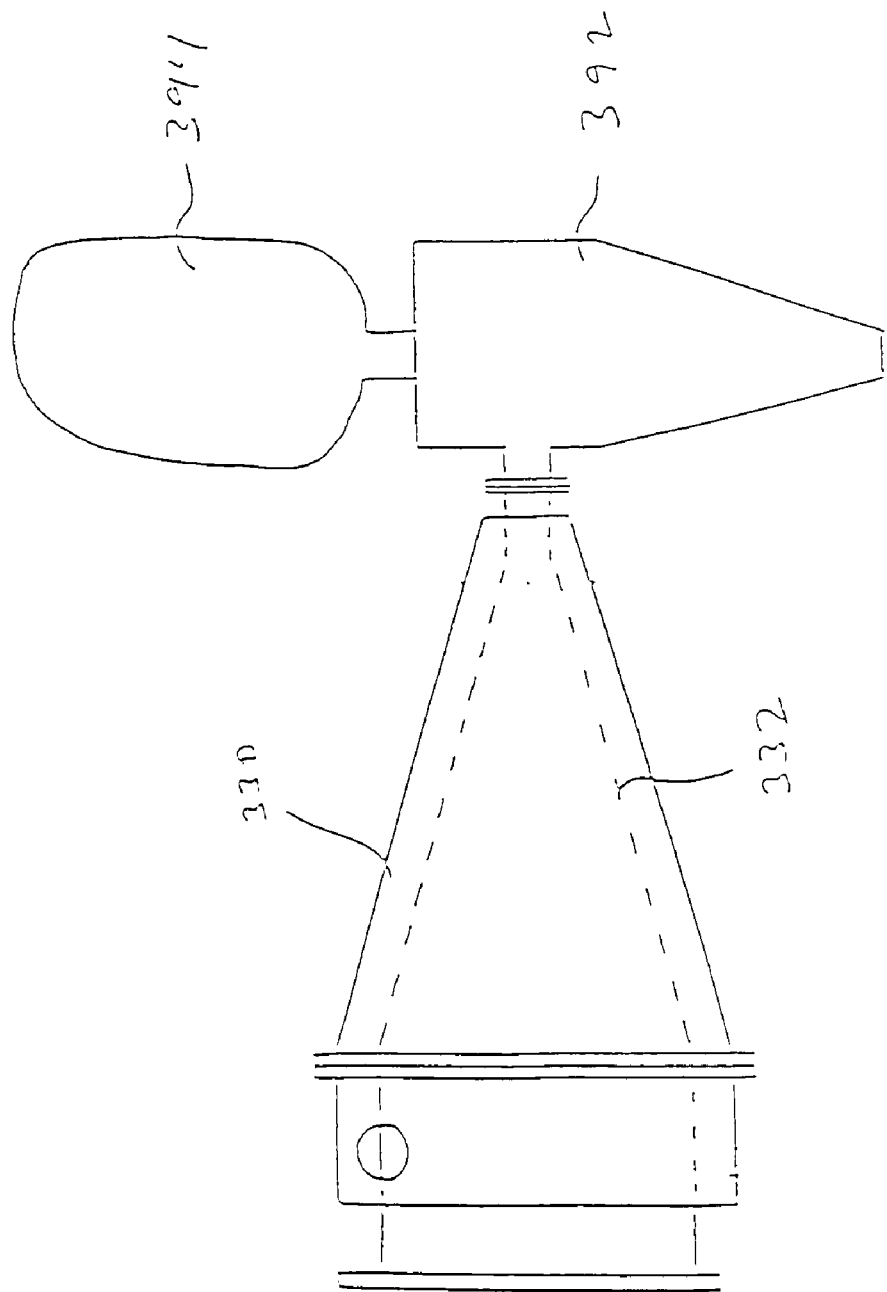
FIG. 32 is a side view showing one embodiment of a gas quench cooler of the present invention connected with a cyclone.
Figure 33:
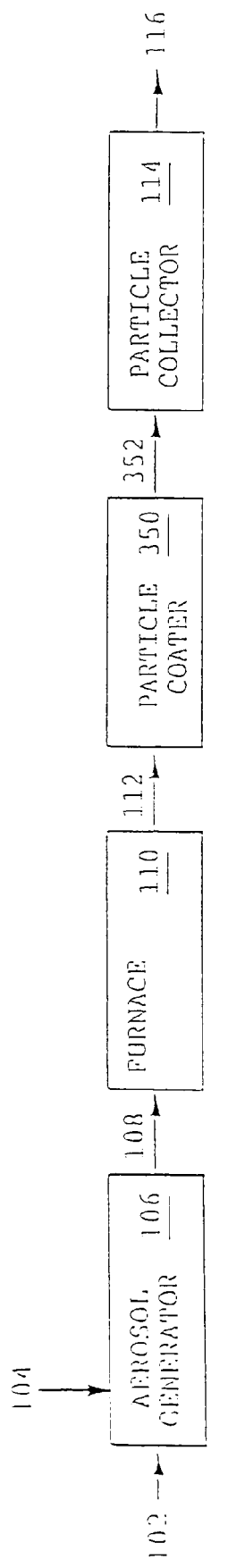
FIG. 33 is a process block diagram of one embodiment of the present invention including a particle coater.

Referring now to FIG. 32, one embodiment of the gas quench cooler 330 is shown in combination with a cyclone separator 392. The perforated conduit 332 has a continuously decreasing cross-sectional area for flow to increase the velocity of flow of the proper value for the feed to cyclone separator 392. Attached to the cyclone separator 392 is a bag filter 394 for final clean-up of overflow from the cyclone separator 392. Separated particles exit with underflow from the cyclone separator 392 and may be collected in any convenient container. The use of cyclone separation is particularly preferred for powder having a weight average size of larger than about 1 µm, although a series of cyclones may sometimes be needed to get the desired degree of separation. Cyclone separation is particularly preferred to powders having a weight average size of larger than about 1.5 µm. Also, cyclone separation is best suited for high density materials. Preferably, when particles are separated using a cyclone, the particles are of a composition with specific gravity of greater than about 5.

Figure 34:
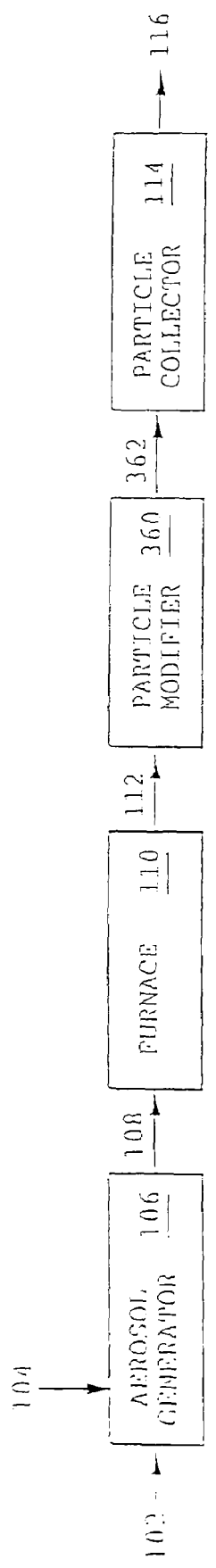
FIG. 34 is a block diagram of one embodiment of the present invention including a particle modifier.
Figure 35:
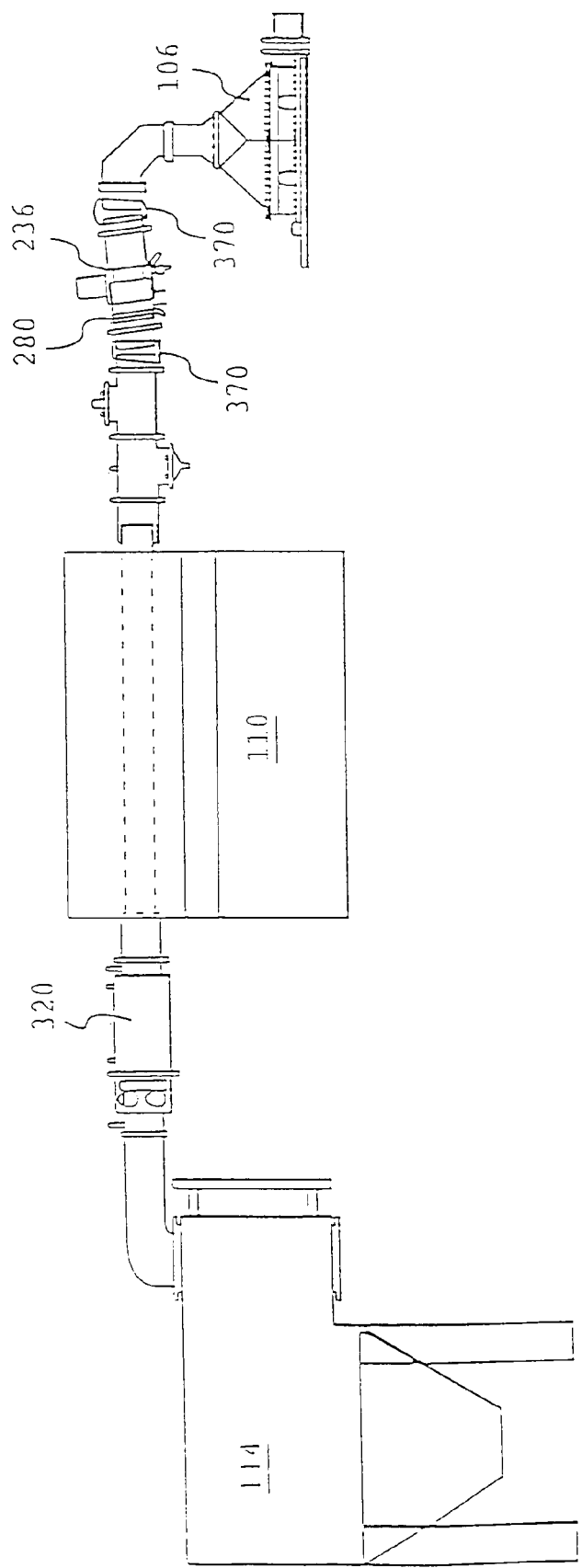
FIG. 35 is a block diagram of one embodiment of the process of the present invention including the addition of a dry gas between the aerosol generator and the furnace.

In a further embodiment of the present invention, following preparation of the particles 112 in the furnace 110, the particles 112 may then be structurally modified to impart desired physical and chemical properties. Referring now to FIG. 34, one embodiment of the process of the present invention is shown including such structural particle modification. The particles 112 exiting the furnace 110 go to a particle modifier 360 where the particles are structurally modified to form modified particles 362, which are then sent to the particle collector 114 for preparation of the particulate product 116. The particle modifier 360 is typically a furnace, such as an annealing furnace, which may be integral with the furnace 110 or may be a separate heading device. Regardless, it is important that the particle modified 360 have temperature control that is independent of the furnace 110, so that the proper conditions for particle modification may be provided separate from conditions required of the furnace 110 to prepare the particles 112. The particle modifier 360, therefore, typically provides a temperature controlled environment and necessary residence time to effect the desired structural and/or chemical modification of the particles 112.

The structural modification that occurs in the particle modifier 360 may be any modification to the crystalline structure or morphology of the particles 112. Preferably, the particles 112 are heat treated in the particle modifier 360 to further convert and density the particles 112 or to recrystallize the particles 112 into a highly crystalline form. Particularly preferred parameters for such processes are discussed in more detail below.

Aerosol generation with the process of the present invention has thus far been described with respect to the ultrasonic aerosol generator. Use of the ultrasonic generator is preferred for the process of the present invention because of the extremely high quality and dense aerosol generated. In some instances, however, the aerosol generation for the process of the present invention may have a different design depending upon the specific application. For example, when larger particles are desired, such as those having a weight average size of larger than about 3 μm, a spray nozzle atomizer may be preferred. For smaller-particle applications, however, and particularly for those applications to produce particles smaller than about 3 μm, and preferably smaller than about 2 μm in size, as is generally desired with the phosphor particles of the present invention, the ultrasonic generator, as described herein, is particularly preferred. In that regard, the ultrasonic generator of the present invention is particularly preferred for when making particles with a weight average size of from about 0.2 μm to about 3 μm.

Although ultrasonic aerosol generators have been used for medical applications and home humidifiers, use of ultrasonic generators for spray pyrolysis particles manufacture has largely been confined to small-scale, experimental situations. The ultrasonic aerosol generator of the present invention described with reference to FIGS. 5-24, however, is well suited for commercial production of high quality powders with a small average size and a narrow size distribution. In that regard, the aerosol generator produces a high quality aerosol, with heavy droplet loading and at a high rate of production. Such a combination of small droplet size, narrow size distribution, heavy droplet loading, and high production rate provide significant advantages over existing aerosol generators that usually suffer from at least one of inadequately narrow size distribution, undesirably low droplet loading, or unacceptably low production rate.

Through the careful and controlled design of the ultrasonic generator of the present invention, an aerosol may be produced typically having greater than about 70 weight percent (and preferably greater than about 80 eight percent) of droplets in the size range of from about 1 μm to about 10 μm, preferably in a size range of from about 1 μm to about 5 μm and more preferably from about 2 μm to about 4 μm. Also, the ultrasonic generator of the present invention is capable of delivering high output rates of liquid feed in the aerosol. The rate of liquid feed, at the high liquid loadings previously described, is preferably greater than about 25 milliliters per hour per transducer, preferably greater than about 37.5 milliliters per hour per transducer, even more preferably greater than about 50 milliliters per hour per transducer and most preferably greater than about 100 millimeters per hour per transducer. This high level of performance is desirable for commercial operations and is accomplished with the present invention with a relatively simple design including a single precursor bath over an array of ultrasonic transducers. The ultrasonic generator is made for high aerosol production rates at a high droplet loading, and with a narrow size distribution of droplets. The generator preferably produces an aerosol at a rate of greater than about 0.5 liter per hour of droplets, more preferably greater than about 2 liters per hour of droplets, still more preferably greater than about 5 liters per hour of droplets, even more preferably greater than about 10 liters per hour of droplets and most preferably greater than about 40 liters per hour of droplets. For example, when the aerosol generator has a 400 transducer design, as described with reference to FIGS. 7-24, the aerosol generator is capable of producing a high quality aerosol having high droplet loading as previously described, at a total production rate of preferably greater than about 10 liters per hour of liquid feed, more preferably greater than about 15 liters per hour of liquid feed, even more preferably greater than about 20 liters per hour of liquid feed and most preferably greater than about 40 liters per hour of liquid feed.

Under most operating conditions, when using such an aerosol generator, total particulate product produced is preferably greater than about 0.5 gram per hour per transducer, more preferably greater than about 0.75 gram per hour per transducer, even more preferably greater than about 1.0 gram per hour per transducer and most preferably greater than about 2.0 grams per hour per transducer. The mass of powder produced per unit time will be influenced by the molecular weight of the compound.

One significant aspect of the process of the present invention for manufacturing particulate materials is the unique flow characteristics encountered in the furnace relative to laboratory scale systems. The maximum Reynolds number attained for flow in the furnace 110 with the present invention is very high, typically in excess of 500, preferably in excess of 1,000 and more preferably in excess of 2,000. In most instances, however, the maximum Reynolds number for flow in the furnace will not exceed 10,000, and preferably will not exceed 5,000. This is significantly different from lab-scale systems where the Reynolds number for flow in a reactor is typically lower than 50 and rarely exceeds 100.

The Reynolds number (Re) is a dimensionless quantity characterizing flow of a fluid which, for flow through a circular cross sectional conduit is defined as:

$$Re = \frac{\rho v d}{\mu}$$

where:
  $\rho$=fluid density;
  $v$=fluid mean velocity;
  $d$=conduit inside diameter; and
  $\mu$=fluid viscosity.

It should be noted that the values for density, velocity and viscosity will vary along the length of the furnace 110. The maximum Reynolds number in the furnace 110 is typically attained when the average stream temperature is at a maximum, because the gas velocity is at a very high value due to gas expansion when heated.

One problem with operating under flow conditions at a high Reynolds number is that undesirable volatilization of components is much more likely to occur than in systems having flow characteristics as found in laboratory-scale systems. The volatilization problem occurs with the present invention, because the furnace is typically operated over a substantial section of the heating zone in a constant wall heat flux mode, due to limitations in heat transfer capability. This is significantly different than operation of a furnace at a laboratory scale, which typically involves operation of most of the heating zone of the furnace in a uniform wall temperature mode, because the heating load is sufficiently small that the system is not heat transfer limited.

With the present invention, it is typically preferred to heat the aerosol stream in the heating zone of the furnace as quickly as possible to the desired temperature range for particle manufacture. Because of flow characteristics in the furnace and heat transfer limitations, during rapid heating of the aerosol the wall temperature of the furnace can significantly exceed the maximum average target temperature for the stream. This is a problem because, even though the average stream temperature may be within the range desired, the wall temperature may become so hot that components in the vicinity of the wall are subjected to temperatures high enough to undesirably volatilize the components. This volatilization near the wall of the furnace can cause formation of significant quantities of ultrafine particles that are outside of the size range desired.

Therefore, with the present invention, it is preferred that when the flow characteristics in the furnace are such that the Reynolds number through any part of the furnace exceeds 500, more preferably exceeds 1,000, and most preferably exceeds 2,000, the maximum wall temperature in the furnace should be kept at a temperature that is below the temperature at which a desired component of the final particles would exert a vapor pressure not exceeding about 200 millitorr, more preferably not exceeding about 100 millitorr, and most preferably not exceeding about 50 millitorr. Furthermore, the maximum wall temperature in the furnace should also be kept below a temperature at which an intermediate component, from which a final component is to be at least partially derived, should also have a vapor pressure not exceeding the magnitudes noted for components of the final product.

In addition to maintaining the furnace wall temperature below a level that could create volatilization problems, it is also important that this not be accomplished at the expense of the desired average stream temperature. The maximum average stream temperature must be maintained at a high enough level so that the particles will have a desired high density. The maximum average stream temperature should, however, generally be a temperature at which a component in the final particles, or an intermediate component from which a component in the final particles is at least partially derived, would exert a vapor pressure not exceeding about 100 millitorr, preferably not exceeding about 50 millitorr, and most preferably not exceeding about 25 millitorr.

So long as the maximum wall temperature and the average stream temperature are kept below the point at which detrimental volatilization occurs, it is generally desirable to heat the stream as fast as possible and to remove resulting particles from the furnace immediately after the maximum stream temperature is reached in the furnace. With the present invention, the average residence time in the heating zone of the furnace may typically be maintained at shorter than about 4 seconds, preferably shorter than about 2 seconds, more preferably shorter than about 1 second, still more preferably shorter than about 0.5 second, and most preferably shorter than about 0.2 second.

Another significant issue with respect to operating the process of the present invention, which includes high aerosol flow rates, is loss within the system of materials intended for incorporation into the final particulate product. Material losses in the system can be quite high if the system is not properly operated. If system losses are too high, the process would not be practical for use in the manufacture of particulate products of many materials. This has typically not been a major consideration with laboratory-scale systems.

One significant potential for loss with the process of the present invention is thermophoretic losses that occur when a hot aerosol stream is in the presence of a cooler surface. In that regard, the use of the quench cooler, as previously described, with the process of the present invention provides an efficient way to cool the particles without unreasonably high thermophoretic losses. There is also, however, significant potential for losses occurring near the end of the furnace and between the furnace and the cooling unit.

It has been found that thermophoretic losses in the back end of the furnace can be significantly controlled if the heating zone of the furnace is operated such that the maximum stream temperature is not attained until near the end of the heating zone in the furnace, and at least not until the last third of the heating zone. When the heating zone includes a plurality of heating sections, the maximum average stream temperature should ordinarily not occur until at least the last heating section. Furthermore, the heating zone should typically extend to as close to the exit of the furnace as possible. This is counter to conventional thought which is typically maintain the exit portion of the furnace at a low temperature to avoid having to seal the furnace outlet at a high temperature. Such cooling of the exit portion of the furnace, however, significantly promotes thermophoretic losses. Furthermore, the potential for operating problems that could result in thermophoretic losses at the back end of the furnace are reduced with the very short residence times in the furnace for the present invention, as discussed previously.

Typically, it would be desirable to instantaneously cool the aerosol upon exiting the furnace. This is not possible. It is possible, however, to make the residence time between the furnace outlet and the cooling unit as short as possible. Furthermore, it is desirable to insulate the aerosol conduit occurring between the furnace exit and the cooling unit entrance. Even more preferred is to insulate that conduit and, even more preferably, to also heat that conduit so that the wall temperature of that conduit is at least as high as the average stream temperature of the aerosol stream. Furthermore, it is desirable that the cooling unit operate in a manner such that the aerosol is quickly cooled in a manner to prevent thermophoretic losses during cooling. The quench cooler, described previously, is very effective for cooling with low losses. Furthermore, to keep the potential for thermophoretic losses very low, it is preferred that the residence time of the aerosol stream between attaining the maximum stream temperature in the furnace and a point at which the aerosol has been cooled to an average stream temperature below about 200° C. is shorter than about 2 seconds, more preferably shorter than about 1 second, and even more preferably shorter than about 0.5 second and most preferably shorter than about 0.1 second. Furthermore, the total residence time from the beginning of the heating zone in the furnace to a point at which the average stream temperature is at a temperature below about 200° C. should typically be shorter than about 5 seconds, preferably shorter than about 3 seconds, more preferably shorter than about 2 seconds, and most preferably shorter than about 1 second.

Another part of the process with significant potential for the thermophoretic losses is after particle cooling until the particles are finally collected. Proper particle collection is very important to reducing losses within the system. The potential for thermophoretic losses is significant following particle cooling because the aerosol stream is still at an elevated temperature to prevent detrimental condensation of water in the aerosol stream. Therefore, cooler surfaces of particle collection equipment can result in significant thermophoretic losses.

To reduce the potential for thermophoretic losses before the particles are finally collected, it is important that the transition between the cooling unit and particle collection be as short as possible. Preferably, the output from the quench cooler is immediately sent to a particle separator, such as a filter unit or a cyclone. In that regard, the total residence time of the aerosol between attaining the maximum average stream temperature in the furnace and the final collection of the particles is preferably shorter than about 2 seconds, more preferably shorter than about 1 second, still more preferably shorter than about 0.5 second and most preferably shorter than about 0.1 second. Furthermore, the residence time between the beginning of the heating zone in the furnace and final collection of the particles is preferably shorter than about 6 seconds, more preferably shorter than about 3 seconds, even more preferably shorter than about 2 seconds, and most preferably shorter than about 1 second. The potential for thermophoretic losses may further be reduced by insulating the conduit section between the cooling unit and the particle collector and, even more preferably, by also insulating around the filter, when a filter is used for particle collection. The potential for losses may be reduced even further by heating of the conduit section between the cooling unit and the particle collection equipment, so that the internal equipment surfaces are at least slightly warmer than the aerosol stream average stream temperature. Furthermore, when a filter is used for particle collection, the filter could be heated. For example, insulation could be wrapped around a filter unit, with electric heating inside of the insulating layer to maintain the walls of the filter unit at a desired elevated temperature higher than the temperature of filter elements in the filter unit, thereby reducing thermophoretic particle losses to walls of the filter unit.

Even with careful operation to the reduce thermophoretic losses, some losses will still occur. For example, some particles will inevitably be lost to walls of particle collection equipment, such as the walls of a cyclone or filter housing. One way to reduce these losses, and correspondingly increase product yield, is to periodically wash the interior of the particle collection equipment to remove particles adhering to the ides. In most cases, the wash fluid will be water, unless water would have a detrimental effect on the particles. For example, the particle collection equipment could include parallel collection paths. One path could be used for active particle collection while the other is being washed. The wash could include an automatic or manual flush without disconnecting the equipment. Alternatively, the equipment to be washed could be disconnected to permit access to the interior of the equipment for a thorough wash. As an alternative to having parallel collection paths, the process could simply be shut down occasionally to permit disconnection of the equipment for washing. The removal equipment could be replaced with a clean piece of equipment and the process could then be resumed while the disconnected equipment is being washed.

for example, a cyclone or filter until could periodically be disconnected and particles adhering to interior walls could be removed by a water wash. The particles could then be dried in a low temperature dryer, typically at a temperature of lower than about 50° C.

Another area for potential losses in the system, and for the occurrence of potential operating problems, is between the outlet of the aerosol generator and the inlet of the furnace. Losses here are not due to thermophoresis, but rather to liquid coming out of the aerosol and impinging and collecting on conduit and equipment surfaces. Although this loss is undesirable from a material yield standpoint, the loss may be even more detrimental to other aspects of the process. For example, water collecting on surfaces may release large droplets that can lead to large particles that detrimentally contaminate the particulate product. Furthermore, if accumulated liquid reaches the furnace, the liquid can cause excessive temperature gradients within the furnace tube, which can cause furnace tube failure, especially for ceramic tubes.

One way to reduce the potential for undesirable liquid buildup in the system is to provide adequate drains, as previously described. In that regard, it is preferred that a drain be placed as close as possible to the furnace inlet to prevent liquid accumulations from reaching the furnace. The drain should be placed, however, far enough in advance of the furnace inlet such that the stream temperature is lower than about 80° C. at the drain location.

Another way to reduce the potential for undesirable liquid buildup is for the conduit between the aerosol generator outlet and the furnace inlet to be of a substantially constant cross sectional area and configuration. Preferably, the conduit beginning with the aerosol generator outlet, passing through the furnace and continuing to at least the cooling unit inlet is of a substantially constant cross sectional area and geometry.

Another way to reduce the potential for undesirable buildup is to heat at least a portion, and preferably the entire length, of the conduit between the aerosol generator and the inlet to the furnace. For example, the conduit could be wrapped with a heating tape to maintain the inside walls of the conduit at a temperature higher than the temperature of the aerosol. The aerosol would then tend to concentrate toward the center of the conduit due to thermophoresis. Fewer aerosol droplets would, therefore, be likely to impinge on conduit walls of other surfaces making the transition to the furnace.

Another way to reduce the potential for undesirable liquid buildup is to introduce a dry gas into the aerosol between the aerosol generator and the furnace. Referring now to FIG. 35, one embodiment of the process is shown for adding a dry gas 118 to the aerosol 108 before the furnace 110. Addition of the dry gas 118 causes vaporization of at least a part of the moisture in the aerosol 108, and preferably substantially all of the moisture in the aerosol 108, to form a dried aerosol 119, which is then introduced into the furnace 110.

The dry gas 118 will most often be dry air, although in some instances it may be desirable to use dry nitrogen gas or some other dry gas. If a sufficient quantity of the dry gas 118 is used, the droplets of the aerosol 108 are substantially completely dried to beneficially form dried precursor particles in aerosol form for introduction into the furnace 110, where the precursor particles are then pyrolyzed to make a desired particulate product. Also, the use of the dry gas 118 typically will reduce the potential for contact between droplets of the aerosol and the conduit wall, especially in the critical area in the vicinity of the inlet to the furnace 110. In that regard, a preferred method for introducing the dry gas 118 into the aerosol 108 is from a radial direction into the aerosol 108. For example, equipment of substantially the same design as the quench cooler, described previously with reference to FIGS. 29-31, could be used, with the aerosol 108 flowing through the interior flow path of the apparatus and the dry gas 118 being introduced through perforated wall of the perforated conduit. An alternative to using the dry gas 118 to dry the aerosol 108 would be to use a low temperature thermal preheater/dryer prior to the furnace 110 to dry the aerosol 108 prior to introduction into the furnace 110. This alternative is not, however, preferred.

Still another way to reduce the potential for losses due to liquid accumulation is to operate the process with equipment configurations such that the aerosol stream flows in a vertical direction from the aerosol generator to and through the furnace. For smaller-size particles, those smaller than about 1.5 μm, this vertical flow should preferably, be vertically upward. For larger-size particles, such as those larger than about 1.5 μm, the vertical flow is preferably vertically downward.

Furthermore, with the process of the present invention, the potential for system losses is significantly reduced because the total system retention time from the outlet of the generator until collection of the particles is typically shorter than about 10 seconds, preferably shorter than about 7 seconds, more preferably shorter than about 5 seconds and most preferably shorter than about 3 seconds.

Proper selection of the precursor material is important to the formation of the phosphor particles according to the present invention. As is discussed above, it is preferred according to one embodiment of the present invention to form substantially hollow phosphor particles. During the heating of the aerosol droplets, the evaporation of water occurs at the droplet surface. This causes the precursor to become supersaturated at the surface leading to the formation of a crust. Before the precursor begins to decompose into the phosphor compound, such as a metal oxide, the precursor may melt if the melting point is lower than the reactor temperature. This causes the dried particle to form a liquid droplet. The liquid precursor in the droplet than begins to decompose into the phosphor compound. During this stage, byproduct gases are evolved which cause the particle to become hollow. This mechanism and the increased surface precipitation of the phosphor compound at the surface of the particle lead to the formation of hollow microspheres.

Metal salts such as nitrates, chlorides, sulfates, hydroxides or oxalates can be used as precursors to the phosphor compound. A preferred metal salt are the metal nitrates. As an example, the reaction mechanism for the formation of a metal oxide, such as yttria, from a nitrate salt is:

$$2Y(NO_3)_2 + H_2O + heat \rightarrow Y_2O_3 + NO_x + H_2O$$

Metal sulfide phosphors, as discussed above, can be prepared from an aqueous solution by the reaction of a metal compound such as a carbonate, oxide, hydroxide, sulfate or nitrate with a sulfur-containing acid such as thioacetic acid thiocarboxylic acid (HS(O)CR) or dithiocarboxylic acid, to form a water soluble complex, such as $M(S(O)CR)_2 \cdot xH_2O$. The complex can also be formed from a soluble metal salt and sulfur-containing ligand such as thiourea. Preferably, at least about 2 equivalents of acid are added to ensure complete reaction with the metal compound. The solution, when pyrolyzed under $N_2$, leads to the metal sulfide.

$$MCO_3 + 2HS(O)CR - H_2O \rightarrow M(S(O)CR)_2 \cdot xH_2O + CO_2 + H_2O$$

$$M(S(O)CR)_2 \cdot xH_2O + heat/N_2 \rightarrow MS + \text{volatile by-products}$$

$$MSO_4 \rightarrow MS + \text{volatile by-products}$$

$$M(NO_3)_2 + SC(NR_2)_2 \rightarrow MS + \text{volatile by-products}$$

$$M(SCNR_2)_2 \rightarrow MS + \text{volatile by-products}$$

The solution preferably has a phosphor precursor concentration that is unsaturated to avoid the formation of precipitates and preferably includes sufficient precursor to yield from about 1 to about 50 weight percent such as from about 1 to 15 weight percent, of the phosphor compound, based on the total amount of metal(s) in solution. Preferably the solvent is aqueous-based for ease of operation, although other solvents, such as toluene, may be desirable for specific materials. The use of organic solvents can, however, lead to undesirable carbon contamination in the phosphor particles. The pH of the aqueous-based solutions can be adjusted to alter the solubility characteristics of the precursor in the solution.

The phosphor particles according to the present invention can also be coated, such as to improve the durability of the phosphors or alter the luminescence characteristics. When the phosphor particles are modified by coating the particles, the precursors to coatings can be selected from volatile metal acetates, chlorides, alkoxides or halides. Such precursors are known to react at high temperatures to form the corresponding metal oxides and eliminate supporting ligands or ions. For example, $SiCl_4$ can be used as a precursor to $SiO_2$ coatings when water vapor is present:

$$SiCl_{4(g)} + 2H_2O_{(g)} \rightarrow SiO_{2(s)} + 4 HCl_{(g)}$$

$SiCl_4$ also is highly volatile and is a liquid at room temperature, which makes transport into the reactor more controllable.

Metal alkoxides can be used to produce metal oxide films by hydrolysis. The water molecules react with the alkoxide M-O bond resulting in clean elimination of the corresponding alcohol with the formation of M-O-M bonds:

$$Si(OEt)_4 + 2H_2O \rightarrow SiO_2 + 4EtOH$$

Most metal alkoxides have a reasonably high vapor pressure and are therefore well suited as coating precursors.

Metal acetates are also useful as coating precursors since they readily decompose upon thermal activation by acetic anhydride elimination:

$$Mg(O_2CCH_3)_2 \rightarrow MgO + CH_3C(O)OC(O)CH_3$$

Metal acetates are advantageous as coating precursors since they are water stable and are reasonably inexpensive.

Coatings can be generated on the particle surface by a number of different mechanisms. One or more precursors can vaporize and fuse to the hot phosphor particle surface and thermally react resulting in the formation of a thin-film coating by chemical vapor deposition (CVD). Preferred coatings deposited by CVD include metal oxides and elemental metals. Further, the coating can be formed by physical vapor deposition (PVD) wherein a coating material physically deposits an the surface of the particles. Preferred coatings deposited by PVD include organic materials and elemental metals. Alternatively, the gaseous precursor can react in the gas phase forming small particles, for example less than about 5 nanometers in size, which then diffuse to the larger particle surface and sinter onto the surface, thus forming a coating. This method is referred to as gas-to-particle conversion (GPC). Whether such coating reactions occur by CVD, PVD or GPC is dependent on the reactor conditions such as precursor partial pressure, water partial pressure and the concentration of particles in the gas stream. Another possible surface coating method is surface conversion of the surface of the particle by reaction with a vapor phase reactant to convert the surface of the particles to a different material than that originally contained in the particles.

In addition, a volatile coating material such as PbO, $MoO_3$ or $V_2O_5$ can be introduced into the reactor such that the coating deposits on the particle by condensation. Highly volatile metals, such as silver, can also be deposited by condensation. Further, the phosphor powders can be coated using other techniques. For example, a soluble precursor to both the phosphor powder and the coating can be used in the precursor solution wherein the coating precursor is involatile (e.g., $Al(NO_3)_3$) or volatile (e.g. $Sn(OAc)_4$ where Ac is acetate). In another method, a colloidal precursor and a soluble phosphor precursor can be used to form a particulate colloidal coating on the phosphor.

The structural modification that occurs in the particle modifier may be any modification to the crystalline structure or morphology of the particles. For example, the particles can be annealed in the particle modifier to densify the particles or to recrystallize the particles into a polycrystalline form. Also, especially in the case of composite particles, the particles may be annealed for a sufficient time to permit redistribution within the phosphor particles of different material phases.

More specifically, the phosphor powders produced by the foregoing method may be fully converted to the crystalline phosphor compound during the pyrolization step. However, the phosphor particles may also be spray-converted to an intermediate form. It is then necessary to heat the spray converted intermediate precursor particles to convert the intermediate precursor powder to a luminescent phosphor compound and to increase the crystallinity of the powder. Thus, the powders can be heat-treated for an amount of time and in a preselected environment to convert the powders to luminescent phosphor compounds. The temperature and time for the heat treatment should be selected to minimize the amount of interparticle sintering while substantially fully converting the intermediate compound to the final phosphor compound. For example, typical heat treatment steps include heating the particles at temperatures from about 1000° C. to 1500° C. for up to about two hours. To reduce agglomeration, the particles are preferably heat treated under sufficient agitation to reduce agglomeration of the particles.

For producing the inorganic phosphor particles or intermediate precursor particles, the carrier gas may comprise any gaseous medium in which droplets produced from the liquid feed may be dispersed in aerosol form. The carrier gas may be inert, in that the carrier gas does not participate in the formation of the particles. Alternatively, the carrier gas may have one or more active component(s) that contribute to formation of the particles. In that regard, the carrier gas may include one or more reactive components that react in the furnace to contribute to the formation of the particles. In many applications according to the present invention, air will be a satisfactory carrier gas for providing oxygen and forming a metal oxide phosphor.

To more specifically illustrate the foregoing, a preferred method or forming europium doped yttrium oxide ($Y_2O_3$:Eu) will be described. The precursor solution preferably includes from about 4 weight percent to 8 weight percent of the precursors based on $Y_2O_3$:Eu. The use of nitrate salts for both the yttria and the europium is preferred since the nitrate salt has a large decrease in volume from the nitrate precursor to the oxide phosphor product. No densification aids such as urea are added that will cause the particles to substantially densify. Nitric acid can also be added to the solution to cause the particles to balloon in size. The solutions are atomized, such as with ultrasonic nebulizers, and are carried through a heated reactor furnace at a temperature of 900° C. to 1100° C. using air as the carrier gas. This forms intermediate precursor particles which can then be post treated at a temperature of 1350° C. to 1450° C. for from about 30 to 90 minutes. The resulting $Y_2O_3$:Eu particles have a porosity of up to about 40 percent and good luminescent characteristics.

The phosphor particles are dispersed in a liquid vehicle to form a suspension that can be deposited using a direct-write tool. For use in an ink-jet device, the viscosity of the suspension is preferably not greater than about 30 centipoise, more preferably not greater than about 20 centipoise. It is also important to control the surface tension of the liquid suspension and preferably the surface tension is from about 20 to 25 dynes/cm for an ink-jet device.

The solids loading of phosphor particles in the suspension is preferably as high as possible without adversely affecting the viscosity or other necessary properties of the direct-write composition. For example, the direct-write composition can have a loading of phosphor particles of up to about 75 weight percent, such as from about 10 to about 50 weight percent.

The direct-write compositions are typically water-based, although other solvents or liquids may be used. Such compositions can include other chemicals including, but not limited to, surfactants, dispersion agents, defoamers, chelating agents, humectants and the like.

More specifically, the ink-jet compositions generally include water and an alcohol. Surfactants are also used to maintain the particles in suspension. Co-solvents, also known as humectants, are used to prevent the ink from crusting and clogging the orifice of the ink-jet head. Biocides can also be added to prevent bacterial growth over time. Examples of such ink-jet liquid vehicle compositions are disclosed in U.S. Pat. No. 5,853,470 by Martin et al.; U.S. Pat. No. 5,679,724 by Sacripante et al.; U.S. Pat. No. 5,725,647 by Carlson et al.; U.S. Pat. No. 4,877,451 by Winnik et al.; U.S. Pat. No. 5,837,045 by Johnson et al.; and U.S. Pat. No. 5,837,041 by Bean et al. Each of the foregoing U.S. patents is incorporated by reference herein in their entirety. The selection of such additives is based upon the desired properties of the composition, as is known to those skilled in the art. The phosphor particles are mixed with the liquid vehicle using a mill or, for example, an ultrasonic processor.

According to one preferred embodiment of the present invention, the liquid vehicle into which the particles are dispersed includes soluble molecular precursors that have a relatively low decomposition temperature. The molecular precursor is preferably a soluble inorganic precursor that can be co-deposited with the powders and then thermally treated to form an essentially continuous phase filling the space between phosphor particles. Thermal treatment can be by moving the substrate in bulk through a furnace or, for example, by direct processes such as laser annealing. A preferred type of precursor compound are the alpha hydroxycarboxylate (glycolate) derivatives. Preferably, the molecular precursor forms essentially the same compound as the phosphor particles. In this embodiment, the particles in the liquid vehicle can advantageously catalyze the precursor to form the desired compound.

Figure 36:
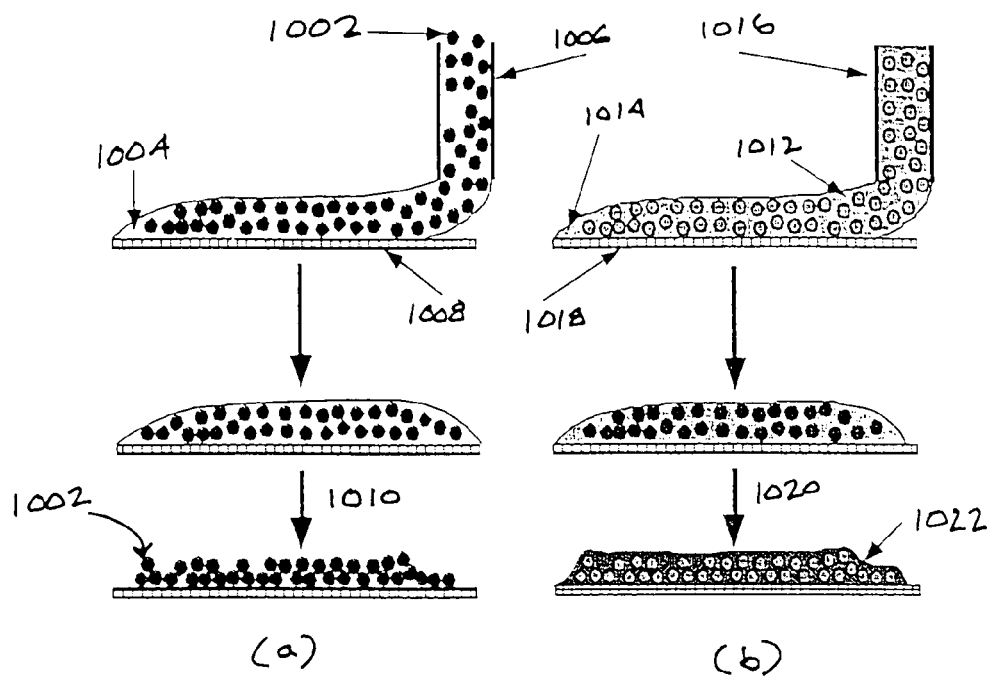
FIGS. 36(*a*) and (*b*) illustrate deposition methods according to the present invention.

A direct-write deposition method according to the present invention is illustrated schematically in FIG. 36. In FIG 36(*a*) a phosphor powder 1002 is dispersed in a liquid vehicle 1004 including water and various organics to aid in the dispersion of the phosphor powder 1002. The direct-write tool 1006 ejects the suspension through an orifice and onto a substrate 1108. After deposition the substrate 1008 is thermally treated 1010 to remove the liquid vehicle 1004 and deposit a thin layer of phosphor particles 1002.

In the embodiment illustrated in FIG. 36(*b*), the phosphor particles 1012 are dispersed in a liquid vehicle 1014 which includes water, organics and molecular precursors to a phosphor compound. The liquid suspension including the particles 1012 and precursor containing liquid vehicle 1014 are deposited using a direct-write tool 1016 onto a substrate 1018. After deposition, the substrate 1018 is thermally treated 1020, such as by laser annealing, to remove liquids and convert the precursors in the liquid. The resulting layer 1022 comprises phosphor particles dispersed throughout a thin-film of the compound.

The direct-write method of the present invention can be used in the fabrication of a wide variety of devices, such as CRT devices, flat panel displays and electroluminescent devices. Direct-write methods such as ink-jet deposition advantageously offer an economy in the manufacture of phosphor screens that cannot be achieved with conventional slurry or screen printing techniques. The method of the present invention can also be used to produce secure documents or other forms of indicia on articles of manufacture. The indicia can advantageously have high resolution and good luminescence.

CRT devices, utilizing a cathode ray tube include traditional display devices such as televisions and computer monitors. In a color CRT, the display screen is patterned with red, green and blue phosphors. Three color phosphor pixels are grouped in close proximity to produce multicolor images. The phosphor powder is typically applied to a CRT display screen using a slurry, formed by suspending phosphor particles in an aqueous solution. The slurry is deposited onto the inner surface of the display screen and is spun to thoroughly coat the surface and spin away any excess slurry. The slurry is then dried and exposed through a shadow mask having a predetermined dot-like or stripe-like pattern. The exposed film is developed and excess phosphor particles are washed away to form a phosphor screen having a predetermined pixel pattern. This process is performed in sequence for different color phosphors to enable a full color display to be produced. This is a labor intensive and complicated process and is not readily adaptable to producing prototypes or to low-volume production.

According to the present invention, CRT display screens can be produced in a fast and efficient manner by depositing the phosphor powder to form pixels using a direct-write tool, preferably an ink-jet device. The ink-jet device can be carefully controlled to deposit phosphor powders in predetermined regions (pixels), thereby eliminating the need for the multiple coating steps utilized in a traditional slurry based method. Higher resolution displays can advantageously be produced using an ink-jet. Further, the deposited phosphor particles have a high packing density which is desirable to obtain high resolution and to protect the glass substrate from direct bombardment by electrons. The high packing density of the particles also improves the adhesion of the particles to the substrate. Further, the small particles tend to sinter to adjacent particles and to the substrate during the baking process, resulting in strong adhesion of the particles to the substrate.

Figure 37:
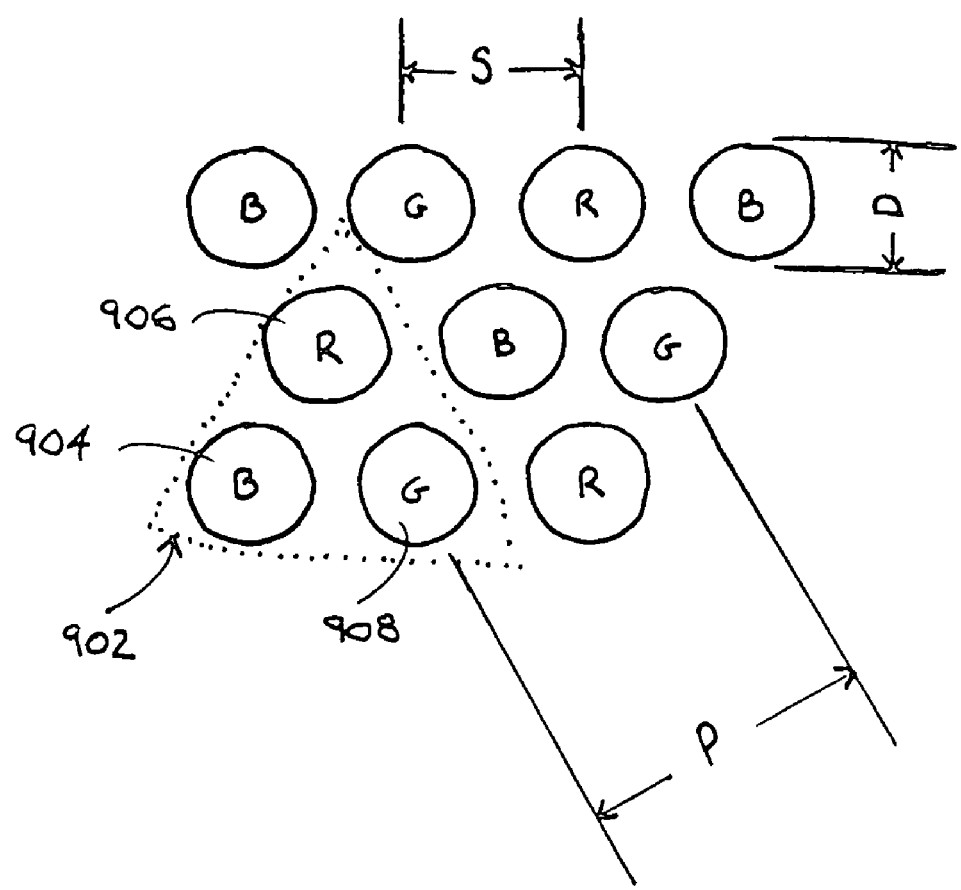

FIG. 37 illustrates a close-up view of pixels on a CRT display screen. Each pixel 902 includes three subpixels 904 (blue), 906 (red) and 908 (green). The pitch P is the distance between adjacent subpixels of like color. The spacing S is the distance between adjacent subpixels and each subpixel has a diameter D.

The phosphor subpixel diameter (D) for a pitch (P) of 0.2 mm is about 100 µm. Screens with increased resolution require improved techniques for depositing the phosphor layer. For example, in a 14 inch screen, the phosphor dot number is about 700,000 for each color or 2.1 million total. In addition to the need to eliminate missing dots, color mixing and discoloration must be prevented and uniformity over the entire phosphor screen is required. Because of these requirements, sharp edge shape of dots, the absence of color mixing, and other conditions are important in phosphor screens for color displays. Direct-write processes according to the present invention offer a unique solution for these requirements.

One type of CRT device to which the method of the present invention is particularly applicable is for the production of medical CRT devices. Medical CRT devices are high resolution, monochrome displays utilized to display images for analysis by medical personnel. One of the problems associated with such current devices is that photographic and digital images that are taken by medical personnel exceed the resolution of the CRT display which is the basis for the diagnosis. This is particular important since teleradiology, wherein a diagnosis is made by a doctor at a remote location from the patient, is becoming common. Since the medical CRT displays a still image as opposed to a moving video, the resolution of the display must be very high.

The resolution of these devices is governed by the size of the electron beam, the particle size of the phosphor particles, the phosphor layer thickness and the backing density of the phosphor particles. Present devices have a dot pitch (P) which is about 0.22 mm with a subpixel diameter (D) of slightly less than 100 µm. The method of the present invention can advantageously provide a means for depositing smaller dots with higher packing density than known heretofore. As a result, the medical CRT device will provide much higher resolution leading to more accurate and speedy diagnosis of the condition.

Figure 38:
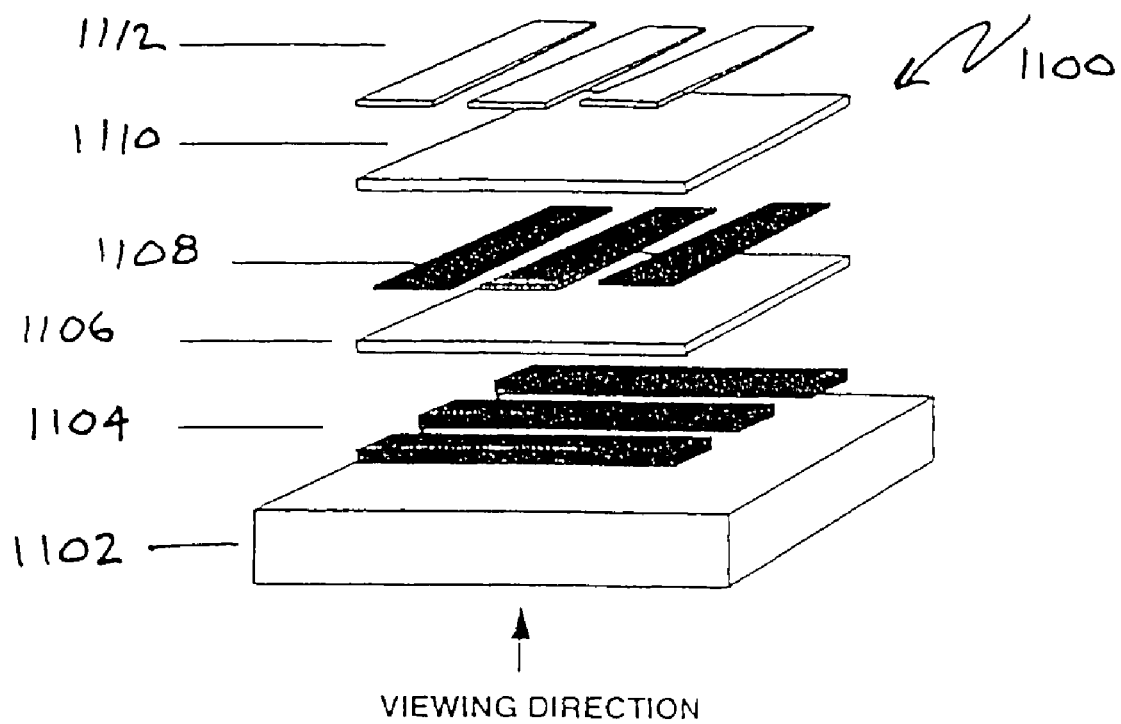

Another application of the present invention is in the field of thin-film electroluminescent displays (TFEL). Such a display is illustrated in FIG. 38. As is illustrated in FIG. 38, a substrate 1102 is overlaid with transparent electrodes 1104, an insulator 1106, a layer of phosphor particles 1108, an insulator 1110 and aluminum electrodes 1112. Typically, the phosphor layer 1108 is a deposited using a thin-film deposition technique. However, the method of the present invention wherein fine phosphor particles are deposited using a direct-write tool, can be used to form the layer at a reduced cost. It is particularly advantageous to form a TFEL device by incorporating soluble molecular precursors into the liquid vehicle, as is discussed above. Thus, a phosphor compound particle in a liquid vehicle including precursors to the phosphor compound can be deposited using a direct-write tool. Preferred phosphor compounds for TFEL applications include ZnS:Cu, $SrGa_2S_4$:Ce or Eu and SrS:Cu.

Figure 39:
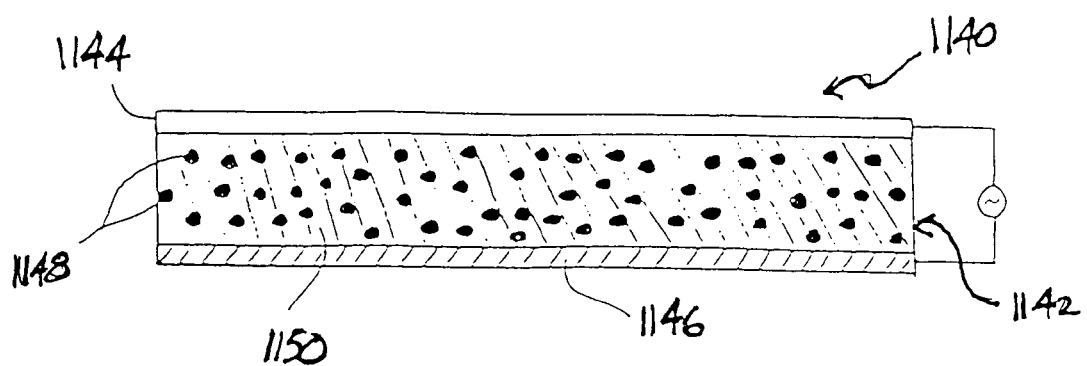

The method of the present invention is also applicable to electroluminescent lamps. Electroluminescent lamps are formed on a rigid or flexible substrate, such as a polymer substrate, and are commonly used as back lights for membrane switches, cellular phones, watches, personal digital assistance and the like. A simple electroluminescent lamp is schematically illustrated in FIG. 39. The device 1140 includes a phosphor powder/polymer composite 1142 sandwiched between two electrodes 1144 and 1146, the front electrode 1144 being transparent. The composite layer 1142 includes phosphor particles 1148 dispersed in a polymer matrix 1150. Electroluminescent lamps can also be formed on rigid substrates, such as stainless steel, for use in highway signage and similar devices. The methodology according to the present invention can be used to form discrete patterns of such phosphor powders in electroluminescent lamps such as for text or aesthetic purposes.

The present invention is also applicable to flat panel displays. Flat panel displays offer many advantages over CRTs including lighter weight portability and decreased powder requirements. One type of flat panel display is a field emission display (FED). These devices advantageously eliminate the size, weight and power consumption problems of CRT's while maintaining comparable image quality, and therefore are particularly useful for portable electronics, such as for laptop computers. FED's generate electrons from millions of cold microtip emitters with low power emission that are arranged in a matrix addressed array with several thousand tip emitters allocated to each pixel in the display. The microtip emitters are typically located approximately 0.2 millimeter from a cathoduluminescent phosphor screen, which generates the display image. This allows for a thin, light-weight display.

Figure 40:
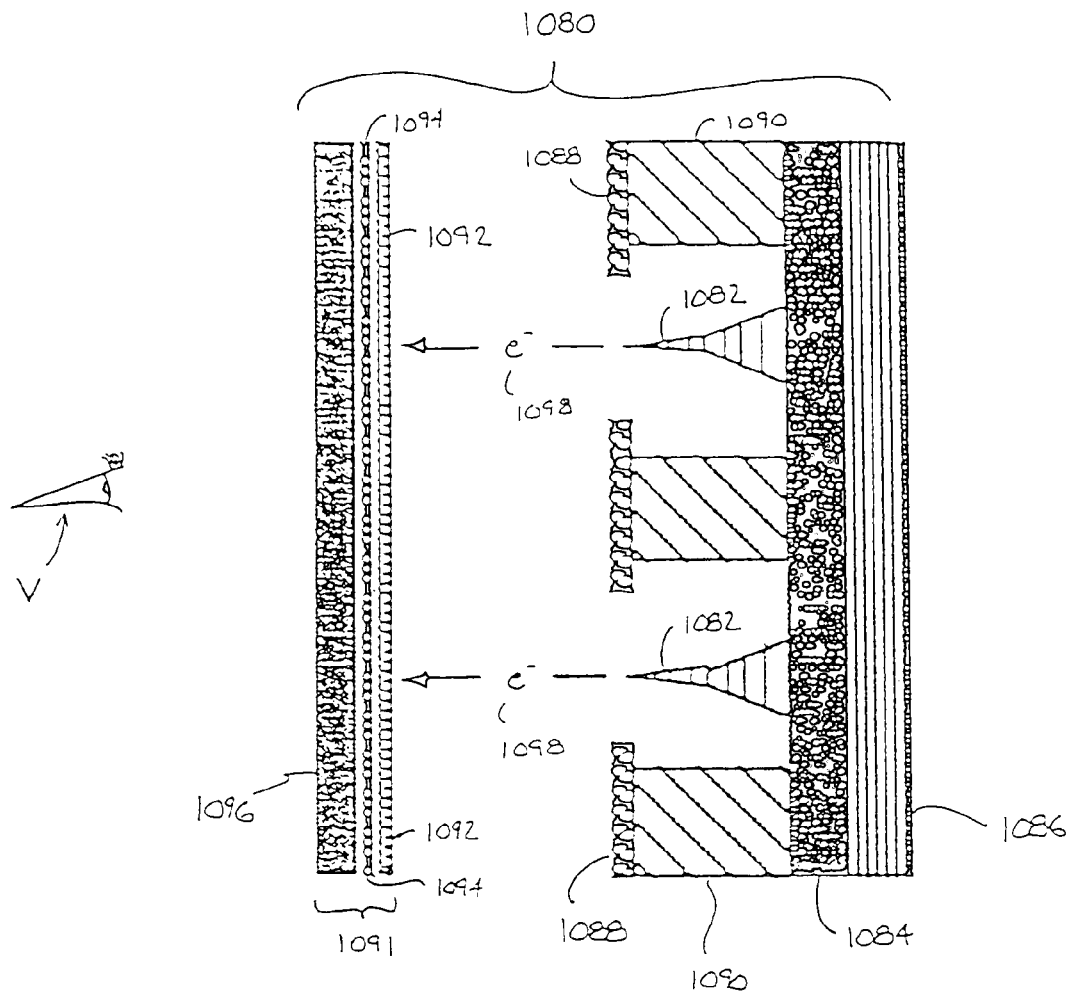

FIG. 40 illustrates a high-magnification, schematic cross-section of an FED device according to an embodiment of the present invention. The FED device 1080 includes a plurality of microtip emitters 1082 mounted on a cathode 1084 which is attached to a backing plate 1086. The cathode is separated from a gate or emitter grid 1088 by an insulating spacer 1090. Opposed to the cathode 1084 and separated by a vacuum is a faceplate assembly 1091 including phosphor pixel 1092 and a transparent anode 1094. The phosphor pixel layers can be deposited using a paste or electrophoretically. The FED can also include a transparent glass substrate 1096 onto which the anode 1094 is printed. During operation, a positive voltage is applied to the emitter grid 1088 creating a strong electric field at the emitter tip 1082. The electrons 1098 migrate to the faceplate 1091 which is maintained at a higher positive voltage. The faceplate collector bias is typically about 1000 volts. Several thousand microtip emitters 1082 can be utilized for each pixel in the display.

Phosphors which are particularly useful for FED devices include thiogallates such as $SrGa_2S_4$:Eu for green, $SrGa_2S_4$:Ce for blue and ZnS:Ag or Cl for blue. $Y_2O_3$:Eu can be used for red. ZnS:Ag or Cu can also be used for higher voltage FED devices. $Y_2SiO_5$:Tb or Eu can also be useful. For use in FED devices, these phosphors are preferably coated, such as with a very thin metal oxide coating, since the high electron beam current densities can cause breakdown and dissociation of the sulfur-containing phosphor host material. Dielectric coatings such as $SiO_2$ and $Al_2O_3$ can be used. Further, semiconducting coatings such as SnO or $In_2O_3$ can be particularly advantageous to absorb secondary electrons.

Coatings for the sulfur-containing FED phosphors preferably have an average thickness of from about 1 to 10 nanometers, more preferably from about 1 to 5 nanometers. Coatings having a thickness in excess of about 10 nanometers will decrease the brightness of the device since the electron penetration depth of 1-2 kV electrons is only about 10 nanometers. Such thin coatings can advantageously be monolayer coatings, as is discussed above.

The primary obstacle to further development of FED's is the lack of adequate phosphor powders. FED's require low-voltage phosphor materials, that is, phosphors which emit sufficient light under low applied voltages, such as less than about 500 volts, and high current densities. The sulfur-containing phosphor powders of the present invention advantageously have improved brightness under such low applied voltages and the coated phosphor particles resist degradation under high current densities. The improved brightness can be attributed to the high crystallinity and high purity of the particles. Phosphor particles with low crystallinity and high impurities due to processes such as milling do not have the desirable high brightness. The phosphor particles of the present invention also have the ability to maintain the brightness and chromaticity over long periods of time, such as in excess of 10,000 hours. Further, the spherical morphology of the phosphor powder improves light scattering and therefore improves the visual properties of the display. The small average size of the particles is advantageous since the electron penetration depth is only several nanometers, due to the low applied voltage.

The method of the present invention is also applicable to plasma display panels. Plasma display panels are relatively thin devices that present graphics and images without the use of a traditional picture tubs and operate with modest power requirements. Generally, flat panel displays include a phosphor powder selectively dispersed on a viewing panel, wherein the excitation source lies behind and in close proximity to the panel.

Plasma displays have image quality that is comparable to current CRT devices and can be easily scaled to large sizes such as 20 to 60 diagonal inches. The displays are bright and lightweight and have a thickness of form about 1.5 to 3 inches. A plasma display functions in a similar manner as fluorescent lighting. In a plasma display, plasma source, typically a gas mixture, is placed between an opposed array of addressable electrodes and a high energy electric field is generated between the electrodes. Upon reaching a critical voltage, a plasma is formed from the gas and UV photons are emitted by the plasma. Color plasma displays contain three-color photoluminescent phosphor particles deposited on the inside of the glass faceplate. The phosphors selectively emit light when illuminated by the photons. Plasma displays operate at relatively low currents and can be driven either by an AC or DC signal. AC plasma systems use a dielectric layer over the electrode, which forms a capacitor. This impedance limits current and provides a necessary charge in the gas mixture.

Figure 41:
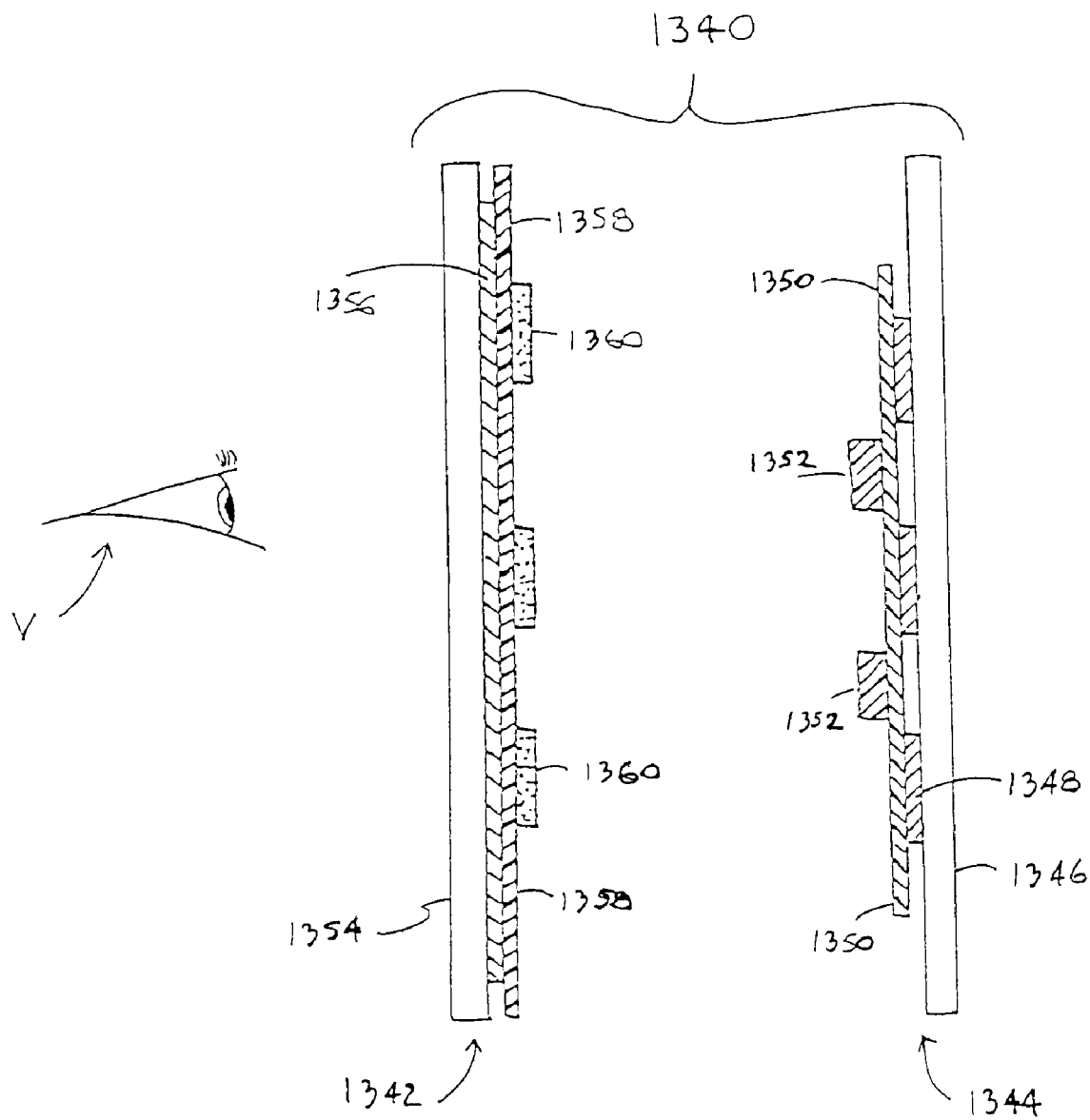

A cross-section of a plasma display device is illustrated in FIG. 41. The plasma display 1340 comprises two opposed panels 1342 and 1344 in parallel opposed relation. A working gas, typically including xenon, is disposed and sealed between the two opposing panels 1342 and 1344. The rear panel 1344 includes a backing plate 1346 on which are printed a plurality of electrodes 1348 (cathodes) which are in parallel spaced relation. An insulator 1350 covers the electrodes and spacers 1352 are utilized to separate the rear panel 1344 from the front panel 1342.

The front panel 1342 includes a glass face plate 1354 which is transparent when observed by the viewer (V). Printed onto the rear surface of the glass face plate 1354 are a plurality of electrodes 1356 (anodes) in parallel spaced relation. An insulator 1358 separates the electrode from the pixels of phosphor powder 1360. The phosphor powder 1360 is typically applied using a thick film paste. When the display 1340 is assembled, the electrodes 1348 and 1356 are perpendicular to each other, forming an XY grid. Thus, each pixel of phosphor powder can be activated by the addressing an XY coordinate defined by the intersecting electrodes 1348 and 1356.

One of the problems currently encountered in plasma display devices is the long decay time of the phosphor particles, which creates a "tall" on a moving image. Through control of the phosphor chemistry, such decay-related problems can be reduced. Further, the spherical, non-agglomerated nature of the phosphor particles improves the resolution of the plasma display panel.

Plasma display panels typically operate using a xenon gas composition. The $Y_2O_3$:Eu phosphors of the present invention, doped with from 4 to about 6 atomic percent Eu, are useful for plasma displays for providing red color. $(Y,Gd)BO_3$ phosphors including about 14 to 20 atomic percent Eu are also useful for red color. Further, the $Zn_2SiO_4$:Mn phosphors of the present invention, preferably with 0.05 to 2 atomic percent Mn, are useful for producing a green color. BAM phosphors of the present invention are useful for producing a blue color, particularly when doped with from about 8 to 12 atomic percent Eu. The phosphors can advantageously be coated, such as with MagO, to reduce degradation from the plasma.

Figure 42:
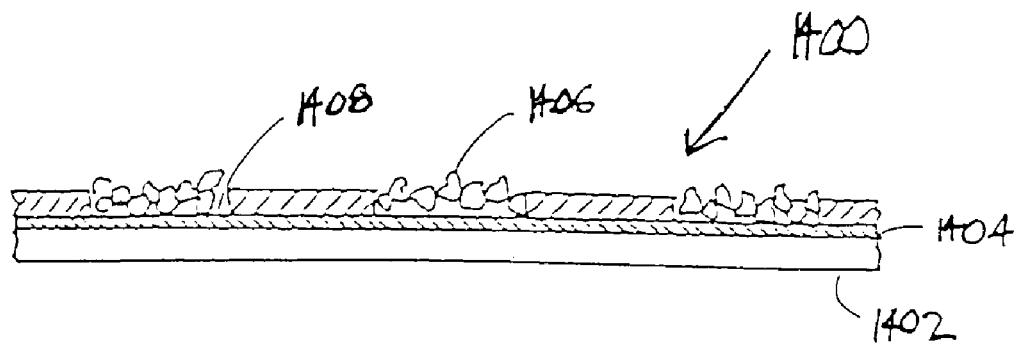

For flat panel displays such as FED's and plasma display panels, it is important for the phosphor layer to be as thin and uniform as possible with a minimal number of voids. FIG. 42 schematically illustrates a lay down of large agglomerated particles in a pixel utilizing conventional phosphor powders deposited in a conventional manner. The device 1400 includes a transparent viewing screen 1402 and a transparent electrode layer 1404. The phosphor particles 1406 are dispersed in pixels 1408. The phosphor particles are large and agglomerated and result in a number of voids and unevenness in the surface. This results in decreased brightness and decreased image quality.

Figure 43:
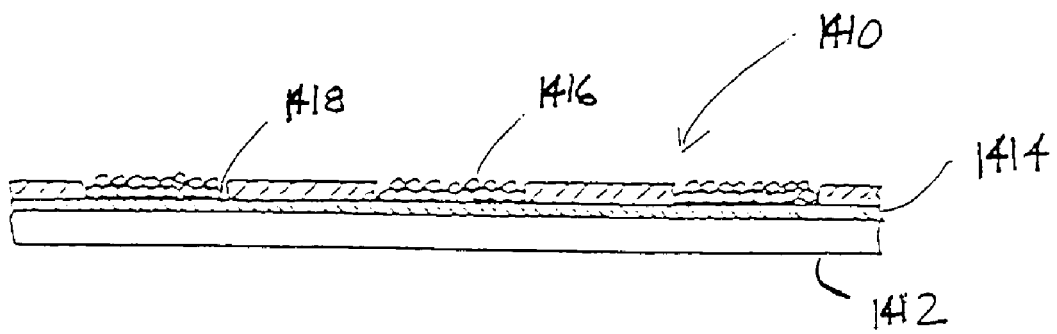

FIG. 43 illustrates the same device fabricated utilizing phosphor powders deposited according to the present invention. The device 1410 includes transparent viewing screen 1412 and a transparent electrode 1414. The phosphor powders 1416 are dispersed in pixels in 1418. The pixels are thinner and more uniform than the conventional pixel. In a preferred embodiment the phosphor layer constituting the pixel has an average thickness of not greater than about 3 times the average particle size of the powder, preferably not greater than about 2 times the average particle size and even more preferably not greater than about 1.5 times the average particles size. This unique characteristic is possible due to the unique combination of small particle size, narrow size distribution and spherical morphology of the phosphor particles. The device will therefore produce an image having much higher resolution due to the ability to form smaller, more uniform pixels and much higher brightness since light scattering is significantly reduced and the amount of light lost due to non-luminescent particles is reduced. The device can advantageously be formed using the direct-write method of the present invention, preferably using an ink-jet device.

Other displays which can be produced according to the present invention include vacuum fluorescent displays (VFD's). These devices are stimulated at a relatively low voltage of about 200 volts and ZnO:Zn is a common phosphor used for these applications.

A further advantage of the present invention is that an array of direct-write deposition printing devices, such as an array of ink-jet heads, can be used to simultaneously deliver the phosphor powder to a surface. Thus and ink-jet device working with 100 heads in an array that can each deliver drops at a rate of 1,000 drops per second, working with 100 heads in an array can deposit 100,000 pixels per second and therefore can deposit 2,000,000 pixels for high resolution 14 inches display in about 20 seconds. Such economics of manufacture are not attainable using current techniques for the deposition of phosphor powder.

The direct-write deposition method of the present invention offers many advantages for the production of displays such as the CRT's. FED's and plasma display panels discussed hereinabove. Higher resolution displays can be obtained since direct-write devices produce higher resolution than traditional screen printing or slurry techniques. This is particularly important for small displays, such as heads-up displays used in aircraft. Further, the amount of phosphor powder that is used when constructing a display is reduced since the amount of phosphor powder that is washed is reduced. The manufacturing process is faster and can be easily automated suing CAD/CAM techniques. For high resolution displays, the direct-write deposition method offers better registering, that is, it places the subpixels in the correct location with respect to the other subpixels. Further, the phosphor powders adhere better to the display surface.

Another advantage of the present invention is reduced screen weight. The use of hollow or porous phosphor particles, as well as the improved packing density of the particles, directly results in a reduced screen weight, typically measured in mg/cm$^2$.

The method and compositions of the present invention can also be used to produce emergency lighting. More specifically, a radioactive emitter such as tritium gas, a beta or electron emitter, excites a phosphor to emit light. Such devices are similar to a fluorescent tube but are filled with tritium gas rather than mercury gas at low pressure. Tritium emits electrons with a long half-life and the electrons have energies that peak in the range of 3 to 5 kilovolts. The phosphor is constantly luminescencing and it remains lit during a power outage. Printed phosphor signs made in accordance with the present invention can give exit instruction or display characters or other information.

A further advantage of the present invention is that it enables a predetermined amount of phosphor powder to be spread over an area to form a layer having a known concentration of phosphor powder. For example, a known volume of a liquid suspension of phosphor powder can be deposited which includes a known weight percentage of phosphor powder to essentially form one or more monolayers. Such a method can be used to form articles such as fluorescent lamp with a controlled phosphor layer density. The same methodology can also be used to form electroluminescent lamps or color filters for light emitting diodes.

The phosphor powder suspensions and ink-jet deposition methods of the present invention are also useful for applying taggents (e.g., indicia) to articles for identification and security purposes. In these applications the phosphor powders, which are undetectable under normal lighting conditions, become visible upon illumination by a particular energy such as a particular wavelength of light. Thus a phosphor pattern can be applied to an article wherein the pattern is invisible under normal light but becomes detectable under UV light.

More specifically, the phosphor-containing ink is deposited onto the article to be marked. The detection system uses a light source with a wavelength suitable to excite the phosphor and an optical filter that blocks the excitation light and passes the emitted light. The phosphor used in such a system should have characteristics such as high luminescent efficiency, strong absorption at the excitation wavelength and longevity under operating conditions.

The phosphor particles are dispersed into the liquid vehicle and applied using an ink-jet to the article. Such phosphor powders can be deposited onto currency, confidential documentation, explosives, munitions or any other item that may require positive identification, for example, for use as postal indica where in the powder is dispersed in the ink used for postage meters. The indica printed according to the present invention advantageously have a higher resolution then those deposited by other methods, making the article more difficult to counterfeit.

The method of the present invention can also be used to deposit phosphorescent paints. Phosphorescent paints are produced by mixing an inorganic phosphor with a transparent synthetic resin as for varnish which is easily penetrated by ultraviolet light.

Other applications of the present invention will be apparent to those skilled in the art. For example, the phosphor powders can be deposited on articles of clothing to provide luminescent patterns for safety or aesthetic appeal.

EXAMPLES

The following example demonstrates the preparation of phosphor particles that are useful of the direct-write compositions according to the present invention.

1. $Y_2O_3$:Fu

A yttria powder batch was produced for use according to the present invention. An aqueous precursor solution was formed comprising yttrium nitrate and europium nitrate in a ratio to yield a phosphor comprising $Y_2O_3$ and 8.6 atomic percent Eu. The total precursor concentration was 7.5 weight percent based on the final product.

The liquid solution was atomized using ultrasonic transducers at a frequency of 1.6 MHz. Air was used as a carrier gas and the aerosol was carried through a tubular furnace having a temperature of 800° C. The total residence time in the furnace was about 1-2 seconds. The pyrolyzation at 800° C. resulted in intermediate precursor particles of a low crystallinity yttrium compound.

The intermediate precursor particles were then heated in batch mode at a temperature of 1400° C. for 60 minutes in air. The heating ramp rate was 10° C./minute.

The average particle size of the powder was 2.476 μm and 90 percent of the particles had a size of less than 4.150 μm.

The x-ray diffraction pattern showed that the particles were substantially phase pure $Y_2O_3$. SEM photomicrographs indicated that the powder was hollow, with some fragmented spheres.

2. $Zn_2SiO_1$:Mn

A zinc silicate powder batch was produced for use according to the present invention. A precursor solution was formed comprising zinc nitrate and manganese nitrate along with colloidal silica (Cabot L-90, Cabot Corporation, Massachusetts). An excess of 50 molar percent silica was used in the precursor liquid and the concentration of manganese was 5 atomic percent. The total precursor concentration was about 7.5 weight percent based on the final product. The liquid solution was atomized using ultrasonic transducers are a frequency of 1.6 MHz. Air was used as a carrier gas and the aerosol was carried through a tubular furnace having a temperature of 900° C. The total residence time in the furnace was about 1-2 seconds. The pyrolyzation at 900° C. resulted in intermediate precursor particles having a low crystallinity.

The intermediate precursor particles were then heated in batch mode at a temperature of 1175° C. for 60 minutes in air. The heating ramp rate was 10° C./minute.

The average particle size was 2.533 µm and 90 percent of the particles had a size of less than 4.467 µm. The x-ray diffraction pattern showed that the particles were substantially phase pure $Zn_2SiO_4$.

3. $SrGa_2S_1$:Eu

For the production of a thiogallate an aqueous solution was formed including 2 mole equivalents gallium nitrate ($Ga(NO_3)_3$) and 1 mole equivalent strontium nitrate ($Sr(NO_3)_2$). About 0.05 mole equivalents of europium nitrate ($Eu/NO_3)_5$) was also added.

The aqueous solution was formed into an aerosol using ultrasonic transducers of a frequency of about 1.6 MHz. The aerosol was carried in air through a furnace heated to a temperature of about 800° C. to spray-convert the solution. The intermediate product was a $SrGa_2O_4$ oxide having a small average particle size and low impurities.

The oxide intermediate precursor product was then heated at 900° C. under a flowing gas that included $H_2S$ and nitrogen in a 1:1 ratio for about 20 minutes. The resulting powder was substantially phase pure $SrGa_2S_4$:Eu (3 atomic percent Eu) having good crystallinity and good luminescent characteristics.

4. $Y_{2-x}Gd_xSiO_5$:Ce

A phosphor compound, $Y_{1.88}Gd_{0.12}SiO_5$:Ce, that is useful as an x-ray phosphor was produced according to the present invention. A liquid precursor solution was formed including yttrium nitrate, gadolinium nitrate, cerium nitrate and colloidal silica (Cabot HS-5, Cabot Corporation, Boyertown, Pa.) to yield the foregoing compound including 0.5 atomic percent Ce. The total precursor concentration was 5 weight percent based on the equivalent weight of the final compound. The liquid was atomized into an aerosol using ultrasonic transducers operating at a frequency of 1.6 MHz and the aerosol was carried in air through furnace having a temperature of about 650° C. to produce intermediate precursor particles.

The intermediates precursor particles were then batch annealed in air at a temperature of 1350° C. for 1 hour. The resulting powder had a small particle size and a narrow particle size distribution.

5. (Y,Gd)$Bo_3$:Eu

A yttrium gadolinium borate powder batch was produced according to the present invention. An aqueous precursor solution was formed comprising yttrium nitrate, gadolinium nitrate, europium nitrate and boric acid in a ratio to yield a (Y,Gd)$BO_3$ phosphor having a Y:Gd ratio of 3 and an Eu concentration of 16 atomic percent. The total precursor concentration was 8.0 weight percent based on the final product.

The liquid solution was atomized using ultrasonic transducers at a frequency of 1.6 MHz. Air was used as a carrier gas and the aerosol was carried through a tubular furnace having a temperature of 950° C. The total residence time in the furnace was about 1-2 seconds. The pyrolyzation at 950° C. resulted in intermediate precursor particles having low crystallinity.

The intermediate precursor particles were then heated in batch mode at a temperature of 1150° C. for 60 minutes in air. The heating ramp rate was 10° C./minute.

The average particle size of the powder was 2.139 µm and 90 percent of the particles had a size of less than 3.608 µm. The x-ray diffraction pattern showed that the particles were substantially phase pure yttrium borate and gadolinium borate having a high crystallinity.

6. BAM:Eu

BAM powder was produced as follows. Barium nitrate, europium nitrate, magnesium nitrate and colloidal alumina were formed into a precursor solution having a concentration of about 8 weight percent based on the equivalent of BAM. Europium was incorporated at 5 atomic percent. The solution was atomized using ultrasonic transducers at a frequency of about 1.6 MHz. The aerosol was pyrolyzed in a tubular furnace at a reaction temperature of 950° C. to form a spray-converted intermediate precursor powder. The powder was then heat-treated at 1450° C. for 2 hours under an atmosphere of $H_2/N_2$. The average particle size was 1.88 µm and 90% of the particles by weight were less than 3.51 µm in size. The powder exhibited strong photoluminescence characteristics.

7. Ink-jet Deposition $Zn_2SiO_4$:Mn phosphor particles as produced in Example 2 were deposited using an ink-jet device according to the present invention.

Figure 44:
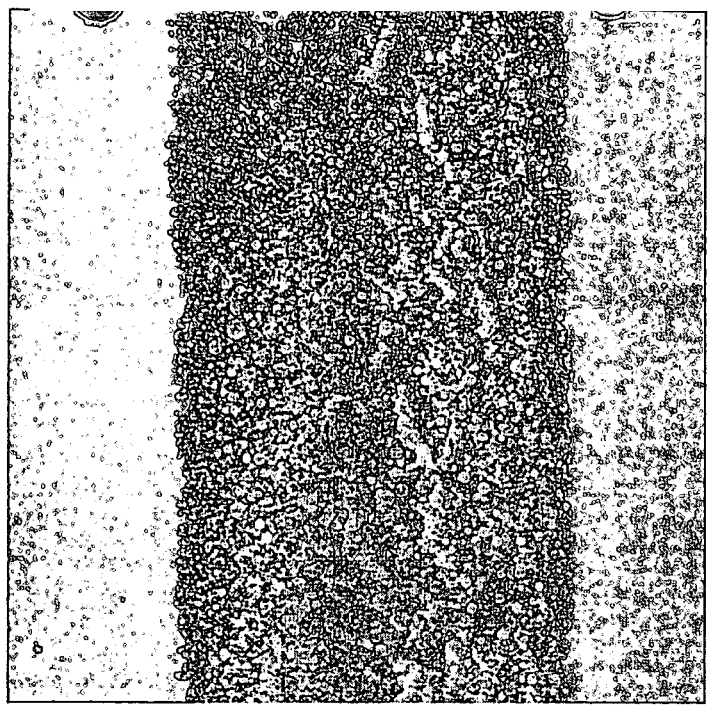
Figure 45:
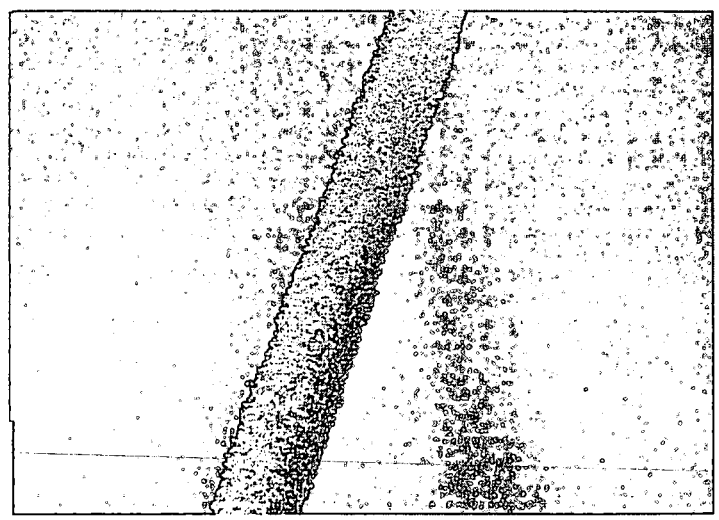

FIG. 44 illustrates a scanning electron micrograph of an ink-jet printed line of the $Zn_2SiO_4$:Mn phosphor particles having a line width of 90 µm. As is clearly illustrated in FIG. 44, the line comprises densely packed phosphor particles and has a smooth and consistent line width. The same line is illustrated at a lower magnification in FIG. 45.

Figure 46:
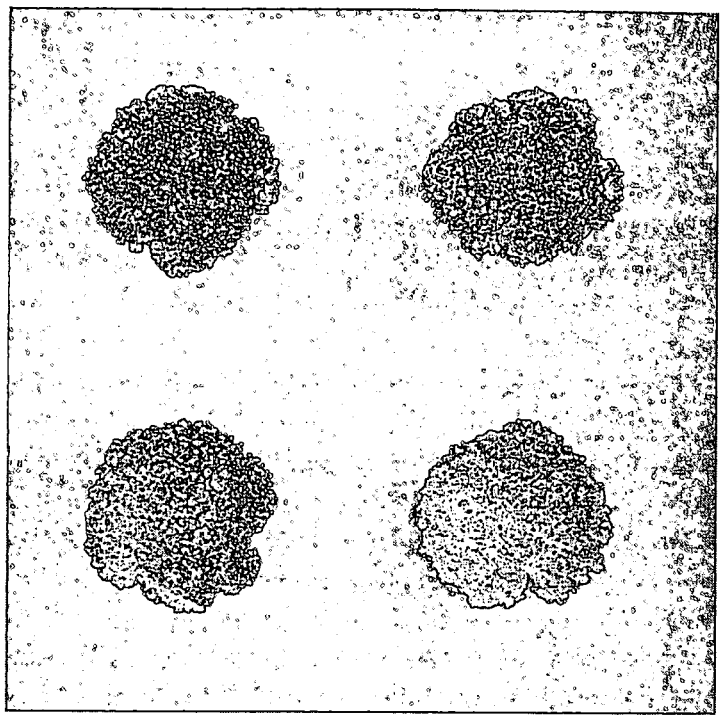
Figure 47:
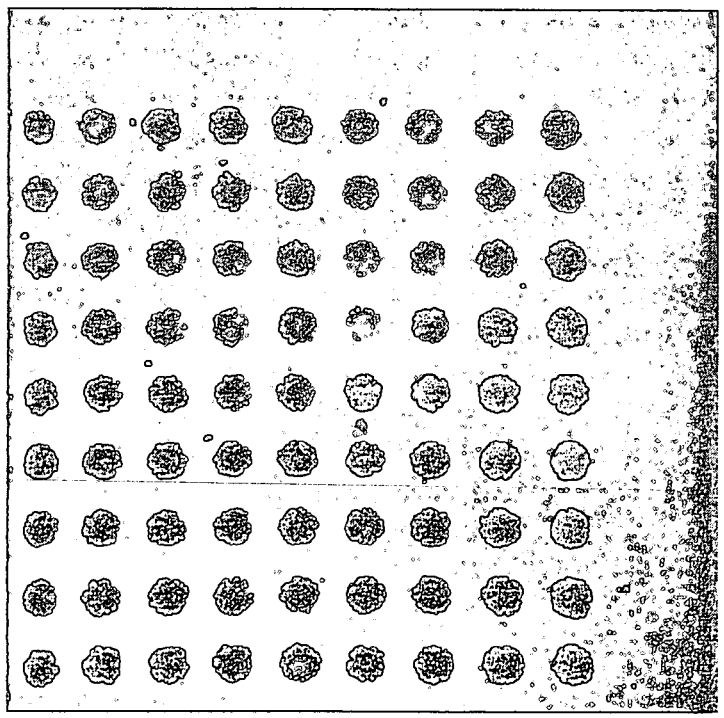
Figure 48:
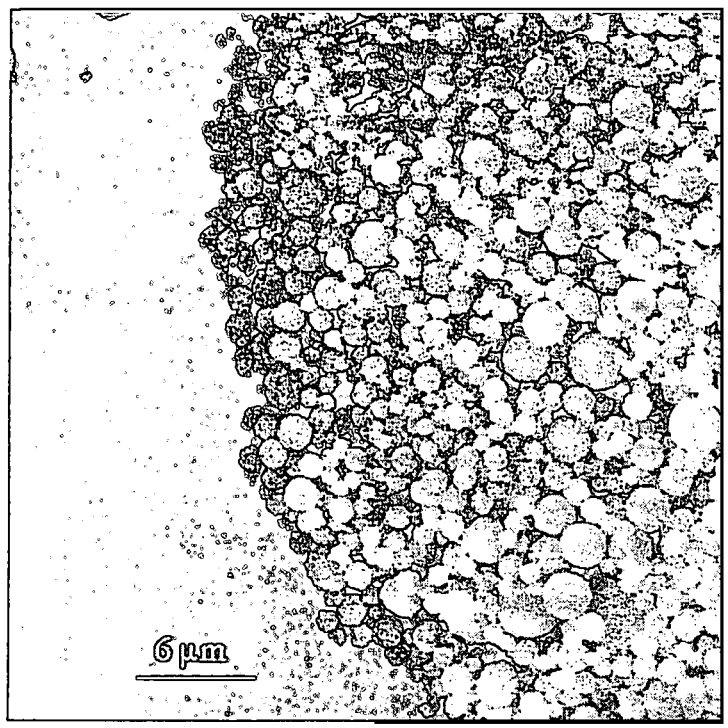

FIG. 46 illustrates the same $Zn_2SiO_4$:Mn phosphor particles deposited as circular 90 µm diameter dots. Again, the phosphor particles form a dense and well packed dot that exhibited a high luminescence. An reduced magnification view of an array of the dots is illustrated in FIG. 47 and FIG. 48 illustrates an increased magnification view of one of these dots.

Similarly, $Y_2O_3$:Eu phosphor particles, such as those described in Example 1, were deposited using an ink-jet according to the present invention.

Figure 49:
Figure 50:
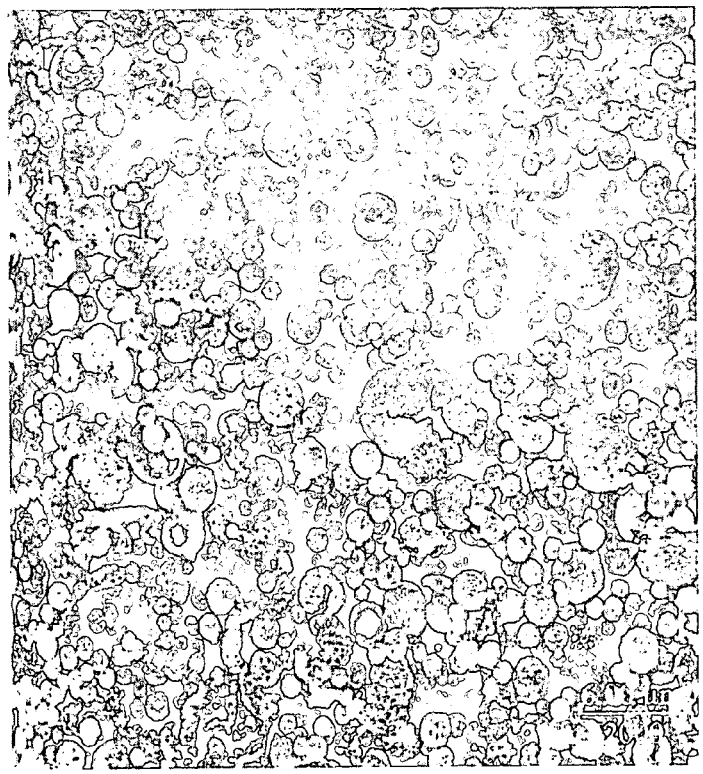

FIG. 49 illustrates two lines formed from the yttria particles. The lines have good line resolution at a line width of about 400 µm. FIG. 60 illustrates a close-up view of the deposited particles. As is evident from FIG. 50, the deposited line has a high packing density and exhibited excellent luminescent intensity.

While various embodiments of the present invention have been described in detail, it is apparent that modifications and adaptations of those embodiments will occur to those skilled in the art. However, it is to be expressly understood that such modifications and adaptations are within the spirit and scope of the present invention.

What is claimed is:

1. A method for depositing a phosphor pattern comprising phosphor particles on an article using a direct-write tool, comprising the steps of:
   providing a particulate suspension of said phosphor particles having a viscosity of not greater than 30 centipoise, wherein said phosphor particles are substantially spherical and have a weight average particle size of from about 0.1 microns to about 20 microns; and
   depositing said particulate suspension on said article using a direct-write tool that is controllable over an x-y grid;
   wherein said phosphor particles have an apparent density of not greater than about 20 percent of the theoretical density of the phosphor compound; and
   wherein said direct-write tool is selected from one of an automated syringe and an ink-jet device.

2. A method for depositing a phosphor pattern comprising phosphor particles on an article using a direct-write tool, comprising the steps of:
   providing a particulate suspension of said phosphor particles having a viscosity of not greater than 30 centipoise, wherein said phosphor particles are substantially spherical and have a weight average particle size of from about 0.1 microns to about 20 microns; and
   depositing said particulate suspension on said article using a direct-write tool that is controllable over an x-y grid;
   wherein said phosphor particles comprise hollow particles;
   wherein said direct-write tool is selected from one of an automated syringe and an ink-jet device.

* * * * *

UNITED STATES PATENT AND TRADEMARK OFFICE
CERTIFICATE OF CORRECTION

PATENT NO. : 7,476,411 B1 Page 1 of 1
APPLICATION NO. : 09/495141
DATED : January 13, 2009
INVENTOR(S) : Hampden-Smith et al.

It is certified that error appears in the above-identified patent and that said Letters Patent is hereby corrected as shown below:

Title Page, (56) References Cited, insert:
--5,644,193 A  7/1997   Matsuda et al. ............................. 313/486
 5,932,139 A  8/1999   Oshima et al. .............................. 252/301.16
 6,193,908 B1 2/2001   Hampden-Smith et al. ................ 252/301.35
 6,197,218 B1 3/2001   Hampden-Smith et al. ................ 252/301.36--

Column 3, line 17, delete "an other" and insert therefor --another--.
Column 10, line 26, delete "tis" and insert therefor --its--.
Column 36, line 54, delete "cathoduluminescent" and insert therefor --cathodoluminescent--.

Signed and Sealed this

Third Day of March, 2009

JOHN DOLL
*Acting Director of the United States Patent and Trademark Office*